(12) United States Patent
Okaue

(10) Patent No.: US 8,098,827 B2
(45) Date of Patent: *Jan. 17, 2012

(54) DATA PROCESSING SYSTEM, DATA PROCESSING METHOD, AND PROGRAM PROVIDING MEDIUM

(75) Inventor: Takumi Okaue, Tokyo (JP)

(73) Assignee: Sony Corporation (JP)

( * ) Notice: Subject to any disclaimer, the term of this patent is extended or adjusted under 35 U.S.C. 154(b) by 1288 days.

This patent is subject to a terminal disclaimer.

(21) Appl. No.: 11/540,384

(22) Filed: Sep. 29, 2006

(65) Prior Publication Data

US 2007/0121950 A1    May 31, 2007

Related U.S. Application Data

(63) Continuation of application No. 09/912,174, filed on Jul. 24, 2001, now Pat. No. 7,116,785.

(30) Foreign Application Priority Data

Jul. 24, 2000   (JP) ............................... P2000-222124
Aug. 17, 2000   (JP) ............................... P2000-247462

(51) Int. Cl.
    *H04L 9/08*    (2006.01)
(52) U.S. Cl. ....................................... 380/278; 713/193
(58) Field of Classification Search ................... 380/278
    See application file for complete search history.

(56) References Cited

U.S. PATENT DOCUMENTS 6,049,878 A   4/2000   Caronni et al.
6,609,116 B1  8/2003   Lotspiech

FOREIGN PATENT DOCUMENTS

| DE | 195 11 298 A | 4/2000 |
|----|--------------|--------|
| EP | 0 798 892 A2 | 10/1997 |
| EP | 0 994 475 A1 | 4/2000 |
| EP | 1 008 989 A2 | 6/2000 |
| JP | 10028115 A | 1/1998 |
| JP | 11039794 A | 2/1999 |
| JP | 11-187013 A | 7/1999 |

(Continued)

OTHER PUBLICATIONS

Waldvogel, M. et al., "The VersaKey Framework: Versatile Group Key Management", IEEE Journal on Selected Areas in Communications, vol. 17, No. 9, Sep. 1999, pp. 1614-1631.

(Continued)

*Primary Examiner* — Gilberto Barron, Jr.
*Assistant Examiner* — Simon Kanaan
(74) *Attorney, Agent, or Firm* — Lerner, David, Littenberg, Krumholz & Mentlik, LLP

(57) ABSTRACT

The inventive data processing apparatus enables own memory device to store a plurality of key distribution approval data files each containing such a header data comprising a number of "link-count" data units each designating actual number of applicable contents data per decodable contents key based on an enabling key block (EKB) distribution key enciphering key (KEK) enciphered by a corresponding enabling key block (EKB) provided for by a hierarchy key tree structure. When storing a plurality of the enabling key blocks (EKB) in a memory device, such a key enciphering key (KEK) contained in an enabling key block (EKB) having a number of link-count data units is previously decoded and stored in the memory device. By way of applying the stored (KEK) when utilizing contents data, the enabling key block (EKB) processing step is deleted, whereby promoting higher efficiency in the utilization of contents data.

12 Claims, 45 Drawing Sheets

FOREIGN PATENT DOCUMENTS

| | | |
|---|---|---|
| JP | 11328033 A | 11/1999 |
| JP | 2000099010 A | 4/2000 |
| WO | 99/53689 | 10/1999 |

OTHER PUBLICATIONS

Wong, C.K. et al, "Secure Group Communications Using Key Graphs", IEEE/ACM Transactions on Networking, vol. 8, No. 1, Feb. 2000, pp. 16-30.

Wallner, D et al., "Key Management for Multicast: Issues and Architectures", IETF Request for Comments No. 2627, The Internet Society, Online!, Jun. 1999, pp. 1-23.

Leffler, Samuel J. et al., "Chapter 7: The Filesystem", Design and Implementation of the 4.3 BSD Unix Operating System, Nov. 1989, pp. 187-223.

Ylonen, Tatu, "encodings, character sets, general requirements", Simple Public Key Infrastructure, Online!, Feb. 28, 1996, pp. 1-2.

Stevenson, Frank A., "Cryptanalysis of Contents Scrambling System", Online!, Nov. 8, 1999, pp. 1-4.

Office Action from Japanese Application No. 2000-247462, dated Jun. 1, 2010.

FIG. 4

EKB (ENABLING KEY BLOCK) EXAMPLE 1
DELIVERS NODE KEYS OF VERSION (t) TO DEVICES 0, 1, AND 2

(A)

| VERSION : t | |
|---|---|
| INDEX | ENCIPHERING KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

EKB (ENABLING KEY BLOCK) EXAMPLE 2
DELIVER NODE KEY OF VERSION (t) TO DEVICES 0, 1, AND 2

(B)

| VERSION : t | |
|---|---|
| INDEX | ENCIPHERING KEY |
| 000 | Enc(K000, K(t)00) |
| 001 | Enc(K(t)001, K(t)00) |
| 0010 | Enc(K0010, K(t)001) |

FIG. 8
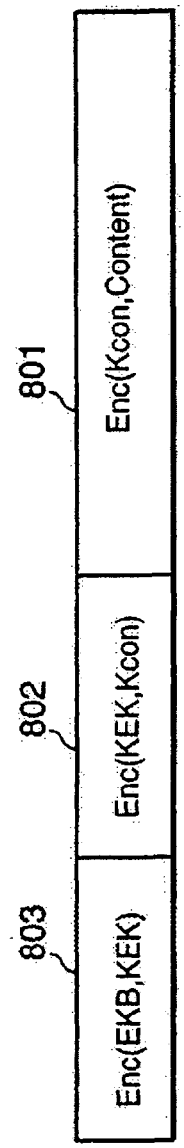
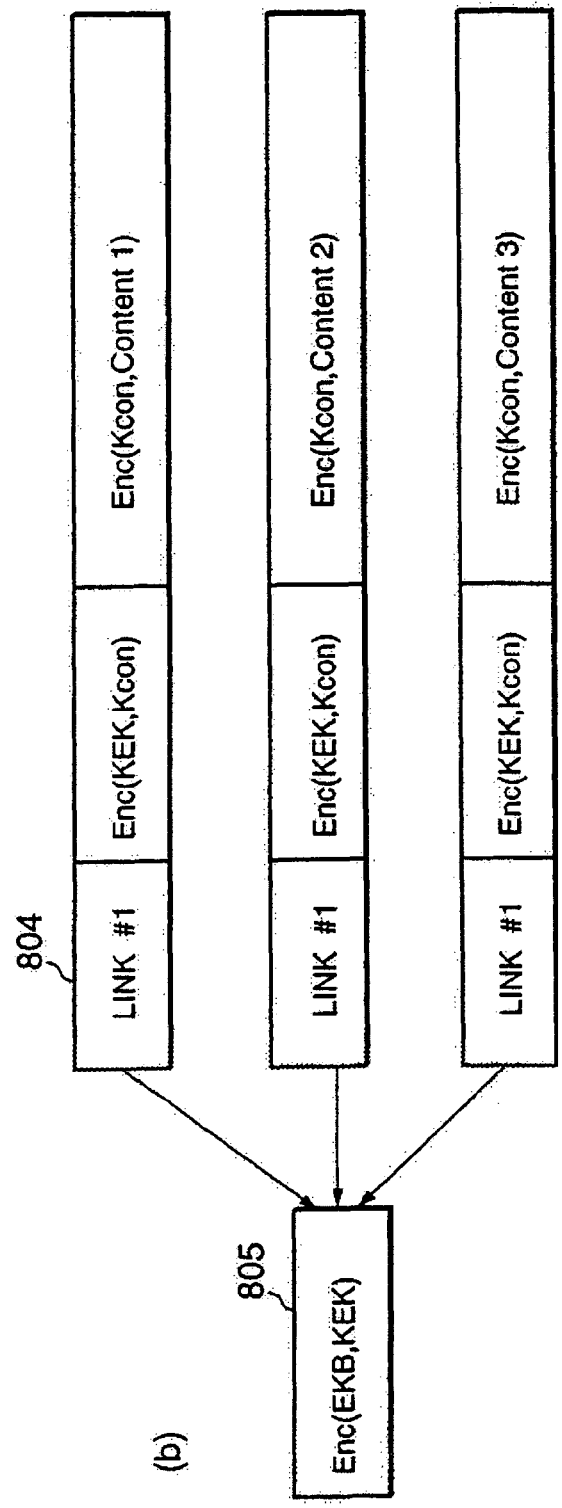

FIG. 12
(a)
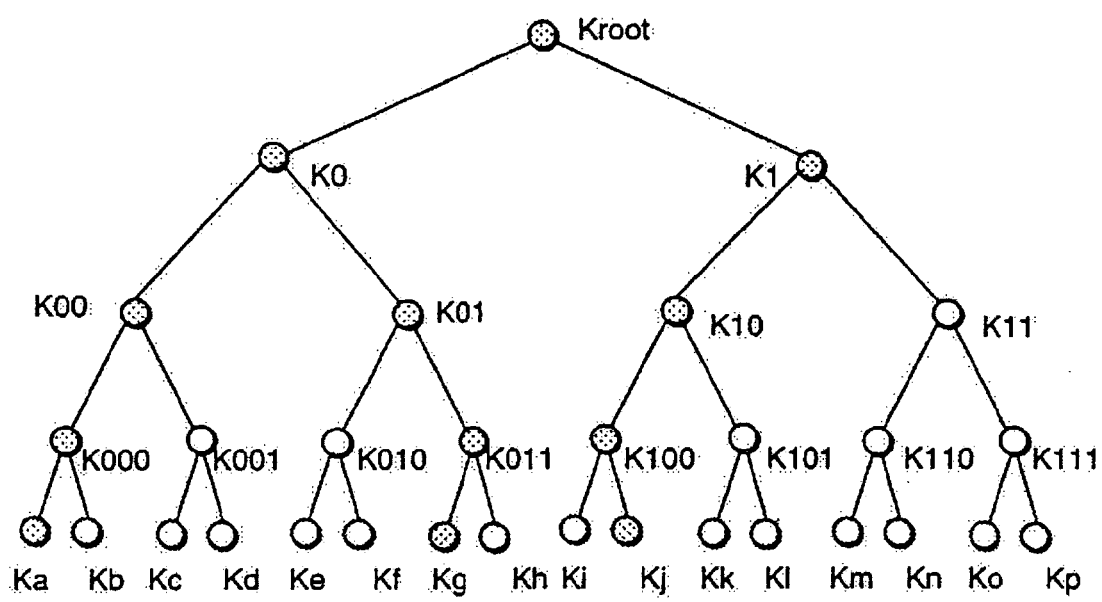
(b)
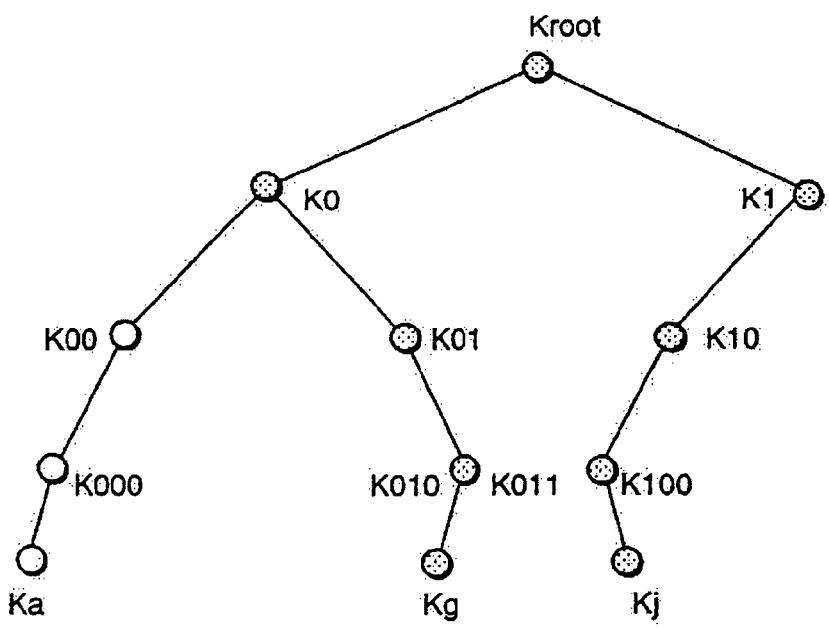

DATA STORED IN A STORAGE UNIT OF A MEMORY DEVICE

FIG. 19
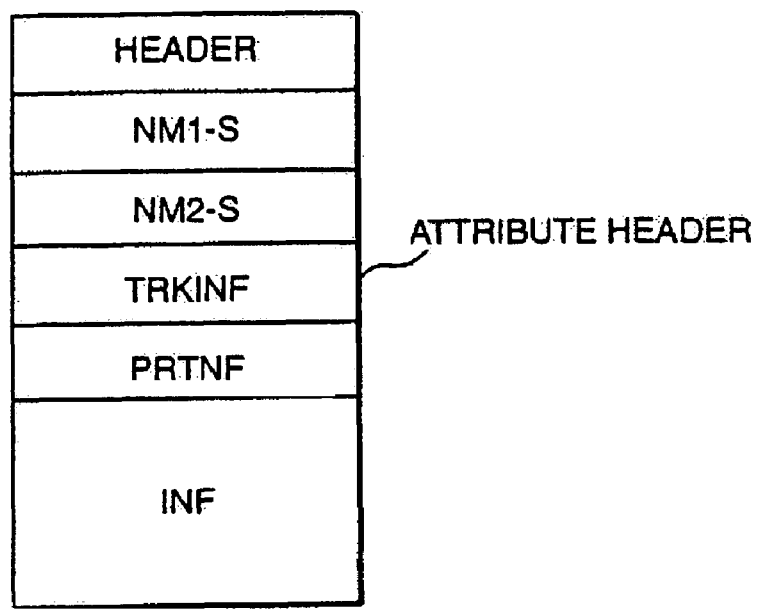
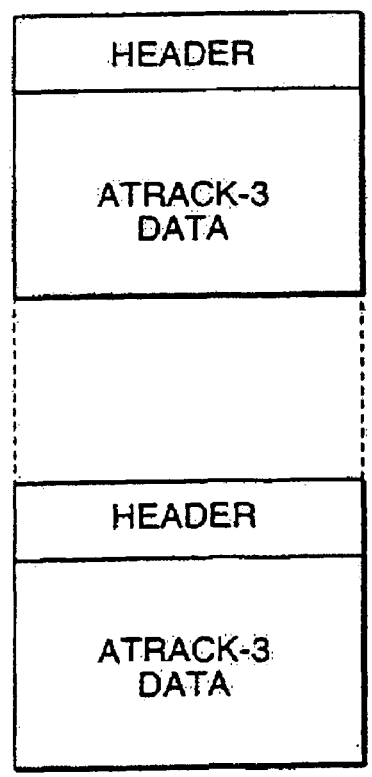

FIG. 20

REPRODUCTION MANAGEMENT FILE

A

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | BLKID-TLO | | | RESERVED | | MCODE | | REVISION | | | | RESERVED | | | | |
| 0x0010 | SN1C+L | | SN2C+L | | SINFSIZE | | T-TRK | | VerNo. | | RESERVED | | | | | |

B

| | |
|---|---|
| 0x0020 | NM1-S(256) |
| 0x0120 | NM2-S(512) |
| 0x0310 | |

| | 0-1-2-3 | 4-5 | 6-7 | 8-9-A-B-C-D-E-F |
|---|---|---|---|---|
| 0x0320 | RESERVED(4) | EKB VERSION | | E(Kstm,Kcon) |
| 0x0330 | E(KEKn,Kcon) | | | c_MAC[0] |
| 0x0340 | RESERVED(8) | | RESERVED(3) | MGR | S-YMDhms |
| 0x0350 | TRK-001 | TRK-002 | TRK-003 | TRK-004 | TRK-005 | TRK-006 | TRK-007 | TRK-008 |
| 0x0360 | TRK-009 | TRK-010 | TRK-011 | TRK-012 | TRK-013 | TRK-014 | TRK-015 | TRK-016 |
| 0x0660 | TRK-393 | TRK-394 | TRK-395 | TRK-396 | TRK-397 | TRK-398 | TRK-399 | TRK-400 |
| 0x0670 | INF-S(14720) |
| 0x3FFF | BLKID-TLO | RESERVED | MCODE | REVISION | RESERVED |

C

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| INF | 0X00 | ID | 0X00 | SIZE | | MCODE | | C+L | | RESERVED | | DATA VARIABLE LENGTH | | | |

FIG. 21

ATRACK-3 DATA FILE

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | BLKID-HD0 | | | RESERVED | | MCODE | | RESERVED | | | | BLOCK SERIAL | | | | |
| 0x0010 | N1C+L | | N2C+L | | INFSIZE | | T-PRT | | T-SU | | | | INX | | XT | |
| 0x0020 | NM1-S(256) | | | | | | | | | | | | | | | |
| 0x0120 | NM2-S(512) | | | | | | | | | | | | | | | |
| 0x0310 | | | | | | | | | | | | | | | | |
| 0x0320 | RESERVED(3) | | | EKI | EKB VERSION | | | | E(Kstm, Kcon) | | | | | | | |
| 0x0330 | E(KEKn, Kcon) | | | | | | | | C_MAC[n] | | | | | | | |
| 0x0340 | RESERVED(8) | | | | | | | | INF_seq# | | | | A | LT | FNo | |
| 0x0350 | MG(D)SERIAL-nnn(Upper) | | | | | | | | MG(D)SERIAL-nnn(LOWER) | | | | | | | |
| 0x0360 | CONNUM | | | | YMDhms-S | | | | YMDhms-E | | | | XCC | CT | CC | CN |
| 0x0370 | PRTSIZE | | | | PRTKEY | | | | | | | | RESERVED(8) | | | |
| 0x0380 | | | | | CONNUMO | | | | PRTSIZE(0x0388) | | | | PRTKEY | | | |
| 0x0390 | | | | | RESERVED(8) | | | | | | | | CONNUMO | | | |
| 0x03A0 | INF(0x0400) | | | | | | | | | | | | | | | |
| 0x3FFF | BLKID-HDD | | | RESERVED | | MCODE | | RESERVED | | | | BLOCK SERIAL | | | | |
| 0x4000 | BLKID-A3D | | | RESERVED | | MCODE | | CONNUMO | | | | BLOCK SERIAL | | | | |
| 0x4010 | BLOCKSEED | | | | | | | | INTIALIZATION VECTOR | | | | | | | |
| 0x4020 | SU-000(NByte=384Byte) | | | | | | | | | | | | | | | |
| 0x41A0 | SU-001(NByte) | | | | | | | | | | | | | | | |
| 0x4320 | SU-002(NByte) | | | | | | | | | | | | | | | |
| 0x04A0 | SU-041(NByte) | | | | | | | | | | | | | | | |
| 0x7DA0 | RESERVED(NByte=208Byte) | | | | | | | | | | | | | | | |
| 0x7F20 | BLK SEED | | | | | | | | | | | | | | | |
| 0x7FF0 | BLKID-A3D | | | RESERVED | | MCODE | | CONNUMO | | | | BLOCK SERIAL | | | | |

FIG. 22

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | BLKID-HDO | | | RESERVED | | | MCODE | | RESERVED | | | | BLOCK SERIAL | | | |
| 0x0010 | N1C+L | N2C+L | | | INFSIZE | | T-PRT | | T-SU | | | | INX | | XT | |
| 0x0020 | NM1-S(256) | | | | | | | | | | | | | | | |
| 0x0120 | NM2-S(512) | | | | | | | | | | | | | | | |
| 0x0310 | | | | | | | | | | | | | | | | |

FIG. 23

| | | | | | | | |
|---|---|---|---|---|---|---|---|
| 0x0320 | RESERVED(3) | EKI | EKB VERSION | | | | |
| 0x0330 | E(KEKn, Kcon) | | | E(Kstm, Kcon) | | | |
| 0x0340 | RESERVED(8) | | | C_MAC[n] | | | |
| 0x0350 | MG(D)SERIAL-nnn(UPPER) | | | INF_seq# | A | LT | FNo |
| 0x0360 | CONNUM | YMDhms-S | | YMDhms-E | MG(D)SERIAL-nnn(LOWER) | | |
| | | | | XCC | CT | CC | CN |

FIG. 24

Bit7 : ATRAC3 Mode     0 : Dual     1 : Joint

Bits 6, 5, 4: N OF 3-Bit CORRESPONDS TO MODE VALUE

| N | MODE | TIME | TRANSFER RATE | SU (SOUND UNIT) | Byte |
|---|------|------|---------------|-----------------|------|
| 7 | HQ | 47min | 176kbps | 31SU | 512 |
| 6 |    | 58min | 146kbps | 38SU | 424 |
| 5 | EX | 64min | 132kbps | 42SU | 384 |
| 4 | SP | 81min | 105kbps | 53SU | 304 |
| 3 |    | 90min | 94kbps | 59SU | 272 |
| 2 | LP | 128min | 66kbps | 84SU | 192 |
| 1 | MONO | 181min | 47kbps | 119SU | 136 |
| 0 | MONO | 258min | 33kbps | 169SU | 96 |

Bit3 : RESERVED

Bit2 : DATA DISTINCTION     0 : AUDIO     1 : OTHERS

Bit1 : REPRODUCED SKIP     0 : NORMAL REPRODUCTION     1 : SKIP

Bit0 : EMPHASIS     0 : OFF     1 : ON(50/15 $\mu$ SECCOND)

FIG. 25

HCMS

Bit7 : COPY APPROVAL  0 : COPY INHIBITED  1 : COPY APPROVED

Bit6 : GENERATION (VERSION)  0 : ORIGINAL  1 : BEYOND THE FIRST GENERATION

Bit5-4 : CONTROL IN RELATION TO HIGH-SPEED DIGITAL COPYING OPERATION

00 : COPY INHIBITED  01 : COPY FOR THE FIRST GENERATION  10 : COPY APPROVED
CHILD WHO IMPLEMENTED COPYING OF THE FIRST GENERATION IS
INHIBITED FROM EXECUTING FURTHER COPYING OPERASTION

Bit3-2 : MAGIC GATE AUTHENTICATION LEVEL

00: LEVEL10(Non-MG)  01 : LEVEL1
02: LEVEL12  11 : RESERVED
02: LEVEL10
THOSE LEVELS OTHER THAN 10 CAN NOT BE DIVIDED NOR COMBINED

Bit1, 0 : RESERVED

FIG. 26

| | PRTSIZE | |
|---|---|---|
| 0x0370 | PRTSIZE | RESERVED (8) |
| 0x0380 | CONNUM0 | PRTKEY PRTSIZE(0x0388) |
| 0x0390 | RESERVED (8) | CONNUM0 |

FIG. 27

| | BLKID-A3D | RESERVED | MCODE | CONNUM0 | BLOCK SERIAL |
|---|---|---|---|---|---|
| 0x4000 | BLKID-A3D | RESERVED | MCODE | CONNUM0 | BLOCK SERIAL |
| 0x4010 | BLOCKSEED | | | INTIALIZATION VECTOR | |
| 0x4020 | SU-000(NByte=384Byte) | | | | |

FIG. 31

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | BLKID-EKB | | | | RESERVED | MCODE | | | RESERVED(3) | | LKF | RESERVED(8) | | | LINK COUNT | |
| 0x0010 | RESERVED(8) | | | | | | | | | | | | | | | |
| 0x0020 | VERSION | | | | EA | RESERVED | | | KEK1 | | | | | | | |
| 0x0030 | KEK2 | | | | | | | | E(VERSION) | | | | | | | |
| 0x0040 | SIZE OF TAG PART | | | | SIZE OF KEY PART | | | | SIZE OF SIGN PART | | | | | | | |
| 0x0050 | TAG PART ({X,0,0}, {X,1,1}……) FILL TO 64Bit ALIGNMENT | | | | | | | | | | | | | | | |
| | KEY PART | | | | | | | | | | | | | | | |
| | SIGNATURE | | | | | | | | | | | | | | | |

FIG. 40

POOL PAGE FORMAT

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | #0_REVISION | | | | #0_EKB VERSION | | | | #0_E(KEK, Kicv) | | | | | | | |
| 0x0010 | #0_E(KEK, Kicv) | | | | | | | | ICV0 | | | | | | | |
| 0x0020 | #1_REVISION | | | | #1_EKB VERSION | | | | #1_E(KEK, Kicv) | | | | | | | |
| 0x0030 | #1_E (KEK,Kicv) | | | | | | | | ICV1 | | | | | | | |
| ... | ⋯⋯⋯ | | | | | | | | | | | | | | | |
| 0x01E0 | #15_REVISION | | | | #15_EKB VERSION | | | | #15_E(KEK, Kicv) | | | | | | | |
| 0x01F0 | #15_E (KEK,Kicv) | | | | | | | | ICV15 | | | | | | | |

DATA PROCESSING SYSTEM, DATA PROCESSING METHOD, AND PROGRAM PROVIDING MEDIUM

CROSS-REFERENCE TO RELATED APPLICATIONS

The present application claims priority to Japanese Patent Application Nos. P2000-222124, filed Jul. 24, 2000, and P2000-247462, filed Aug. 17, 2000, which applications are incorporated by reference to the extent permitted by law. The present application is also a continuation of U.S. patent application Ser. No. 09/912,174, filed Jul. 24, 2001, now U.S. Pat. No. 7,116,785, the entire disclosure of which is hereby incorporated by reference to the extent permitted by law.

BACKGROUND OF THE INVENTION

The present invention relates to a data processing apparatus, a data processing method, and a program providing medium. More particularly, the present invention relates to such a data processing apparatus, a data processing method, and a program providing medium, in which it is possible to reduce the load incurred from distribution of contents data or incurred from distribution of enciphering keys, and to promote the security of data by way of lowering message volume by introducing such a system for distributing keys of a hierarchy key tree structure. Further, the present invention also makes it possible to more effectively process contents data by enabling a plurality of key distribution approval data files, each containing such a header data consisting of "link-count" data designating the number of contents data that should be treated with such enciphering keys acquirable based on an enabling key block (EKB) distribution key enciphering key (KEK) enciphered by an enabling key block (EKB), to be stored in a memory device.

Recently, there has been a further growth of distribution of so-called "contents" data via a wide variety of software data including music data, game programs, picture data, or the like, which are respectively transmitted via internet service lines, or via distributable recording media including a memory card, a DVD (Digital Versatile Disc), or CD (Compact Disc), or the like, for example.

Any of those distributed contents data is reproduced via user's personal computers, reproduction devices, or game players via reception, or via such recording media including a memory card, a CD, or a DVD loaded in any of those means cited above. In addition, the above contents data are also reproducibly stored in a reproduction device and a recording medium stored in a personal computer such as a memory card or a hard disc for example.

Any of the above-cited reproduction devices, game players, and information device such as personal computers incorporates an interface device for receiving distributed contents data or for accessing a DVD and a CD and further incorporates a controlling means required for reproducing contents data, and yet, also incorporates a RAM (Random Access Memory) and a ROM (Read Only Memory) for storing programs and a variety of data.

Based on the user's instruction via the reproduction device, the game player, or the information device such as the personal computer or the user's instruction via a connected input means, a wide variety of contents data such as music data, picture data, or programs are individually output from a built-in or detachable recording medium and then reproduced by a data reproducing apparatus or via a connected display device or speaker units.

Conventionally, the rights of distribution for game programs, music data, picture data, or the like, are reserved by corresponding producers and marketing agents. Accordingly, whenever distributing contents data, only restricted proper users are authorized to utilize the contents data so that unauthorized duplication will not be committed. In other words, it is a conventional practice to establish such a safeguard to ensure security.

A process for ciphering distributable contents data constitutes such a practical means to restrain users from utilizing the contents data. Concretely, the ciphering method distributes a variety of contents data comprising ciphered audio data, picture data, game programs, or the like, via internet service lines for example, and in addition, it also enables only those who are authenticated as proper users to decode the distributed ciphered contents data. In other words, only those verified users are entitled with reception of the decoding key.

Ciphered data can properly be restored into practically usable decoded data, i.e., a plain text, solely after completing such a decoding process in accordance with a predetermined procedure. These processes for ciphering data via a ciphering process and decoding data via a decoding method and the process are conventionally well known.

Of those various kinds in the method for ciphering and decoding data by applying a ciphering key and a decoding key, there is such a method so-called common key ciphering system, for example. This common key ciphering system effects ciphering of data and decoding of data by applying a common key. This system provides verified proper users with the common key for ciphering and decoding receivable data whereby preventing unverified users devoid of the common key from improperly accessing data. A typical one of the common key ciphering system is cited as the DES (Data Encryption Standard).

Such a ciphering key and a decoding key usable for the above cited ciphering and decoding processes can be secured by applying a mono-directional function such as a Hash function based on a certain pass-word for example. Such mono-directional function involves an extreme difficulty to compute an input value inversely from an output value. For example, based on an input pass-word predetermined by a user, by applying the mono-directional function and a resultant output value, a ciphering key and a decoding key are respectively generated. On the other hand, it is practically impossible to identify the above-referred pass-words as the original data from the ciphering and decoding keys generated via the above process.

There is a so-called open key ciphering process which utilizes such an algorithm based on such a ciphering process with a ciphering key and such a decoding process with a decoding key being different algorithm from each other. The open key ciphering process utilizes such an open key commonly usable by unspecified users. This ciphering method ciphers a document addressed to a specific individual by applying an open key issued by this specific individual. The document ciphered by this open key can be decoded solely by applying a secrete key corresponding to this open key used for ciphering this document. Inasmuch as the secrete key is reserved by such a specific individual who issued the open key, the document ciphered by the open key can exclusively be decoded by a specific individual reserving the secrete key. The RSA (Rivest Shamir Adleman) ciphering code is cited as the typical system of the open key ciphering method cited above. By way of utilizing the open key ciphering method, it is possible to set up such a system enabling ciphered contents data to be decoded exclusively for the verified proper users.

A number of the contents data distribution systems cited above provide specific users with ciphered contents data via internet service lines or via storage in a recording medium such as a DVD or a CD by way of delivering a specific contents key for decoding ciphered contents data exclusively to those verified proper users. Further, such a system is also proposed, which initially ciphers such a contents data key for preventing a malfeasant from illegally duplicating contents data and then delivers the ciphered contents data key to verified proper users in order to decode the ciphered contents data key by applying such a decoding key solely reserved by the verified proper users whereby enabling them to utilize the delivered contents data key.

Generally, such a judgment to identify whether a corresponding user is verified as the proper one or not is executed prior to distribution of a contents data or a contents data key between a contents data provider for transmitting the contents and a specific device on the part of an individual user. When executing such a conventional authenticating process, initially, entity of the opposite party is confirmed, and then, such a session key solely effective for the related communication is generated. Only after completing the authenticating process, a contents related data or the contents data key is ciphered using thus generated session key to conduct the related communication. There are two kinds of authenticating methods including a mutual authentication by way of utilizing the above cited common key ciphering method and the other one utilizing the above cited open key ciphering method. However, in the case of the authentication utilizing the common key, another common key is required to deal with an expanded system construction, thus generating inconvenience in the process for renewing the related keys. On the other hand, in the case of utilizing the open key ciphering method, calculation load and the volume of required memory are respectively large. Accordingly, it is by no means desirable to further provide individual devices with additional processing means.

SUMMARY OF THE INVENTION

The present invention provides a data processing apparatus, a data processing method, and a program providing medium. More particularly, the present invention provides such a data processing system by way of utilizing a hierarchy key tree structure which enables a variety of data to be transmitted safely to restrictive authenticated proper users exclusively without relying on mutual authentication process between transmitters and receivers of relevant data, and yet, the inventive data processing system utilizes such an enciphering key block for controllably and safely distributing enciphered keys solely to the corresponding properly licensed devices. Further, the inventive data processing system enables a plurality of key distribution approval data files each containing a header data comprising such "link-count" data for designating the number of contents data that should be enciphered by such enciphering keys acquirable based on (EKB) distribution key enciphering key enciphered by an enabling key block (EKB) to be stored in a memory device, whereby realizing more effective method of processing contents data.

According to the first practical aspect of the present invention, such a novel data processing apparatus is provided for reproducing a contents data from a memory device or recording a contents data into a memory device. The inventive data processing apparatus comprises the following: a plurality of enabling key block (EKB) distribution key enciphering keys (KEK) which are respectively enciphered by a plurality of enabling key blocks (EKB) containing enciphered data of renewal keys on such paths for constituting a key tree structure comprising a variety of keys disposed in correspondence with roots, nodes, and leaves on such paths ranging from roots to leaves of the key tree structure comprising a plurality of devices, wherein the (EKB) block also contains data of upper-rank keys enciphered via lower-rank keys; and a plurality of key distribution approval data files containing a header data consisting of "link-count" keys for designating the number of contents data that should be enciphered by the enciphering keys acquirable based on the (EKB) distribution key enciphering key (KEK) stored in the enabling key block (EKB), wherein the key distribution approval data files are stored in the above memory device.

According to a further practical aspect of the data processing apparatus related to the present invention, each of the key distribution approval data files contains a contents key enciphering key E (KEK, Kcon) comprising a contents data enciphering contents key (Kcon) enciphered by the key enciphering key (KEK).

According to a further practical aspect of the data processing apparatus related to the present invention, in correspondence with variation of the number of contents data that should be enciphered by enciphering keys acquirable based on the enabling key block (EKB) distribution key enciphering key (KEK) stored in the enabling key block (EKB), the data processing apparatus executes such a process for renewing the "link-count" data contained in the key distribution approval data files.

According to a further practical aspect of the data processing apparatus related to the present invention, the data processing apparatus stores such key enciphering keys (KEK) in a memory, which are acquirable by way of decoding the enabling key block (EKB) distribution key enciphering key contained in any of such key distribution approval data files containing a greater count number shown by a link-count data stored in a plurality of key distribution approval data files stored in a memory device.

According to a further practical aspect of the data processing apparatus related to the present invention, the data processing apparatus stores such key enciphering keys in memory, which are acquirable by way of decoding the above-cited enabling key block (EKB) distribution key enciphering key contained in any of such key distribution approval data files containing a greater count number shown by a link-count data among a plurality of key distribution approval data files stored in a memory device. Further, whenever processing contents data stored in a memory device, the data processing apparatus judges applicability of the key enciphering key (KEK) previously stored in the memory device, and then, if it is identified to be applicable, the data processing apparatus utilizes the key enciphering key (KEK) previously stored in the memory device. Conversely, if the above key enciphering key (KEK) previously stored in the memory device is identified to be inapplicable, the data processing apparatus solely reads the key distribution approval data files.

According to a further practical aspect of the data processing apparatus related to the present invention, version of the above referred enabling key block (EKB) distribution key enciphering key (KEK) which is enciphered and presented by the enabling key block (EKB) is subject to a controlling process by way of renewing every version.

According to a further practical aspect of the data processing apparatus related to the present invention, the data processing apparatus enciphers a plurality of leaf-keys by applying a storage key (Kstd) proper to the data processing apparatus itself and then stores the enciphered leaf-keys in a memory means loaded in the data processing apparatus.

These leaf-keys are respectively provided in correspondence with own leaves among a hierarchy key tree structure comprising a variety of keys disposed in correspondence with roots, nodes, and leaves on such paths ranging from roots to leaves of the key tree structure comprising a plurality of data processing apparatuses as own leaves.

According to a still further practical aspect of the data processing apparatus related to the present invention, a device key block (DKB) is stored in a memory means of the data processing apparatus. The device key block (DKB) itself corresponds to such an assemblage of enciphered keys comprising mutually different node keys which are individually enciphered in plural steps (depth) on such paths ranging from own leaves to upper-rank keys of the key tree structure based on such leaf-keys provided in correspondence with own leaves among the key tree structure comprising a variety of keys which are disposed in correspondence with roots, nodes, and leaves on such paths ranging from roots to leaves of the key tree structure comprising a plurality of data processing apparatus as own leaves.

According to the second practical aspect of the present invention, a novel data processing method for reproducing contents data from a memory device or recording contents data into a memory device is provided, wherein the data processing method comprises: a plurality of key distribution approval data files each containing a header data comprising "link-count" data designating the number of contents data that should be enciphered by such enciphering keys acquirable based on an enabling key block (EKB) which is enciphered by an enabling key block (EKB) containing enciphered data of renewal keys on such paths for constituting a hierarchy key tree structure comprising a variety of keys disposed in correspondence with roots, nodes, and leaves on such paths ranging from roots to leaves of the key tree structure comprising a plurality of devices as own leaves. The enabling key block (EKB) also includes such data of upper-rank keys enciphered via lower-rank keys as well. The key distribution approval data files are constantly stored in a memory device loaded in the data processing apparatus.

According to a further practical aspect of the data processing method related to the present invention, the above key distribution approval data files individually contain contents data enciphering data E (KEK, Kcon) comprising a contents enciphering key (Kcon) which is enciphered by the key enciphering key (KEK).

According to a further practical aspect of the data processing method related to the present invention, in correspondence with any variation of the number of contents data that should be enciphered by such enciphering keys acquirable based on the above enabling key block (EKB) distribution key enciphering key (KEK) stored in an enabling key block (EKB), the data processing method further executes a process for renewing the "link-count" data stored in the key distribution approval data files.

According to a further practical aspect of the data processing method related to the present invention, the data processing method stores and preserves the above key enciphering key (KEK) in memory. The key enciphering key (KEK) is acquirable by way of executing such a process for decoding the enabling key block (EKB) distribution key enciphering key (KEK) contained in such a key distribution approval data file having a greater count number designated by a "link-count" data among a plurality of key distribution approval data files stored in the above memory device.

According to a still further practical aspect of the data processing method related to the present invention, the data processing method stores and preserves the above key enciphering key (KEK) in memory. The above key enciphering key (KEK) is acquirable by way of executing such a process for decoding the enabling key block (EKB) distribution key enciphering key (KEK) contained in such a key distribution approval data file having a greater count number designated by a "link-count" data among a plurality of key distribution approval data files stored in the above memory device.

Further, whenever processing contents data stored in a memory device, the data processing method judges applicability of the key enciphering key (KEK) previously stored in a memory device, and then, solely in the case in which the key enciphering key (KEK) is identified to be applicable, the data processing method utilizes such a key enciphering key (KEK) previously stored in memory. On the other hand, if the above key enciphering key (KEK) is identified to be inapplicable, then, the data processing method solely reads the key distribution approval data files.

According to the third practical aspect of the present invention, such a program providing medium is provided, which provides such a computer program to enable a computer system to execute a data processing process via reproduction of contents data from a memory device or via recording of contents data into a memory device. The program providing medium executes those processes including the following: a step of storing and preserving a key enciphering key in memory; wherein the key enciphering key is acquirable by way of executing such a process for decoding an enabling key block (EKB) distribution key enciphering key contained in such a key distribution approval data file having a greater count number designated by a "link-count" data among a plurality of key distribution approval data files stored in a memory device; and a step of judging applicability of such a key enciphering key (KEK) previously stored in said memory in the course of processing a contents data stored in said memory device, wherein if the above key enciphering key is identified to be applicable, then, the data processing system utilizes the key enciphering key (KEK) previously stored in said memory device, whereas solely in the case in which if the above key enciphering key (KEK) is identified to be inapplicable, then the above data processing system solely reads the above key distribution approval data files.

The program providing medium according to the third aspect of the present invention provides such a general-purpose computer system with a wide variety of program codes readable by a corresponding computer. There is no specific restriction on the kinds of program providing medium, i.e., it may comprise a CD, a DVD, an MO, or network service lines, for example.

The program providing medium defines structural or functional cooperative relationship between computer programs and program providing media in order to realize proper function of a predetermined computer program on a computer system. In other words, by way of installing a computer program into a computer system via the program providing medium, cooperative action will be exerted on the computer system, whereby generating such useful actions and functions identical to those which can be realized by the above practical aspects of the present invention.

Still further aspects, features, and advantages of the present invention will more fully be known from the practical forms of the embodiments as well as from the detailed description in reference to the accompanying drawings related thereto.

BRIEF DESCRIPTION OF THE DRAWINGS

In the accompanying drawings:

FIG. 4 presents examples of the enabling key block (EKB) used for distributing a variety of keys and data in the data processing system related to the present invention;

FIG. 8 presents a structure of the enabling key block (EKB) and a structure of data to be distributed in conjunction with contents keys and contents data in the data processing system related to the present invention;

FIG. 12 is explanatory of the process for generating a simplified enabling key block (EKB) in the data processing system related to the present invention;

FIG. 19 presents a schematic structure of data stored in a data file in the data processing system related to the present invention;

FIG. 20 presents a further detail of the structure of data stored in the reproduction controlling data file in the data processing system related to the present invention;

FIG. 21 presents a further detail of the structure of data stored in a data file in the data processing system related to the present invention;

FIG. 22 presents part of attribute header data stored in a data file in the data processing system related to the present invention;

FIG. 23 presents part of attribute header data stored in a data file in the data processing system related to the present invention;

FIG. 24 presents kinds of operating mode and recording time under respective operating modes in the data processing system related to the present invention;

FIG. 25 is explanatory of copy controlling data in the data processing system related to the present invention;

FIG. 26 presents part of attribute header data stored in a data file in the data processing system related to the present invention;

FIG. 27 presents a schematic arrangement of header data in respective data blocks of a data file in the data processing system related to the present invention;

FIG. 31 presents a format of data file for approving distribution of keys in the data processing system related to the present invention;

FIG. 40 designates a format of pool page for storing the ICV value in the data processing system related to the present invention;

DETAILED DESCRIPTION

[Summary of the Data Processing System]

Figure 1:
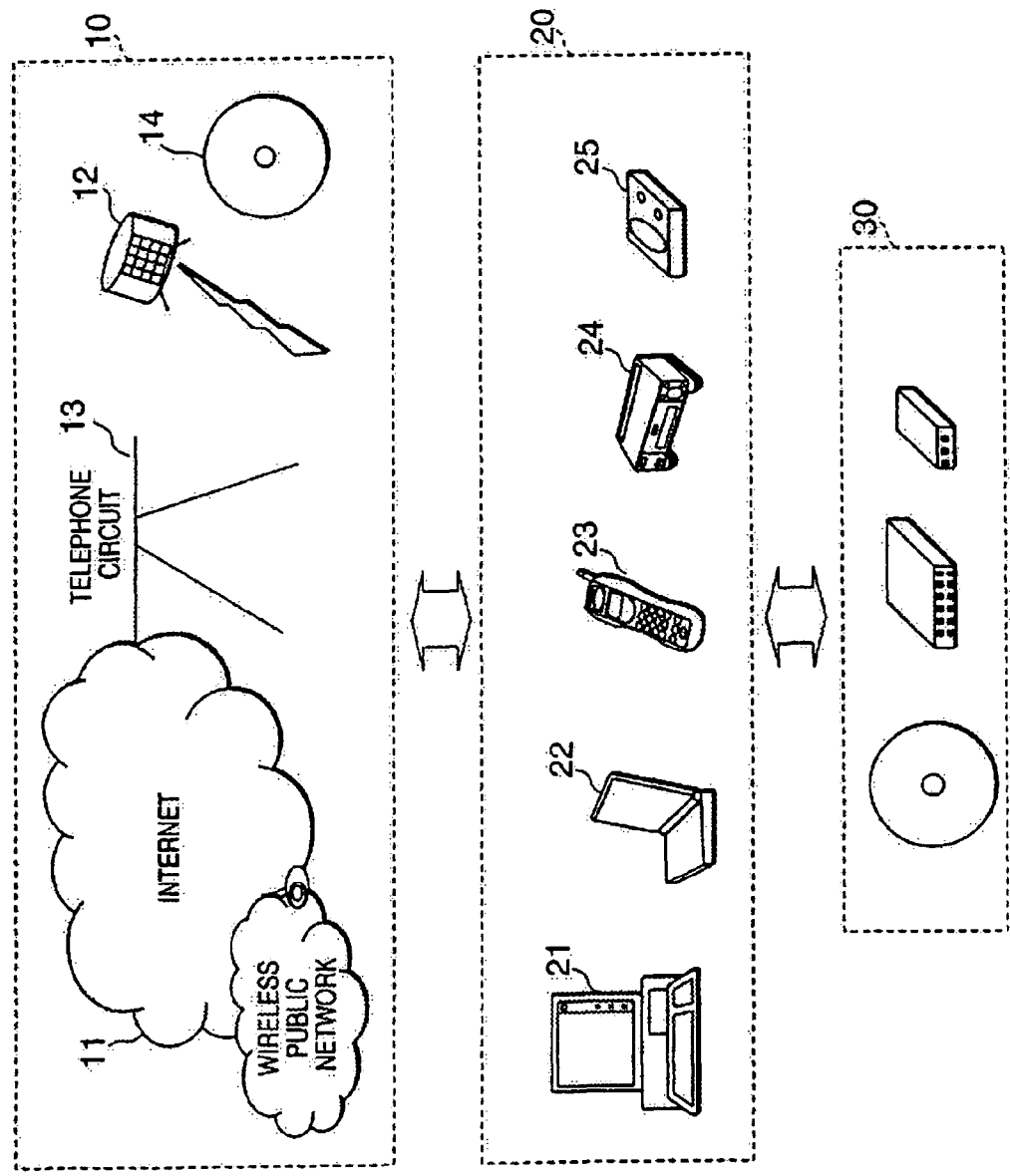
FIG. 1 presents an overall conceptual schematic arrangement for explanatory of the data processing system related to the present invention.

FIG. 1 illustrates an example of a contents data distribution system to which the inventive data processing system is applicable. A contents data distributing means 10 transmits a variety of ciphered data comprising contents data or contents keys, specific keys for effecting authentication, or the like, to a data processing means 20. Then, the data processing means 20 initially decodes the received contents data or contents keys held in the ciphered condition, and then acquires these decoded contents data or contents key before eventually reproducing picture data and audio data or executing a variety of programs. Exchange of data between the contents data distributing means 10 and the data processing means 20 is executed via network service lines such as internet service lines or via distributable recording media such as DVD (Digital Versatile Disc), CD (Compact Disc), and other means.

The data processing means 20 stores a variety of data in a data memory means 30 such as a memory card incorporating a memory means such as a flash memory or the like. The data memory means 30 includes such a memory means incorporating ciphering function, for a concrete example, memory means includes a "Memory Stick", which is a registered trade name of Sony Corporation. Whenever shifting data from the data processing means 20 to the data memory means 30 and vice versa, a mutual authentication process and a data ciphering process are executed to prevent unauthorized duplication of contents data and keys from being committed.

It is also possible to shift contents data between respective apparatuses included in the data processing means 20 by way of executing a mutual authentication process and a data ciphering process between component apparatuses.

The contents data distributing means 10 comprises an internet service line 11, a satellite broadcasting station 12, a telephone circuit line 13, recording media 14 including a DVD, CD, or the like. On the other hand, the data processing means 20 may be a personal computer 21, a PD (Portable Device) 22, a portable electronic apparatus 23 such as a portable telephone set, a PDA (Personal Digital Assistants), or the like, a digital data reproducing apparatus 25 utilizing a recording and reproducing means such as a DVD and a CD, or the like, a game playing terminal unit 24, a memory card such as the "Memory Stick" which is a registered trade name of Sony Corporation, for example. Individual devices of the data processing means 20 are respectively capable of acquiring contents data delivered from the contents data distributing means 10 via a communication means such as a network service line, or from other data processing means, or from the data memory means 30 as cited above.

Figure 2:
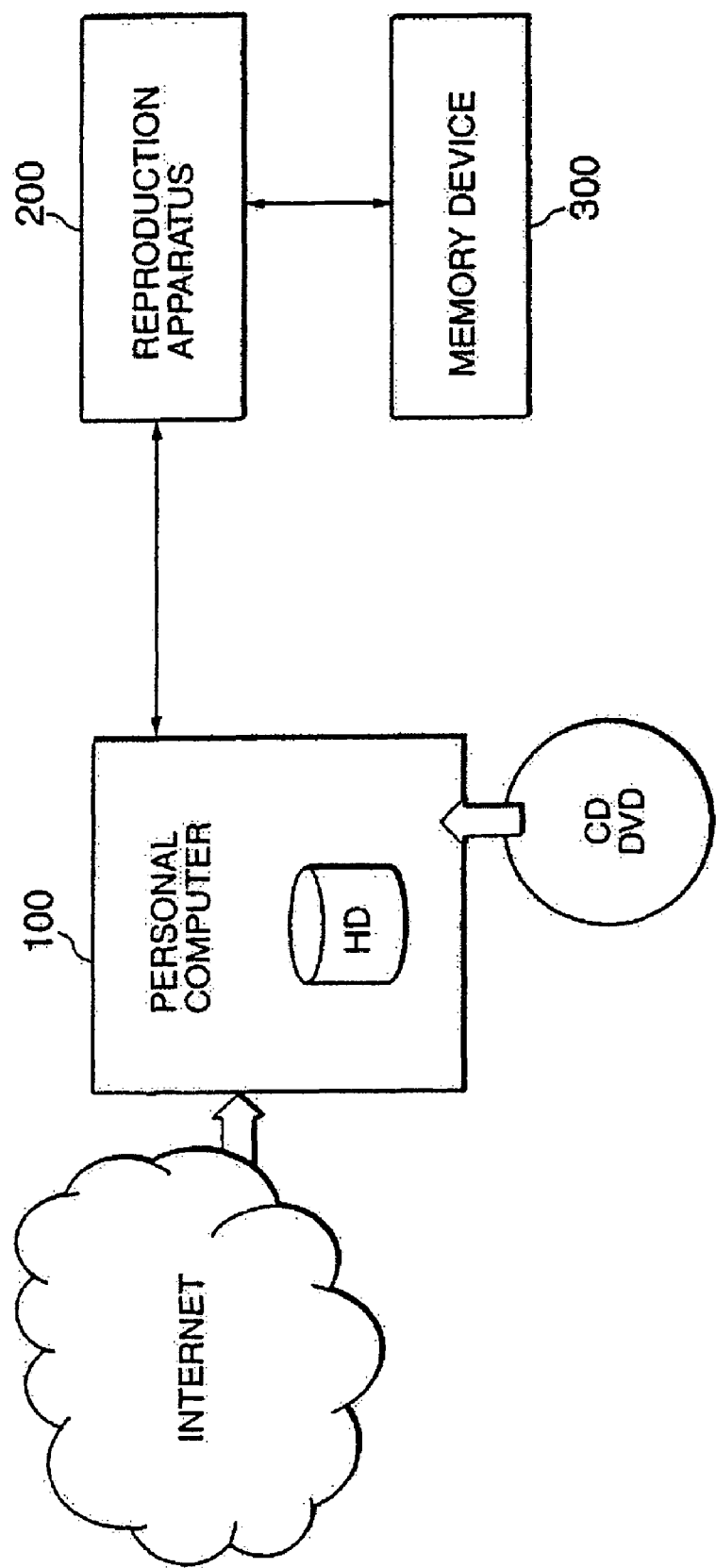
FIG. 2 presents an overall schematic arrangement of the system and data used for the data processing system related to the present invention.

FIG. 2 schematically illustrates a typical example of a process for shifting contents data. The system shown in FIG. 2 exemplifies a process for shifting contents data among a personal computer 100, a reproducing apparatus 200, and a storage device 300. The personal computer 100 incorporates a HD (Hard Disc) and also such a mechanism for internally loading an external memory medium such as a CD or a DVD, for example.

The personal computer 100 can be connected to a variety of network service lines such as internet service lines and public telephone circuit lines or the like. For example, it is possible for the personal computer 100 to receive a variety of data including audio data, picture data, and programs via a network service line from a host computer owned by a service provider (not shown) presenting data service via an EMD (Electronic Music Distribution), and then, decode the received data as required before delivering the decoded data to the reproducing apparatus 25. When receiving a contents data, the personal computer 100 executes an authentication process and a money levying process as required between a host computer owned by a service provider. Further, the personal computer 100 also outputs a variety of data received via a CD or a DVD to the data reproducing apparatus 200.

The storage device 300 can be loaded in and unloaded from the data reproducing apparatus 200. The above-cited "Memory Stick" being a product and a registered trade name of Sony Corporation functioning itself as the storage device 300 incorporates a rewritable semiconductor memory such as a flash memory.

As shown in FIG. 2, whenever processing for shifting data, reproducing data such as music data and picture data, recording data and duplicating data among the above described personal computer 100, the reproducing apparatus 200, and the storage device 300, a mutual authentication process is executed among data shifting devices, whereby preventing data from being shifted by applying unauthorized equipment. This process will be described later on. Further, whenever distributing contents data via network service lines or a variety of recording media or shifting contents data between the above personal computer 100 and a data reproducing apparatus or between a data reproducing apparatus and a storage device such as a memory card for example, security of the contents data can be preserved by way of ciphering the contents data.

[Tree Structure for Constituting a Key Distribution System]

Figure 3:
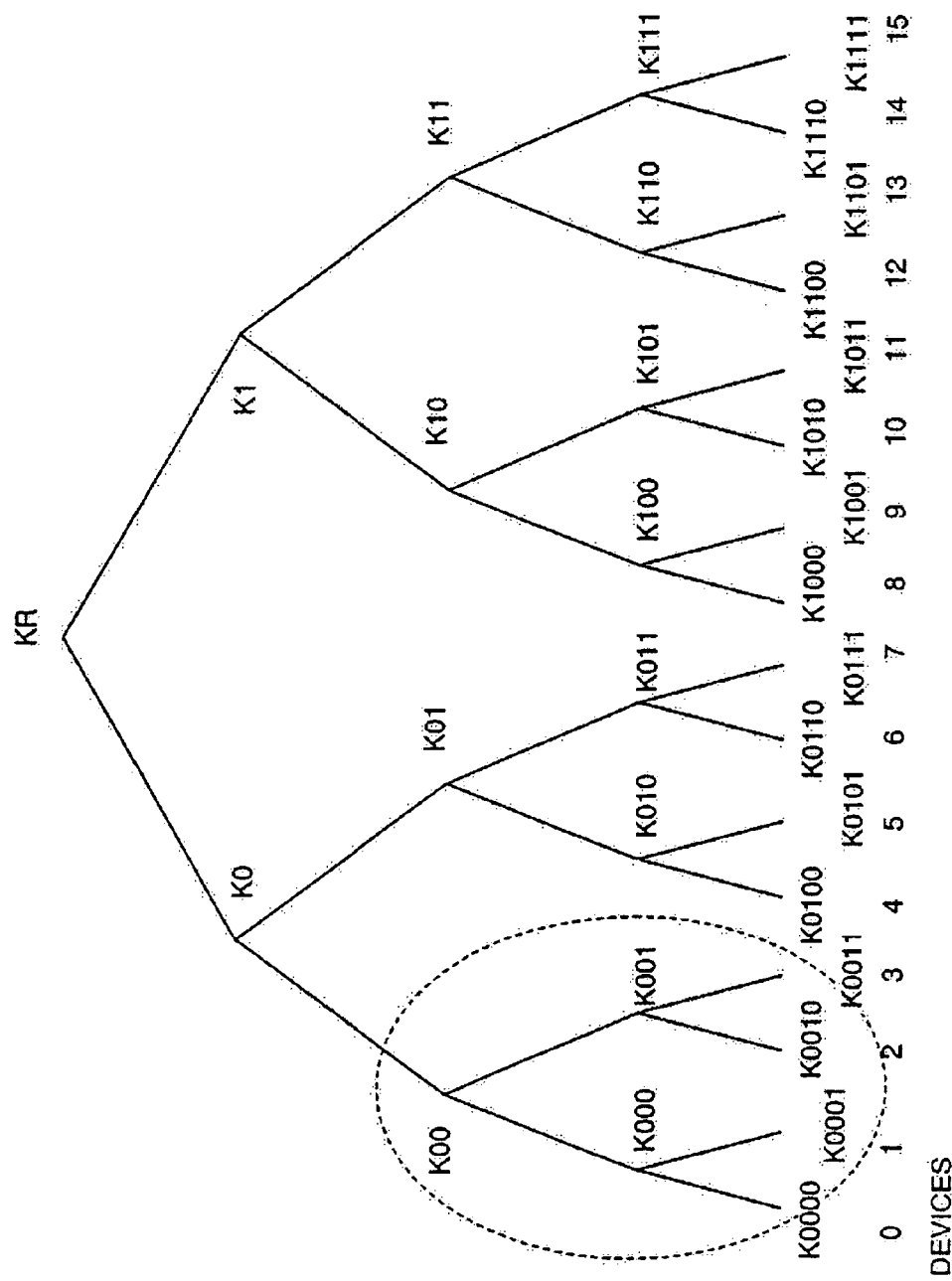
FIG. 3 presents a schematic diagram of a hierarchical key tree structure for explanatory of processes for ciphering a variety of keys and data in the data processing system related to the present invention.

Referring now to FIG. 3, a hierarchical key tree construction is described below, which ensures the system to safely enable to distribute to the properly licensed devices such ciphering keys for ciphering the above-cited contents data, for example, such a variety of ciphering keys including such a contents data key for ciphering contents data or contents data key ciphering key for properly ciphering contents data.

Reference numerals 0 to 15 shown at the bottom portion of FIG. 3 respectively designate individual devices for constituting the above referred data processing means 20 for reproducing and executing the relevant contents data, for example, these devices individually constitute a contents data (music data) reproducing device. In other words, each of individual leaves of the hierarchical tree structure corresponds to respective contents data reproducing device.

During the manufacturing stage or at the time of delivery from a manufacturing factory or at a certain time after the manufacturing process or delivery from a factory, each of those devices 0 to 15 stores a node-key allocated for a node from own leaf to a specific route and a key set comprising leaf keys of individual leaves in the hierarchical tree structure shown in FIG. 3 in a predetermined memory. The reference numerals K0000 to K1111 shown at the bottom of FIG. 3 individually designate the leaf keys allocated for individual devices 0 to 15. It is so arranged that those keys KR (Root key) to K111 described at the second node from the bottom rank respectively constitute node keys.

In the tree structure shown in FIG. 3, for example, the device 0 is provided with a leaf key K0000 and node keys K000, K00, K0, and KR. The device 5 is provided with a key K0101, K010, K01, K0, and KR. The device 15 is provided with a key K1111, K111, K11, K1, and KR. The tree structure shown in FIG. 3 comprises 16 devices ranging from 0 to 15, and yet, the tree structure itself comprises 4 stage components which are symmetrically balanced in both directions. However, it is also possible to provide the tree structure with more devices and a different number of stages in various portions of the tree structure as well.

Each of the devices provided for the tree structure shown in FIG. 3 incorporates such a device capable of utilizing a variety of storage devices comprising various recording media including such a memory card utilizing a built-in type flash memory or a detachable flash memory, a DVD, or a CD, or a MD (Mini Disc), for example. In addition, a variety of application services may also be provided jointly. Based on the jointly existent devices and application services of different kinds, the hierarchical tree structure for distribution of contents data or ciphering keys is utilized for implementing the present invention.

In the system in which a variety of devices and applications are jointly existent, it is so arranged that the above devices 0, 1, 2, and 3, corresponding to the portion encircled by dotted line shown in FIG. 3 are installed as a single group utilizing an identical recording medium. For example, after a ciphering process, a provider delivers the ciphered common contents data or such a contents data key commonly usable by individual devices to those devices encircled by the dotted line. In another example, each of the devices outputs ciphered data related to payment of charge on the use of contents data to a provider or a financial organization. On the other hand, such a related party normally receiving and transmitting data from and to individual devices such as a provider or a financial organization designated for settling accounts executes a process for transmitting relevant data en bloc to the devices 0, 1, 2, and 3, corresponding to the portion encircled by dotted line shown in FIG. 3 as a single group. Actually, there are a plurality of such groups in the tree structure shown in FIG. 3. Such a related party normally receiving and transmitting data from and to individual devices such as a contents data provider or a financial organization functions itself as a means for distributing message data.

The above-referred node keys and leaf keys may integrally be controlled by a single key controlling center. Alternatively, it is also allowable to enable message data distributing means on the part of a provider or a financial organization designated for settling accounts normally exchanging a variety of data with individual groups to control the node keys and the leaf keys. In the event if the node key or the leaf key incurs leakage or theft, a updating process is executed by the key controlling center, or the related provider, or by the related financial organization.

As is apparent from FIG. 3, in the inventive tree structure, the above-referred three devices 0, 1, and 2, included in a group are individually provided with common node keys K00, K0, and KR. By way of utilizing the node key communizing structure, it is possible to solely provide the devices 0, 1, and 2, with a common contents key for example. For example, by way of installing the commonly held node key K00 itself as a contents key, it is possible to install such a contents key solely being common to the devices 0, 1, and 2, without delivering a new key. Further, by way of distributing a value Enc (K00, Kcon) comprising a new contents key (Kcon) ciphered by the node key K00 to the devices 0, 1, and 2, via a network service line or via storage in a recording medium, using the common node key K00 held by individual devices, it solely enables the devices 0, 1, 2, and 3, to decode the ciphered code value Enc (K00, Kcon) before acquiring the contents data key (Kcon). The Enc (Ka, Kb) designates such a data consisting of Kb which is ciphered by Ka.

Further, in such a case in which those keys K0011, K001, K00, K0, and KR, held by the device 3 are evidently disclosed via illegal analysis committed by a hacker, in order to protect data received and transmitted by such a group comprising the devices 0, 1, 2, and 3, thenceforth, it is essential that the device 3 shall be disengaged from the group system. To realize this, it is essential that the node keys K001, K00, K0, and KR shall respectively be replaced with new keys K(t) 001, K(t) 00, K(t) 0, and K(t) R, and yet, it is also necessary to notify the devices 0, 1, and 2 of the updated keys. The character K(t)aaa designates the new key updated from generation (t) of the preceding key Kaaa.

Next, the process for distributing updated key is described below. Renewal of key is solely executed by way of delivering such a table comprising a block data called enabling key block (EKB) shown in A of FIG. 4 to a network service line or via storage in a recording medium to the devices 0, 1, and 2. The enabling key block (EKB) is composed of such ciphering keys for distributing updated keys to those devices corresponding to individual leaves for constituting the tree structure shown in FIG. 3. The above enabling key block (EKB) may also be called the key renewal block (KRB).

The above-referred enabling key block (EKB) shown in A of FIG. 4 comprises such a block data bearing such a data construction in which only those devices requiring renewal of the node keys are renewable. The enabling key block (EKB) shown in A of FIG. 4 denotes such a block data formed for distributing updated node keys of the generation "t" in the devices 0, 1, and 2, sharing part of the key tree structure shown in FIG. 3. As is apparent from FIG. 3, the devices 0 and 1 respectively require provision of the renewable node keys including K(t) 00, K(t) 0, and K(t) R, whereas the device 2 requires provision of the renewable node keys including K(t) 001, K(t) 00, K(t) 0, and K(t) R.

As shown in A of FIG. 4, the above-referred enabling key block (EKB) contains a plurality of ciphering keys. The ciphering key at the bottom rank corresponds to Enc (K0010, K(t) 001). This corresponds to an updated node key K(t) 001 ciphered by the above-referred leaf-key K0010 owned by the device 2. By applying the leaf key of its own, the device 2 is enabled to decode the ciphered key whereby acquiring the updated node key K(t) 001. Further, using the updated node key K(t) 001, the device 2 is also able to decode the ciphering key Enc (K(t) 001 and K(t) 00) corresponding to the second lowest rank shown in A of FIG. 4, whereby acquiring the updated node key K(t) 00. In this way, the device 2 serially decodes the ciphering key Enc (K(t) 00 and K(t) 0) corresponding to the second uppermost rank shown in A of FIG. 4, and then also decodes the updated node key K(t) 0 and the ciphered key Enc (K(t) 0 and K(t) R) corresponding to the uppermost rank shown in A of FIG. 4, whereby acquiring the updated node key K(t) R. On the other hand, in terms of devices K0000 and K0001, node key K000 is not included from the renewable object, and thus, only K(t) 00, K(t) 0, and K(t) R are required as the renewable node keys. On the other hand, devices K0000 and K0001 respectively decode the ciphering key Enc (K000 and K(t) 00) corresponding to the third uppermost rank shown in A of FIG. 4, whereby acquiring the node key K(t) 00.

The devices K0000 and K0001 further decode the ciphering key Enc (K(t) 0 and K(t) 0) corresponding to the second rank shown in A of FIG. 4 whereby respectively acquiring the updated node key K(t) 0. The devices K0000 and K0001 further decode the ciphering key Enc (K(t) 0 and K(t) R) corresponding to the uppermost rank shown in A of FIG. 4, whereby respectively acquiring the updated node key K(t) R. In this way, it is possible for the devices 0, 1, and 2 to individually acquire the updated node keys including K(t) 001, K(t) 00, K(t) 0, and K(t) R. Index shown in A of FIG. 4 respectively designate absolute addresses of the node keys and leaf keys usable as the decoding keys.

It is not required to renew the node keys K(t) 0 and K(t) R corresponding to an upper rank of the key tree structure shown in FIG. 3. If it is necessary to renew only the node key K00, by way of applying the enabling key block (EKB) shown in B of FIG. 4, it is possible to distribute the updated node key K(t) 00 to the devices 0, 1, and 2.

The enabling key block (EKB) shown in B of FIG. 4 is applicable to such a case in which a new contents data commonly owned by specific groups is distributed. For concrete example, assume that those devices 0, 1, 2, and 3 of such a group encircled by a dotted line shown in FIG. 3 individually utilize a certain recording medium and require provision of a new contents data key K(t) con in common with each other. In this case, using a node key K(t) 00 updated from the node key K00 in common with the devices 0, 1, 2, and 3, such a data Enc (K(t) 00 and K(t) con) generated by way of ciphering an updated common contents data key K(t) con is distributed in conjunction with the enabling key block (EKB) shown in B of FIG. 4. As a result of this distribution process, such a contents data key can be distributed as the data that can not be decoded by those devices of other groups including the device 4.

In other words, by way of enabling the devices 0, 1, and 2 to decode the above-referred ciphered characters by applying K(t) 00 generated via utilization of the enabling key block (EKB), it is possible to acquire a contents key K(t) con at such a moment corresponding to 'T'.

[Distribution of Contents Key Availing of the (EKB)]

Figure 5:
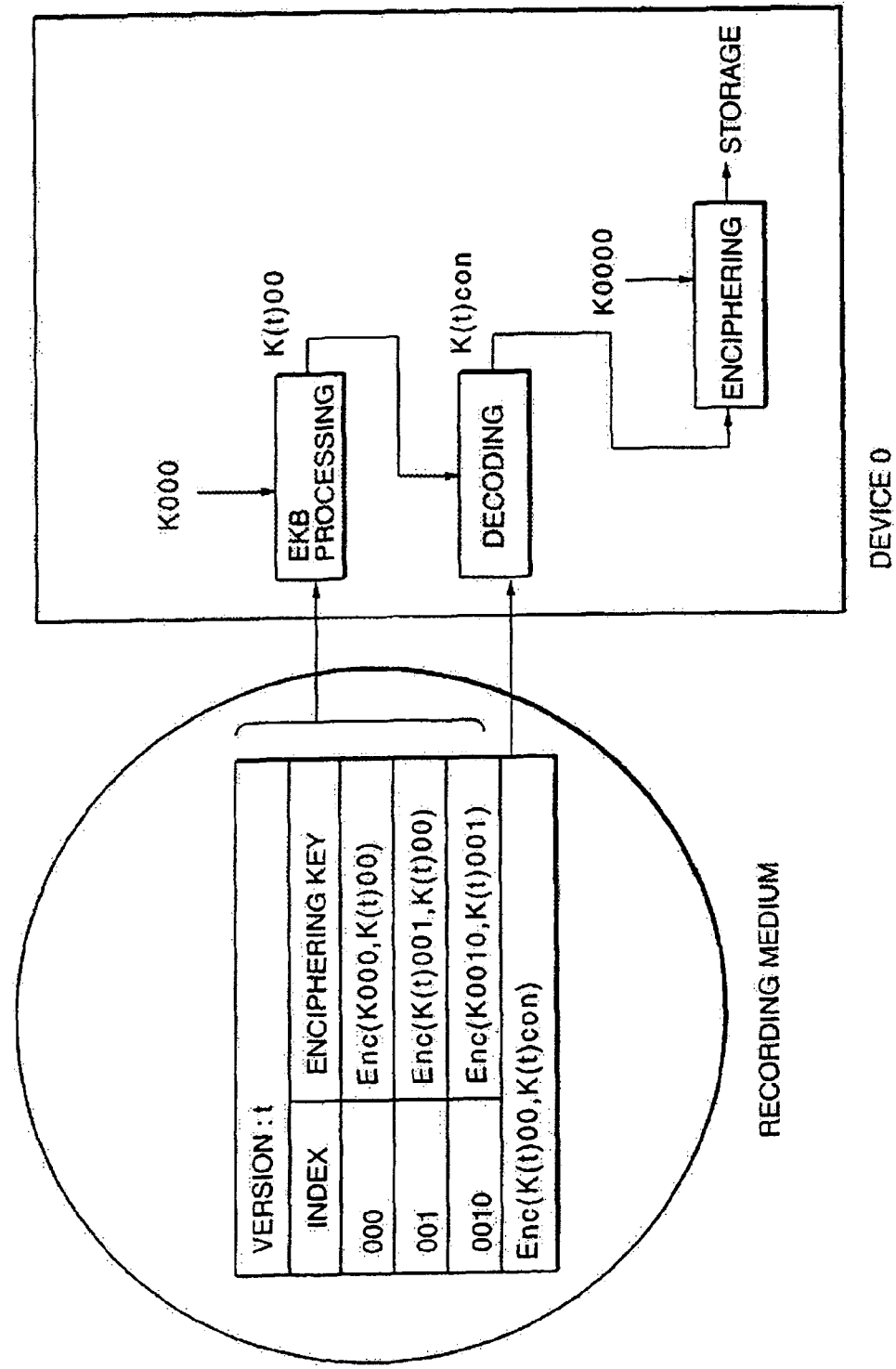
FIG. 5 presents examples of key/data distribution and decoding processes using the enabling key block (EKB) of a contents key in the data processing system related to the present invention.

FIG. 5 presents such a process executed by a device 0 which has received data Enc K(t) 00 and K(t) con ciphered from a updated common contents key K(t) con by applying K(t) 00 as an example of a process to generate a contents key K(t) con at such a moment corresponding to "t" and also the (EKB) shown in B of FIG. 4 respectively received via a recording medium. Concretely, this exemplifies such a case in which message data ciphered by applying the (EKB) is converted into the contents key K(t) con.

As shown in FIG. 5, using the (EKB) corresponding to generation time "t" stored in a recording medium and a node key K000 previously stored in the device 0 itself, by way of executing such an (EKB) process identical to that is described above, the device 0 generates a node key K(t) 00. Further, by way of decoding a updated contents key K(t) con by applying the decoded updated node key K(t) 00, the device 0 ciphers the updated contents key K(t) con by applying a leaf key K000 exclusively owned by the device 0 itself, and then, in order to utilize the updated contents key K(t) con later on, the device 0 stores the ciphered updated contents key K(t) con in itself.

[Format of the (EKB)]

Figure 6:
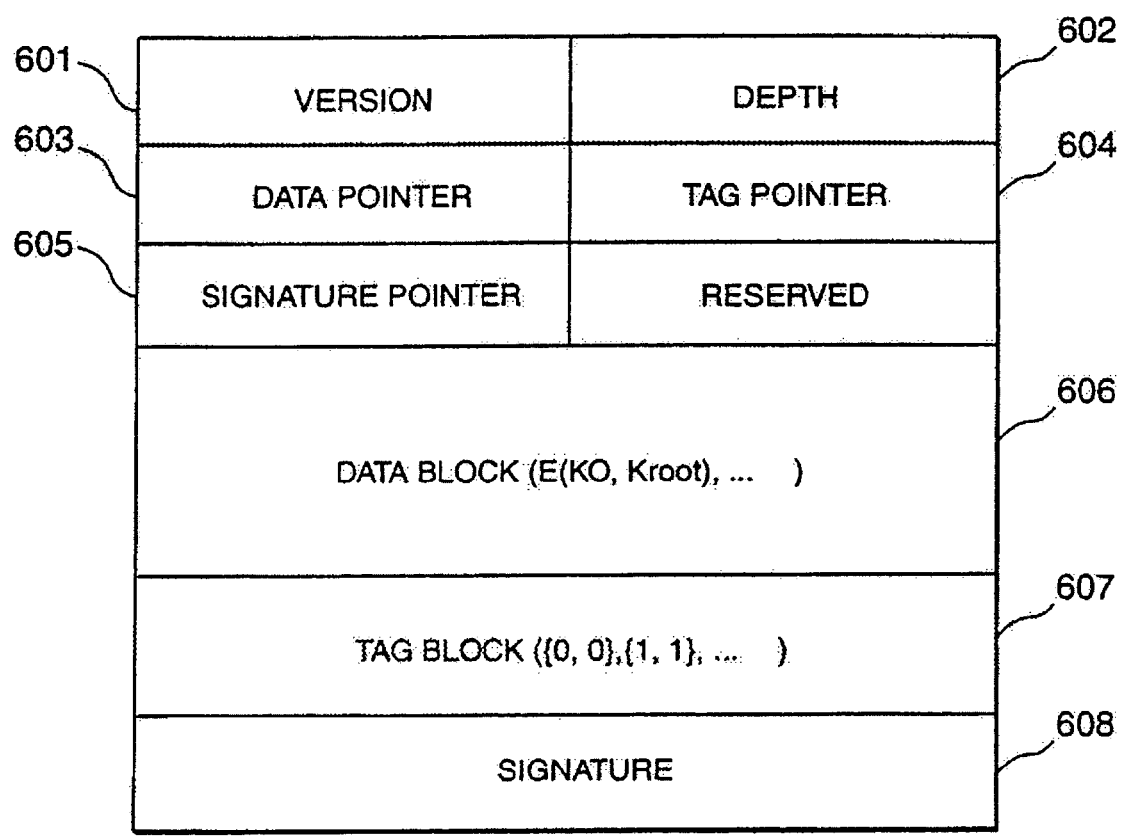
FIG. 6 presents a typical format of the enabling key block (EKB) in the data processing system related to the present invention.

FIG. 6 exemplifies a format of the enabling key block (EKB). Version 601 corresponds to such an identifying element for designating version of the enabling key block (EKB). The version incorporates such a function for designating corresponding relationship between such a function to identify the latest (EKB) and contents data. Depth designates the number of stratum of the hierarchical key tree against devices as destination of the enabling key block (EKB) being distributed. Data pointer 603 corresponds to such a pointer for designating position of the data portion in the enabling key block (EKB). Tag pointer designates position of the tag portion. Signature pointer designates the signature position.

Data portion 606 stores such a data comprising ciphered node keys to be updated. For example, the data portion 606 stores those ciphering keys related to the updated node keys shown in FIG. 5.

Figure 7:
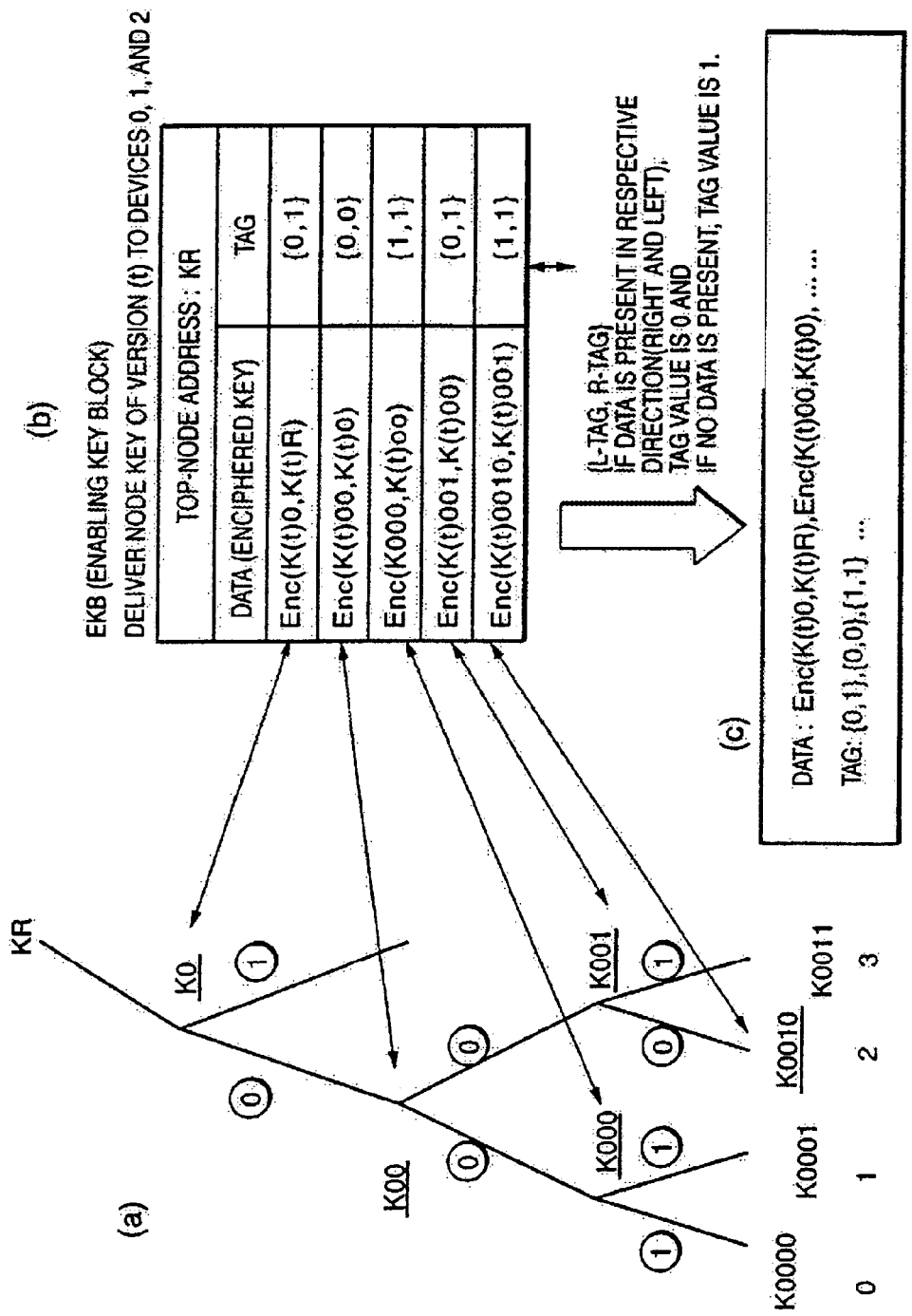
FIG. 7 presents a schematic diagram of tag of the enabling key block (EKB) in the data processing system related to the present invention.

Tag portion 607 designates positional relationship between ciphered node keys and leaf keys stored in the data portion 606. Next, by referring to FIG. 7, the rule for providing tag is described below. FIG. 7 designates an example of delivering the enabling key block (EKB) described earlier by referring to A of FIG. 4 as a data. This data corresponds to the one shown in (b) of FIG. 7 via a table. Such an address of a top node contained in the ciphering key is assumed as the top-node address. In this case, since an updated key K(t) R of root key is also contained in the ciphering key, the top-node address becomes KR. In this case, data Enc (K(t) 0 and K(t) R) in the uppermost rank is at such a position in the hierarchical key tree shown in (a) of FIG. 7. The next data corresponds to Enc (K(t) 00 and K(t) 0), which is at a lower position shown to the left of the preceding data in the hierarchical key tree. When the above data is present, tag value becomes 0, whereas if the above data is absent, tag value becomes 1. Tag is arranged to be a L (left) tag and an R (right) tag. Inasmuch as data is present to the left of the uppermost data Enc (K(t) 0: K(t) R), the left tag becomes 0. However, inasmuch as no data is present to the right of the uppermost data, the right tag becomes 1. In this way, all the data are provided with tags whereby forming such a data array and such a tag array shown in (c) of FIG. 7.

The above-referred tag is provided in order to specify actual position of a data Enc (Kxxx, Kyyy) in the hierarchical key tree structure. The key data Enc (Kxxx, Kyyy) stored in the data portion merely corresponds to an enumerative data of ciphered keys, and thus, it is so arranged that actual position of ciphering keys stored as data can be identified by applying tag. Alternatively, in place of utilizing the above-referred tag, by applying such a node index compatible with ciphered data as described earlier by referring to FIG. 4, it is also possible to form such a data construction shown below.

0: Enc (k (t) 0, k (t) root)
00: Enc (k (t) 00, k (t) 0)
000: Enc (k (t) 000, K (T) 00)

Nevertheless, when utilizing the above data construction by applying the above node index, volume of such lengthy data further increases, and thus, it is not desirable to utilize such lengthy data for distribution via a network service line. On the other hand, by way of utilizing the above-referred tag as index data for designating actual position of keys, it is possible to identify actual position of relevant keys by applying a small amount of data.

Referring again to FIG. 6, format of the enabling key block (EKB) is further described below. Signature comprises such an electronic signature executed by those who have issued the enabling key block including the key controlling center, a contents data provider, and such a financial organization being concerned. Such a device in receipt of the enabling key block (EKB) confirms via signature verification that the received enabling key block (EKB) exactly corresponds to the one duly issued by a verified proper publisher of the enabling key block (EKB).

[Distribution of Contents Key and Contents Data Via Utilization of (EKB)]

In the above-referred practical forms of the present invention, an example of distribution of the contents data in conjunction with the enabling key block (EKB) has specifically been described. The following description further refers to such a structural arrangement by way of distributing a contents data ciphered with a ciphering key, such contents keys ciphered by applying contents key ciphering keys, and contents key ciphering keys ciphered by means of the enabling key block (EKB) altogether.

FIG. 8 designates structure of individual data. In the structure shown in (a) of FIG. 8, Enc (Kcon, contents) 801 corresponds to such a data comprising such a contents data ciphered by a contents key (Kcon). Enc (KEK, Kcon) 802 corresponds to such a data comprising a contents key (Kcon) by applying a contents key ciphering key (Key Encryption Key (KEK)). Enc (EKB, KEK) 803 corresponds to such a data comprising the contents key ciphering key (KEK) ciphered by means of the enabling key block (EKB).

In this case, the contents key ciphering key (KEK) may comprise of such node keys (K000, K00) shown in FIG. 3, or the root key (KR) itself, or such node keys (K000, K00), or it may also consist of such a key ciphered by the root key (KR).

FIG. 8 designates such an example in (b) in which a plurality of contents data are recorded in recording media, where these contents data individually utilize an identical Enc (EKB, KEK) 805. In this kind of structure, it is also possible to add such a data designating linking destination to be linked with Enc (EKB, KEK) to individual data without directly adding an identical Enc (EKB, KEK) to individual data.

Figure 9:
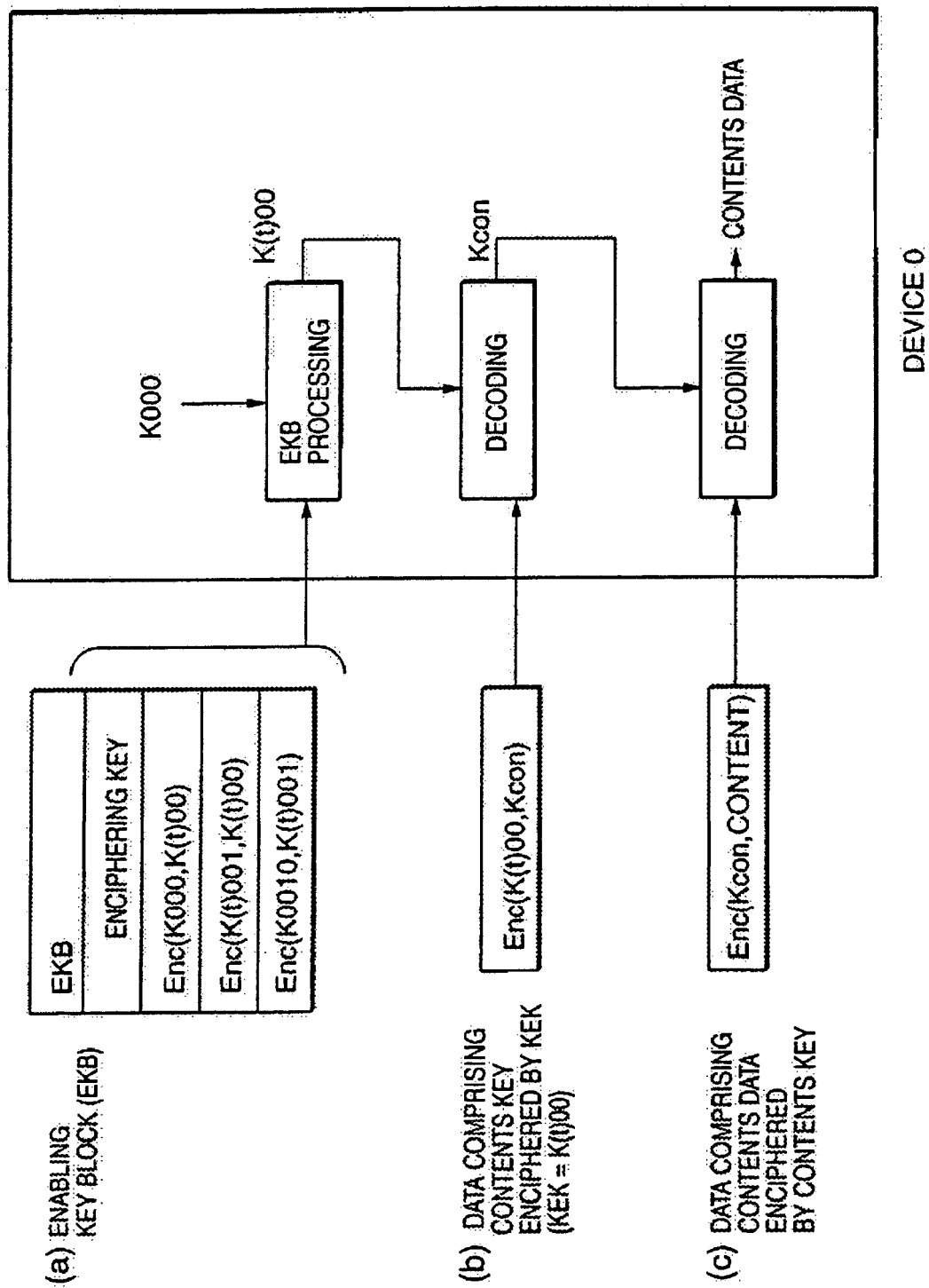
FIG. 9 presents another example of the structure of the enabling key block (EKB) and the structure of data to be distributed in conjunction with contents keys and contents data in the data processing system related to the present invention.

FIG. 9 exemplifies such a structural arrangement in which the contents key ciphering key (KEK) is converted into an updated node key k (t) 00 via renewal of a node key K00 shown in FIG. 3. In this case, assuming that a device 3 is revoked via leakage of key for example in a group encircled by a dotted frame shown in FIG. 3, the remaining devices 0, 1, and 2, can individually acquire contents data by way of enabling them to receive the enabling key block (EKB) shown in (a) of FIG. 9, such a data comprising a contents key (Kcon) ciphered by applying a contents key ciphering key (KEK=k (t) 00) shown in (b) of FIG. 9, and such a data comprising a contents data ciphered by applying a contents key (Kcon) shown in (c) of FIG. 9 via distribution.

Serial decoding processes on the part of the device 0 are shown to the right of FIG. 9. Initially, the device 0 acquires a contents key ciphering key (KEK=k (t) 00) from the received enabling key block by utilizing own leaf key K000. Next, the device 0 acquires a contents key (Kcon) via a decoding process utilizing the acquired ciphering key k (t) 00. Next, the device 0 further decodes contents data by applying a contents key (Kcon). After completing these processes, the device 0 is enabled to utilize the decoded contents data. It is also possible for the devices 1 and 2 to acquire the contents key ciphering key (KEK=k (t) 00) by way of processing the enabling key block (EKB) via mutually different procedures, whereby enabling them to utilize the decoded contents data.

On the other hand, even when receiving such a data relevant to the enabling key block (EKB), those devices 4, 5, 6, . . . belonging to other groups shown in FIG. 3 can not acquire the contents key ciphering key (KEK=k (t) 00) by applying the leaf keys and node keys owned by themselves.

Likewise, the above-referred revoked device 3 can not acquire the contents key ciphering key (KEK=k (t) 00) by applying its own leaf key and node key. Specifically, only such devices authorized with the proper right are enabled to decode and utilize contents data.

By way of executing distribution of the above contents key via utilization of the enabling key block (EKB), it is solely possible for those who are entitled with the authenticated rights to safely and properly decode and distribute such a ciphered contents data by way of reducing volume of data.

The above-referred enabling key block (EKB), contents key, and the ciphered contents data can safely be distributed via network service lines. In this case, it is also possible to provide individual users with the above enabling key block, contents key, and the ciphered contents data via storage in a recording medium such as a DVD or a CD for example. In this case, by way of utilizing such a contents key generated via decoding of the enabling key block (EKB) stored in an identical recording medium before decoding the ciphered contents data stored in a recording medium, it is possible to realize distribution of such a ciphered contents data that can solely be utilized by applying such a leaf key and a node key owned by the verified proper distributor. In other words, it is possible to realize such a system for distributing contents data by way of restricting available devices on the part of users based on a simplified system construction.

Figure 10:
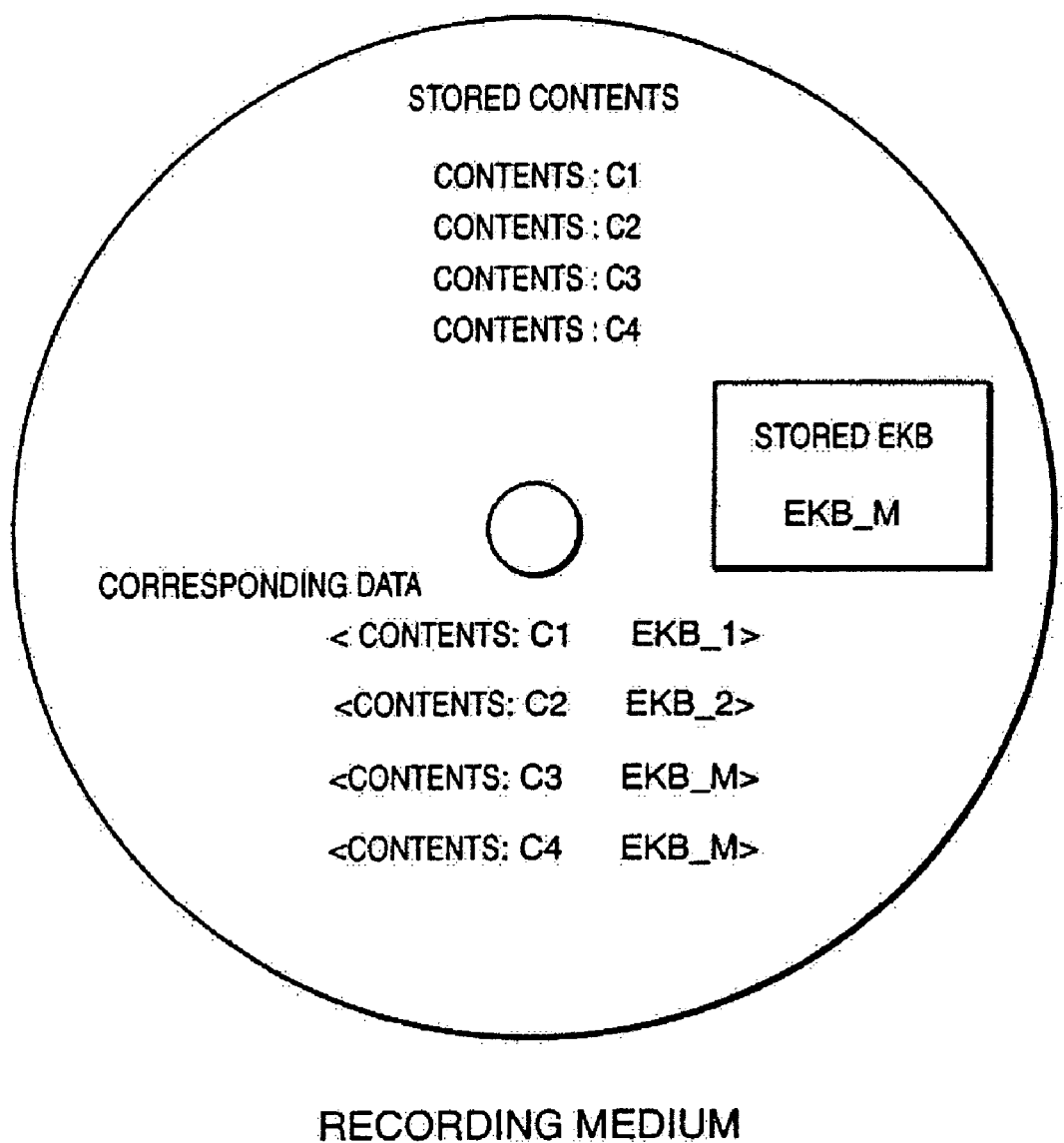
FIG. 10 is explanatory of the process when storing the enabling key block (EKB) and contents data in a memory device in the data processing system related to the present invention.

FIG. 10 exemplifies such a structure of a recording medium which stores the above-referred enabling key block (EKB) in conjunction with a ciphered contents data. In the example shown in FIG. 10, a plurality of contents data C1 to C4 and such data comprising the enabling key block (EKB) in correspondence with individual contents data are jointly stored in a recording medium. In addition, another enabling key block (EKB) corresponding to version M is also stored in this recording medium. For example, (EKB-1) is used for generating a contents key (Kcon-1) ciphered from a contents data 1. Likewise, (EKB-2) is used for generating a contents key (Kcon-2) ciphered from a contents data 2. In this example, an enabling key block (EKB-2) corresponding to version M is stored in a recording medium. Other contents data C3 and C4 individually correspond to an enabling key block (EKB-M), and thus, by way of decoding the enabling key block (EKM-M), it is possible to acquire contents keys corresponding to the contents data C3 and C4. On the other hand, inasmuch as the above referred (EKB-1) and (EKB-2) are not stored in a recording disc, it is thus necessary to acquire the (EKB-1) and (EKB-2) required for decoding individual contents keys via a new distributing means utilizing a network service line or a recording medium for example.

[Categorization of the Hierarchical Key Tree Structure]

The above description has referred to a variety of systems for providing the hierarchical key tree structure shown in FIG. 3 with those ciphering keys including root keys, node keys, leaf keys, contents keys, verifying keys, ICV generating keys, and yet, also referred to such a system for distributing program codes and data, by way of ciphering all of them in conjunction with the enabling key block (EKB).

Next, by way of classifying the hierarchical key tree structure defining node keys and others into categories per device, structural arrangements to effectively renew the above-referred keys and also effectively distribute ciphered keys and data are described below.

Figure 11:
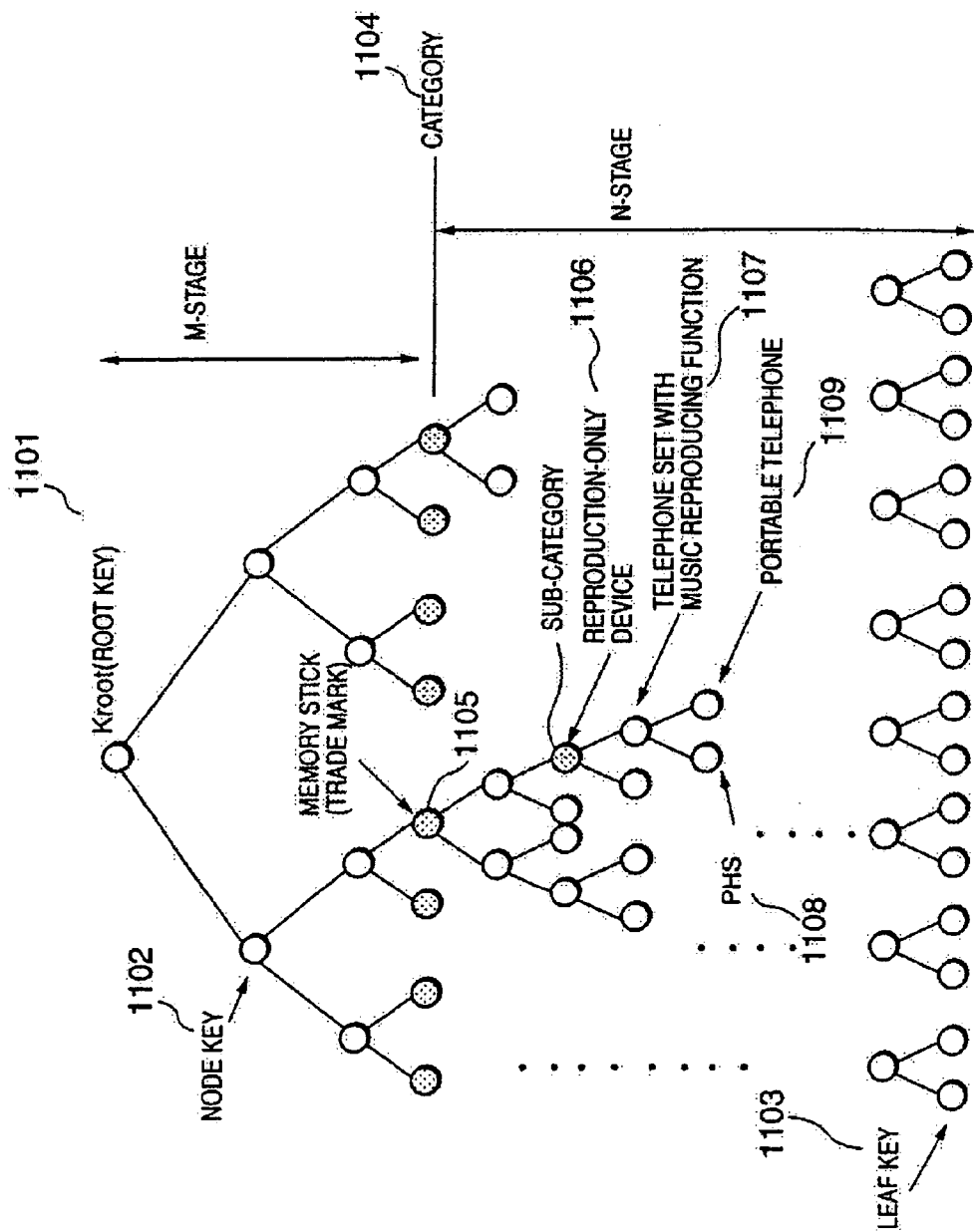
FIG. 11 is explanatory of an example of the hierarchical key tree structure classified per category in the data processing system related to the present invention.

FIG. 11 exemplifies a categorized hierarchical key tree stricture. In FIG. 11, a root key Kroot 1101 is installed to the uppermost rank of the hierarchical key tree structure. A node key 1102 is installed to an intermediary rank, whereas a leaf key 1103 is installed to the bottom rank. Each component device incorporates each own leaf key as well as series of node keys and root keys ranging from the leaf key to the root key.

For example, such a node corresponding to the M-th from the uppermost rank is installed as a category node 1104. Concretely, each of those nodes corresponding to the M-th rank is determined as a device-setting node of a specific category. Those nodes and leaves below the M+1 rank below one of the peak nodes corresponding to the M-th rank individually constitute such nodes and leaves related to devices contained in the corresponding category.

For example, a category "Memory Stick" which is a registered trade name of Sony Corporation is set to one of nodes 1105 corresponding to the M-th rank shown in FIG. 11. Accordingly, those nodes and leaves below the M-th rank are determined as the nodes and leaves solely usable for such a category comprising a variety of devices including the "Memory Stick". In other words, those nodes and leaves below the node 1105 are defined as an assemblage of nodes and leaves related to a device defined within a category of the "Memory Stick".

Further, it is also possible to set such a rank corresponding to several ranks below the M-th rank as a sub-category node 1106. For example, as shown in FIG. 11, such a node called reproduction-only device is set to a node two ranks below the node 1105 corresponding to the above-referred category "Memory Stick" as a sub-category node contained in a category of such a device utilizing the "Memory Stick". Further, a node 1107 related to a telephone set incorporating music reproducing function contained in the category of the reproduction only device is set below a node 1106 which corresponds to the "reproduction only device" being a sub-category node itself. Further, it is also possible to set a PHS (Personal Handy-Phone System) node 1108 and a portable telephone node 1109 contained in the category of such a telephone set incorporating music reproducing function below the node 1107.

Further, not only the kinds of device, but it is also possible to set category and sub-category based on such a node which is independently controllable by a specific individual manufacturer, a specific contents data provider, and a specific financial organization, in other words, based on a processing unit, a control unit, or based on the provided service, or on an optional unit (these units are hereinafter referred to as an "entity" en bloc). For example, when a certain category node is set as a peak node exclusively for a certain game player XYZ sold by a game-player manufacturer, it is possible to sell this game player XYZ by way of storing node-keys and leaf keys corresponding to ranks below the peak node. Then, distribution of ciphered contents data or distribution and renewal of a variety of ciphered keys are executed by generating the enabling key block (EKB) comprising those node keys and leaf keys below the peak node key. Concretely, only those data applicable to the devices below peak-point nodes can be distributed.

As mentioned above, by way of establishing such a system as the nodes related to specific categories or subcategories comprising such nodes below a peak node defined as the peak nodes, it is possible for a manufacturer and a contents-data provider controlling one of peak nodes to independently generate such an enabling key block (EKB) of a specific category or sub-category comprising a peak node in order to distribute the enabling key block (EKB) to such devices belonging to such nodes below the peak node, thus making it possible to renew relevant keys without totally affecting such devices belonging to such nodes of other categories other than the peak node.

[Key Distribution System by Applying Simplified (EKB)]

In the above-described key tree structure shown in FIG. 3 for example, when delivering a contents key to a predetermined device (leaf) for example, using a leaf key and a node key owned by a device being destination of key distribution, a decodable enabling key block (EKB) is generated for delivery to the destination. For example, in a key tree structure shown in (a) of FIG. 12, when transmitting a contents key to devices a, g, and j for composing leaves for example, such an enabling key block (EKB) decodable by individual nodes of the devices a, g, and j are generated for distribution.

For example, such a case is assumed, in which a contents key k (t) con is ciphered by applying an updated root key k (t) root and then distributed in conjunction with the enabling key block (EKB). In this case, using leaves and node keys shown in (b) of FIG. 12, an (EKB) process is executed to acquire the contents key k (t) root, and then, a contents key is acquired by executing a process for decoding a contents key k (t) con by applying the acquired updated root key k (t) root.

Figure 13:
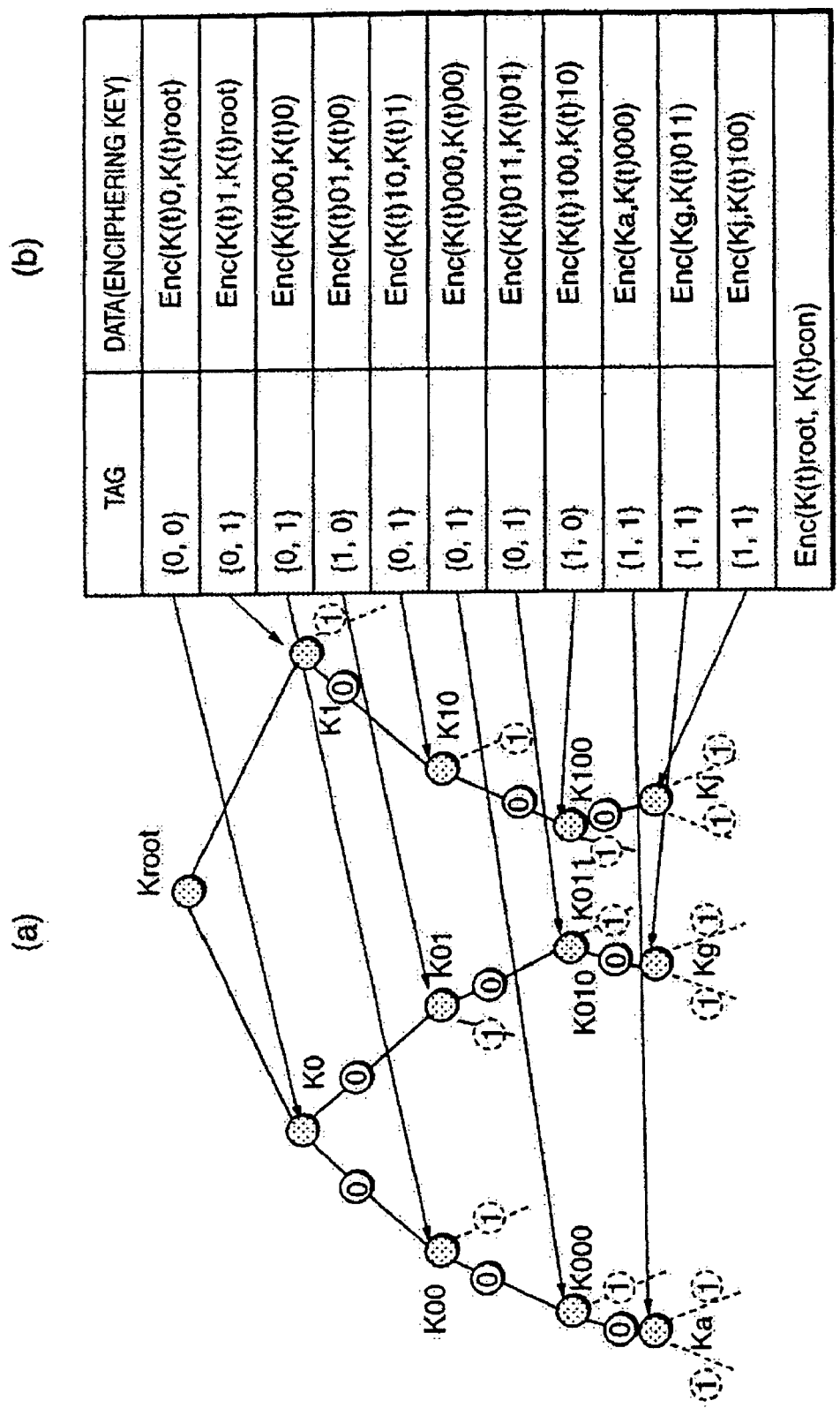
FIG. 13 is explanatory of the process for generating an enabling key block (EKB) in the data processing system related to the present invention.

FIG. 13 designates the structure of the enabling key block (EKB) provided for the above example. The enabling key block (EKB) shown in FIG. 13 complies with the format of the preceding enabling key block (EKB) described by referring to FIG. 6. The (EKB) shown in FIG. 13 incorporates ciphering key data and corresponding tags. As is described earlier by referring to FIG. 7, if there is any data in each of the right and left directions, the tag designates 0, whereas if no data is present in both directions, the tag designates 0.

On receipt of the enabling key block (EKB), based on the key for ciphering the enabling key block (EKB) and the corresponding tag, devices serially execute a process for decoding the ciphering key before acquiring such keys for renewing upper-rank nodes. As shown in FIG. 13, the greater the number of depth ranging from routes to leaves, the greater the volume of data contained in the enabling key block (EKB). Concretely, inasmuch as the depth is incremental relative to the number of devices (leaves), and thus, when there are more devices being destination of key distribution, volume of data in the enabling key block (EKB) is further incremental.

Figure 14:
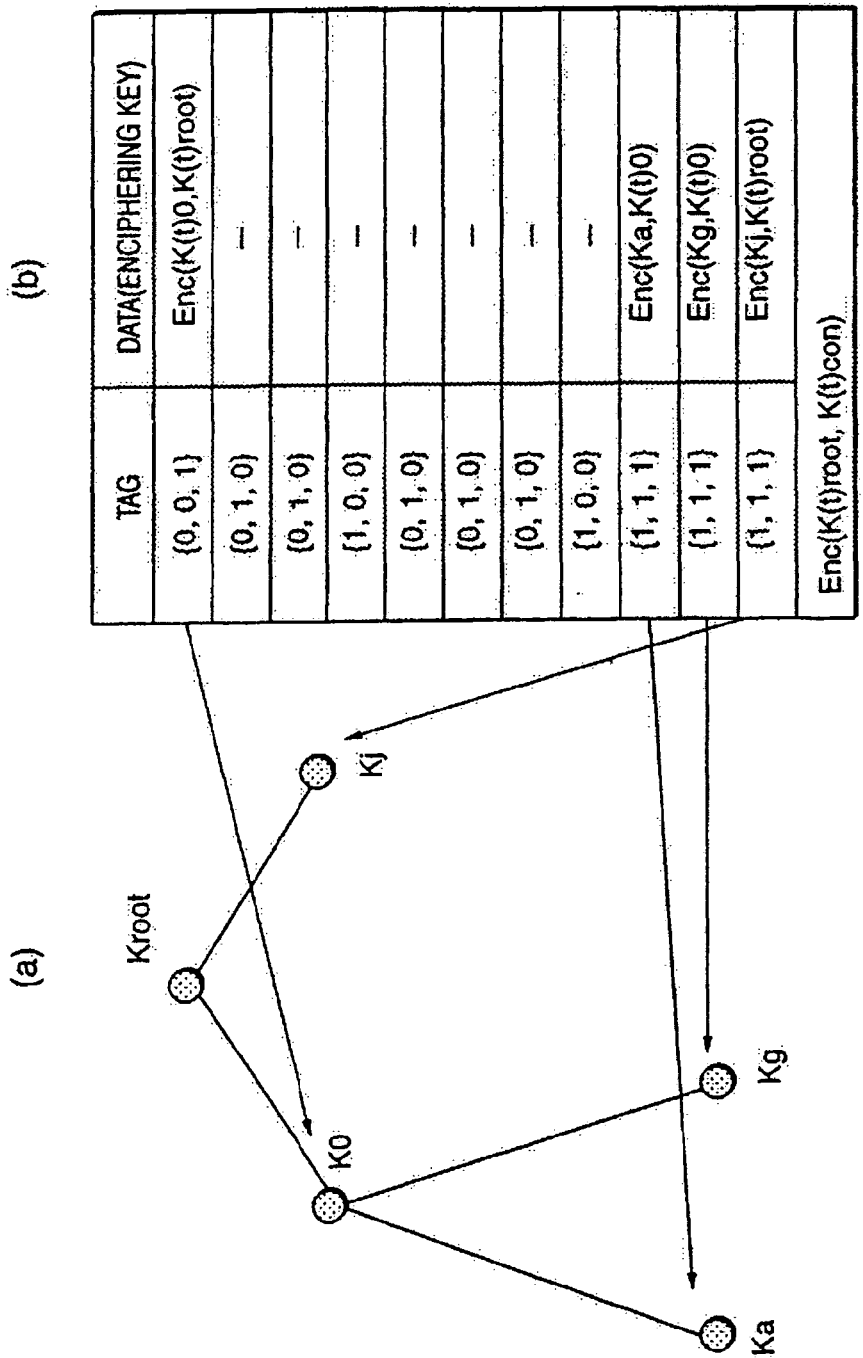
FIG. 14 is explanatory of the simplified enabling key block (EKB) in the data processing system related to the present invention.

Such a system construction enabling reduction of data volume of the enabling key block (EKB) is described below. FIG. 14 exemplifies such a structure of the enabling key block (EKB) which is simplified in correspondence with key distribution devices.

As in the case of FIG. 13, such a case is assumed, in which a contents key is transmitted to devices a, g, and j for composing leaves. As shown in (a) of FIG. 14, such a key tree structure solely consisting of key distributing devices is formed. In this case, based on the structure shown in (b) of FIG. 12, a new key tree structure shown in (b) of FIG. 14 is formed. The new key tree structure may be of such a form solely comprising a single branch without provision of branch at all in a range from Kroot to Kj. By way of solely providing a branching point at K0 between a range from Kroot to Ka and Kj, such a key tree structure with two branches shown in (a) of FIG. 14 is thus formed.

As shown in (a) of FIG. 14, such a simplified key tree structure solely bearing a node K0 is generated. Based on the simplified tree structure, such an enabling key block (EKB) is generated for distributing updated keys. The (a) of FIG. 14 designates such a hierarchical key tree structure reconstructed by deleting unnecessary nodes via selection of such paths for composing a bi-branch type tree structure comprising an enabling key block (EKB) as a decodable terminal node or leaf at the bottom rank. Such an enabling key block (EKB) used for distributing updated keys is structured solely based on such a key corresponding to nodes or leaves of the reconstructed hierarchical key tree structure.

The preceding enabling key block (EKB) described earlier by referring to FIG. 13 stores all the ciphered key data ranging from individual leaves a, g, and j, to Kroot. On the other hand, the above referred simplified enabling key block (EKB) solely stores such decoded data comprising those nodes for constituting the simplified key tree structure. As shown in (b) of FIG. 14, the above-referred tag comprises 3 bits, in which, the first and second bits respectively imply the same meaning as in the example shown in FIG. 13 and designate 0 whenever there is any data in the right and left directions, whereas the first and second bits designate 1 if no data is present in both directions. The third bit designates whether a ciphering key is stored in the enabling key block (EKB) or not, where the third bit designates 1 when any data is stored therein and it designates 0 if no data is present therein.

Compared to the structure shown in FIG. 13, the present enabling key block (EKB) shown in (b) of FIG. 14 delivered to devices (leaves) via a data communication network service line or under storage in a recording medium contains such a data volume sharply reduced from that of the preceding (EKB). On receipt of the enabling key block (EKB) shown in FIG. 14, by way of solely decoding such data corresponding to the portion at which binary code 1 is stored in the third bit of the tag in succession, individual devices are enabled to decode a predetermined ciphering key. For example, the device a decodes a ciphered data Enc (Ka, k (t) 0) with a leaf key Ka and then acquires a node key k (t) 0. Next, the device a decodes a ciphered data Enc (k (t) 0, k (t) root) by applying the node key k (t) 0 whereby acquiring a decoded data k (t) root. Another device j decodes a ciphered data Enc (Kj, k (t) root) via a leaf key K1 whereby acquiring a decoded data k (t) root.

As mentioned above, by way of initially forming a simplified new key tree structure solely comprising such devices corresponding to distributive destinations followed by generation of an enabling key block (EKB) by way of solely utilizing leaf keys and node keys for composing the key tree structure, it is possible to generate such an enabling key block (EKB) comprising a small data volume, whereby making it possible to effectively distribute data of the enabling key block (EKB).

The above-referred simplified hierarchical key tree structure is most effectively operable in the system for controlling the enabling key block structure per entity unit to be described later on. The term "entity" corresponds to an assemblage block of a plurality of nodes or leaves selected from those nodes or leaves for constituting a key tree structure for distributing relevant keys. The entity may be of such an assemblage provided in correspondence with the kinds of devices. Alternatively, the entity is established as an assemblage of a variety of forms comprising controlling units such as manufacturers of relevant devices, contents data providers, or financial organizations designated for settling accounts, individually representing processing units, controlling units, or service providing units being common with each other. Each entity comprises an assemblage of such devices that can be classified into a common category. For example, it is possible to individually generate and distribute such a simplified and decodable enabling key block (EKB) in such devices belonging to a specific entity selected by way of generating an enabling key block (EKB) via reconstruction of the above-referred key tree structure simplified by the peak nodes (sub-routes) of a plurality of entities. System for controlling the entity per unit will be described in detail later on.

It is possible to store the enabling key block (EKB) in a data recording medium such as an optical disc or a DVD or a CD, or the like. For example, it is possible to form such a system to provide individual devices with such a data recording medium which stores such an enabling key block (EKB) comprising a data portion composed of the above-referred ciphered key data and a tag portion functioning as position identifying data in the hierarchical key tree structure comprising ciphered key data, and yet, further stores message data such as the contents data ciphered by the updated node keys described above. It is possible for each device to serially extract the ciphered key data contained in the enabling key block (EKB) in accordance with identifying data of the tag portion and then decode the extracted ciphered key data, and yet, it is also possible for each device to acquire specific keys required for decoding the contents data before utilizing the acquired contents data. It is also allowable to distribute the enabling key block (EKB) via network service lines such as internet service lines for example.

[Process for Shifting Data Between a Storage Device Incorporating Ciphering Function and a Data Processing Apparatus]

Next, such a processing system utilizing a specific ciphering key distributed via an enabling key block (EKB) applying the above described hierarchical key tree structure is described below by mainly referring to a process for shifting data between a storage device incorporating ciphering function such as a memory card typically comprising the "Memory Stick" being a product and a registered trade name of Sony Corporation and a data reproduction apparatus.

Figure 15:
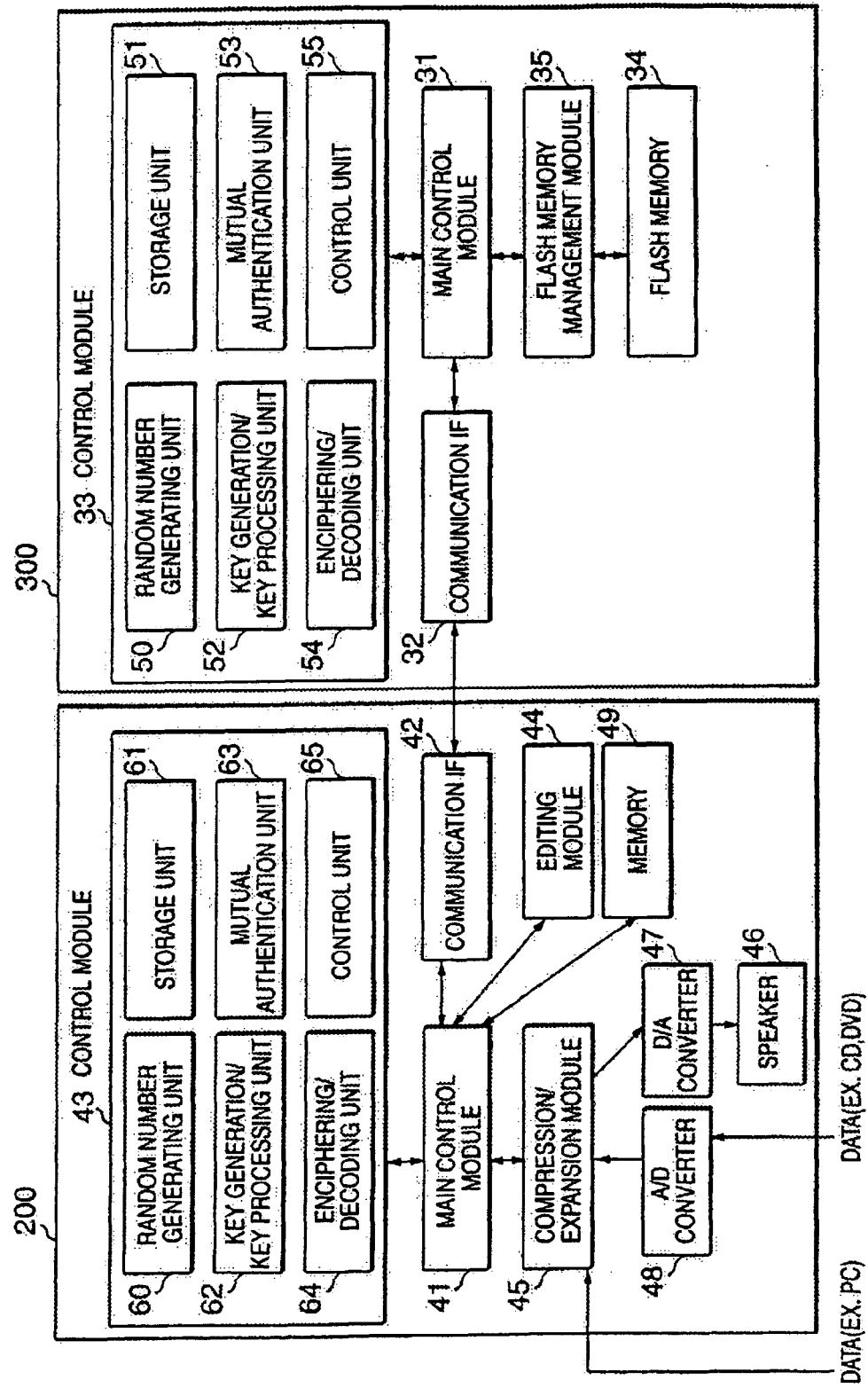
FIG. 15 presents a block diagram of a reproduction apparatus and a memory device used for the data processing system related to the present invention.

FIG. 15 presents a schematic block diagram designating a detailed structure of a data reproduction apparatus and a storage device such as a memory card incorporating data ciphering function respectively capable of mutually shifting contents data.

As shown in FIG. 15, a storage device 300 comprises the following: a main module 31, a communication interface unit 32, a controlling module 33, a flash memory 34, and a flash memory controlling module 35. Details of individual modules are described below.

[Controlling Module 33]

As shown in FIG. 15, the controlling module 33 comprises the following: a random digit generating unit 50, a memory unit 51, a key generating/arithmetic unit 52, a mutual authenticating unit 53, a ciphering/decoding unit 54, and a controlling unit 55. The controlling module 33 comprises an integrated circuit solely usable for ciphering a single chip or the like. Further, the controlling module 33 comprises a multi-layer structure including an internal memory cell sandwiched between dummy layers made of aluminum layers. Further, the controlling module 33 contains narrow-width operating voltage or narrow-width operating frequency, and yet, further contains tamper proof capability to prevent data from illegally being read via external source. On receipt of an instruction to generate random digits, the random digit generating unit 50 generates 64 bits (i.e., 8 bytes) of random digits.

Figure 16:
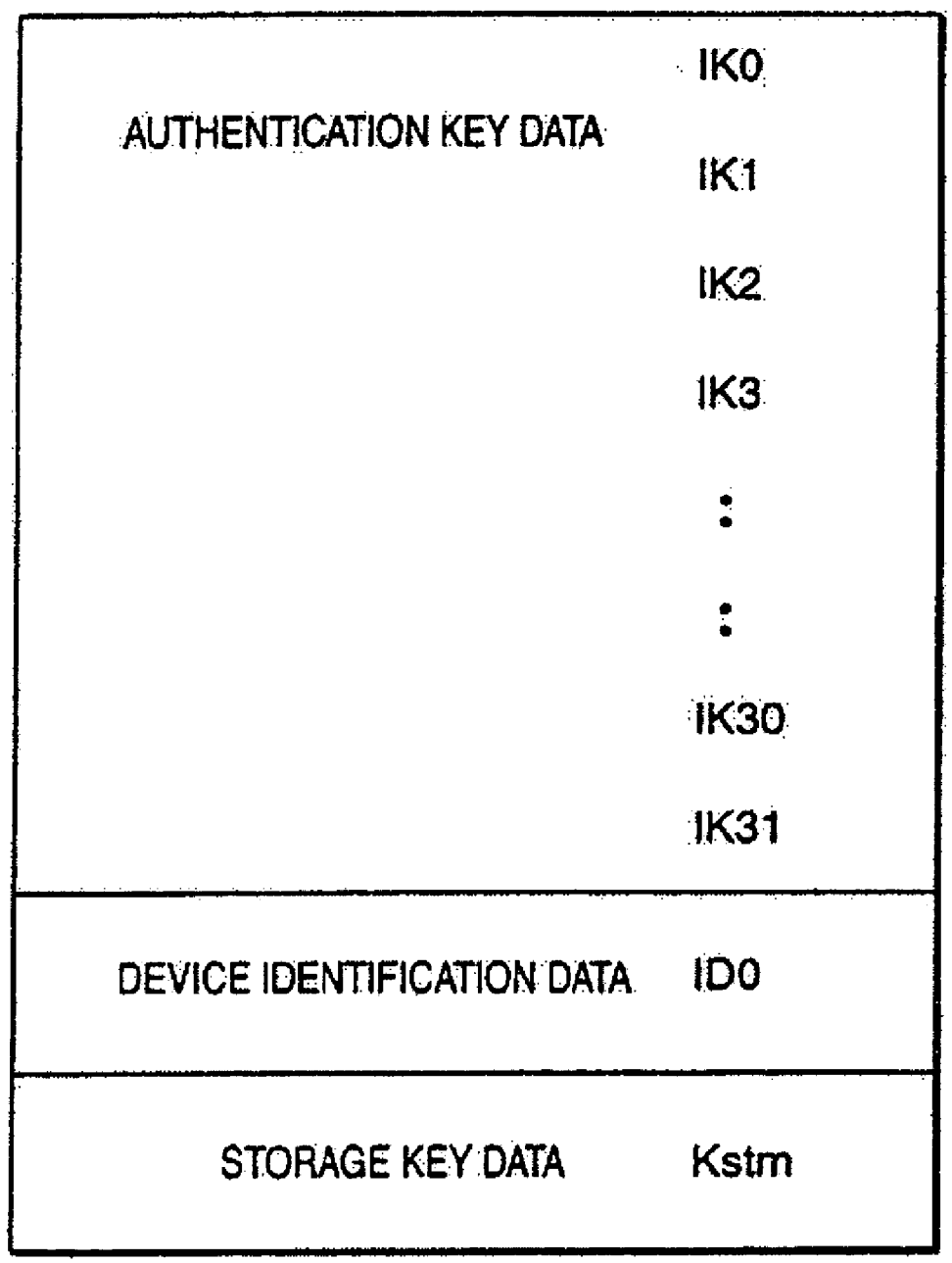
FIG. 16 is explanatory of data stored in a memory unit of a memory device in the data processing system related to the present invention.

The memory unit 51 comprises a non-volatile memory which consists of an EEPROM (Electrically Erasable Programmable Read Only Memory), for example, which stores a variety of data including such data necessary for the authentication process. FIG. 16 is solely for explanatory of the data stored in the memory unit 51. As shown in FIG. 16, the memory unit 51 stores authentication key data IK0 to IK31, device identifying data Idm, and memory-storing key data (Kstm).

The authentication key data IK0 to IK31 are individually used for enabling the storage device 300 to mutually authenticate related data with a corresponding reproduction apparatus 200. As will be described later on, whenever mutual authentication process is executed between them, one of those authentication key data IK0 to IK31 is randomly selected. It is so arranged that neither the above authentication key data IK0 to IK31 nor the memory storing key data (Kstm) can be read from any means outside of the storage device 300. The device identifying data Idm is uniquely added to the storage device 300. As will be described later on, while mutual authentication is executed, the device identifying data Idm is read out for delivery to the corresponding reproduction apparatus 200. As will be described later on, the memory-storing key data (Kstm) is utilized when storing a ciphered contents key data CK used for ciphering contents data in the flash memory 34.

By way of executing a variety of arithmetic operations such as MAC (Message Authentication Code) processing operation of the ISO/IEC 9797 standard for example, the above key generating/arithmetic unit 52 generates key data. To implement the MAC processing operation, DES (Data Encryption Standard) prescribed by FIPSPUB 462 is utilized as the "Block Ciphering Algorithm" for example. The above MAC processing operation corresponds to mono-directional Hash functional operation for compressing such a data with an optional length into the one having a fixed length, where the functional value depends on the secret key.

In advance of writing audio data from a reproduction apparatus 200 into the above flash memory 34, the above-referred mutual authentication unit 53 mutually executes an authentication process with the corresponding reproduction apparatus 200. Likewise, in advance of reading audio data out from the flash memory 34 for delivery to the corresponding reproduction apparatus 200, the mutual authentication unit 53 also mutually executes an authentication process with the reproduction apparatus 200. Further, the mutual authentication unit 53 executes the above-referred MAC processing operation while executing the mutual authentication process by applying those data stored in the memory unit 51.

Based on the above-cited "Block Ciphering Algorithm" such as DES, IDEA, or MISTY, the ciphering/decoding unit 54 executes a ciphering operation. The ciphering/decoding unit 54 utilizes those modes including the following: the ECB (Electronic Code Book) mode and the CBC (Cipher Block Chaining) mode prescribed by the FIPSPUB 81 (DES Modes Of Operation). Further, the ciphering/decoding unit 54 executes a decoding operation based on the block decoding algorithm such as DES, IDEA, and MISTY by applying the above cited ECB mode and CBC mode. In the block ciphering and decoding process by applying the ECB and CBC modes, the ciphering/decoding unit 54 ciphers and decodes specified data by applying a specified key data. The above-referred controlling unit 55 integrally controls the above-referred random digit generating unit 50, the memory unit 50, the key generating/arithmetic unit 52, the mutual authentication unit 53, and the ciphering/decoding unit 54.

[Flash Memory 34]

The flash memory 34 incorporates such a memory capacity corresponding to 32 Mbytes for example. Only when the above referred mutual authentication unit 53 verifies that the reproduction apparatus 200 and the storage device 300 are properly authenticated via the mutual authentication executed between them, a variety of data such as audio data and picture data delivered from the reproduction apparatus 200 are written into the flash memory 34. In the same way, only when the mutual authentication unit 53 verifies that the reproduction apparatus 200 and the storage device 300 are properly authenticated via the mutual authentication executed between them, audio data and picture data are properly read out from the storage device 300 for delivery to the corresponding reproduction apparatus 200.

Figure 17:
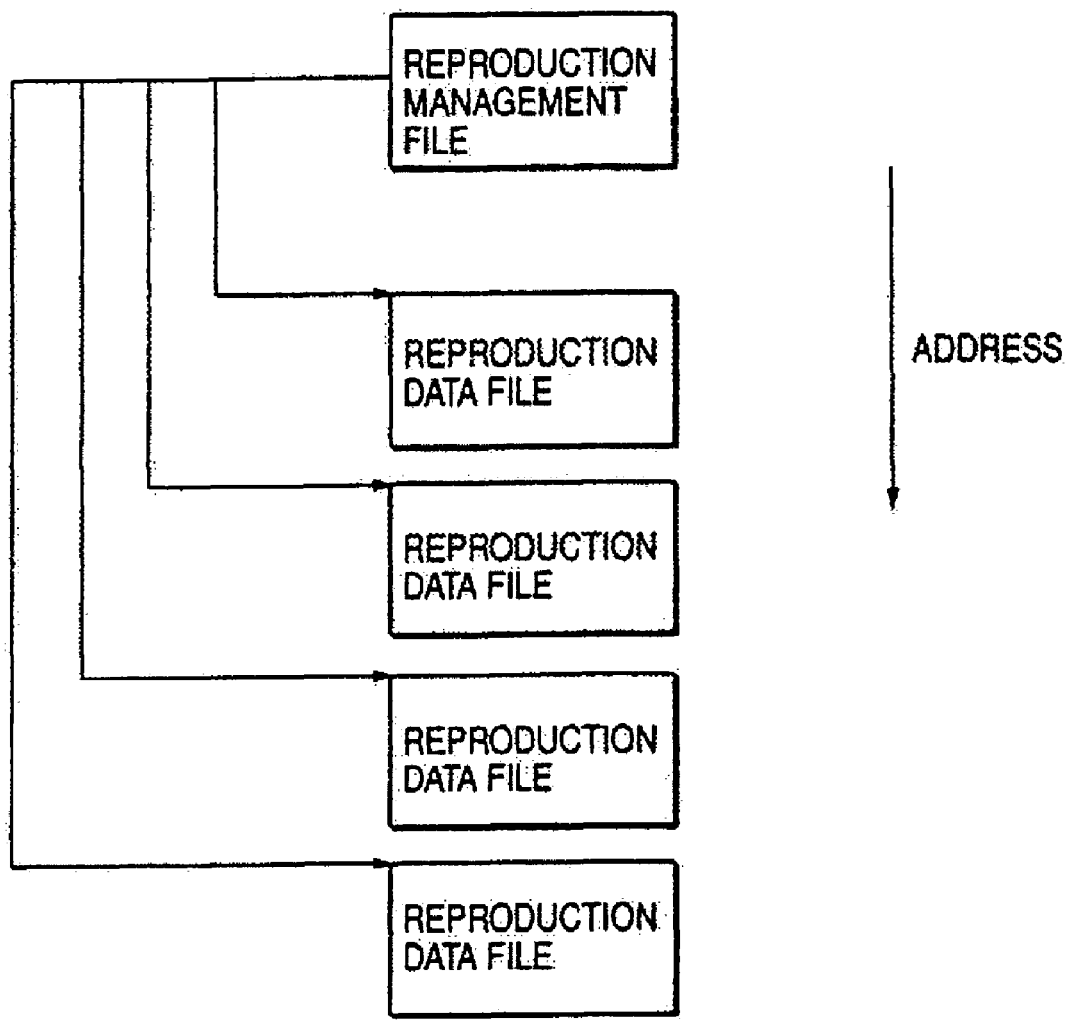
FIG. 17 is explanatory of data stored in a flash memory of a memory device in the data processing system related to the present invention.

Next, those data and related formats storable in the flash memory 34 are described below. FIG. 17 is explanatory of those data storable in the flash memory 34. As shown in FIG. 17, the flash memory 34 stores reproduction controlling file and a plurality of track data (reproducible data) files. The reproduction controlling file contains such data for controlling reproduction of track data files. Each of the track data file contains corresponding track data (audio data). In the form of embodying the present invention, an individual track data implies such audio data corresponding to one music tune. The following description refers to the case of storing audio data in the flash memory 34.

Figure 18:
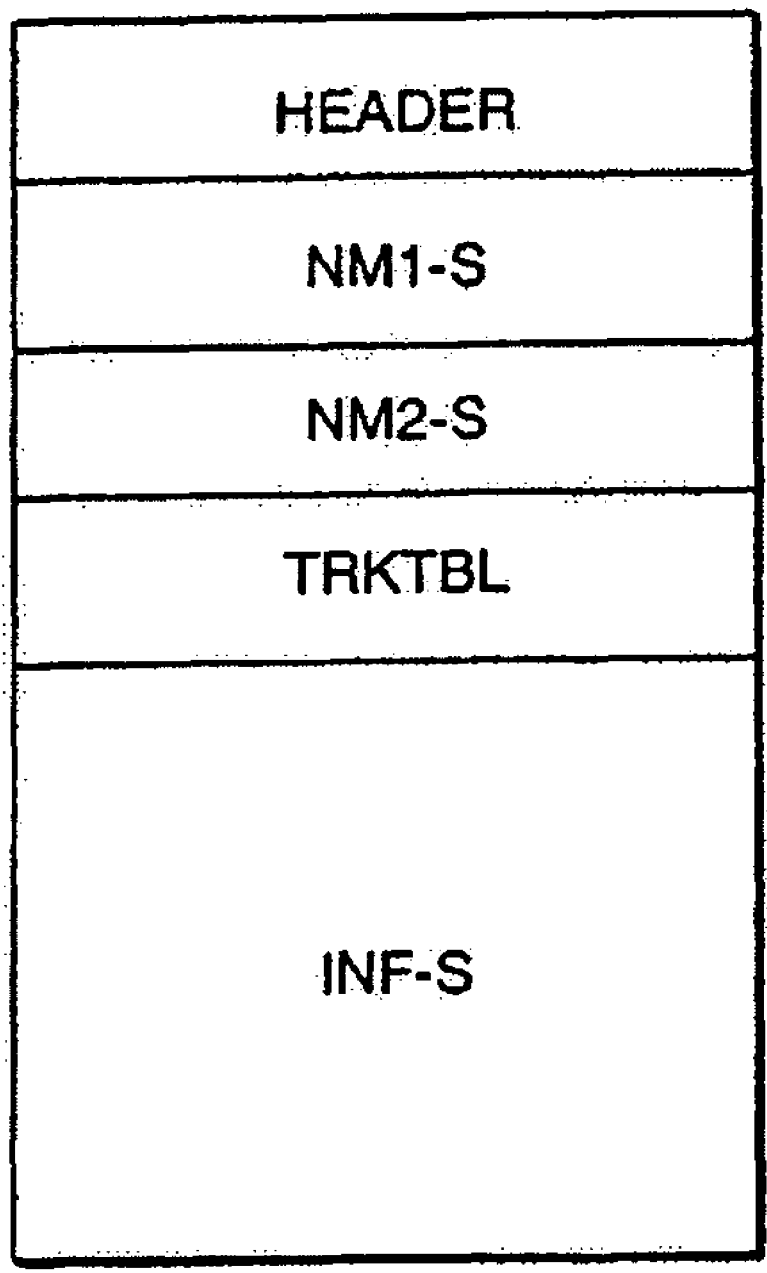
FIG. 18 presents a schematic structure of data stored in a reproduction controlling data file in the data processing system related to the present invention.

FIG. 18 designates composition of the reproduction controlling file. FIG. 19 designates composition of ATRAC-3 data file of a single music tune. The reproduction controlling file comprises 16 Kbytes of fixed length. The ATRAC-3 data file comprises a lead-off attribute header and an actually ciphered music data that follows. The attribute header also comprises 16 Kbytes of fixed length and such a composition analogous to the reproduction controlling file.

The reproduction controlling file comprises the following: a header, a 2-byte coded memory card in the name of NM2-S, reproduction tables in order of music tunes, and overall additive data INF-S added to the memory card. The lead-off attribute header of data file comprises a header, 1-byte coded music tune name NM1, 2-byte coded music tune name NM2, track data TRKINF including track key data for example, parts data PRINF, and additive data INF added to track. The header contains such data including the total number of parts, name of the attributes, and size of additive data.

Music data corresponding to the ATRAC-3 data file follows the attribute header. Music data is sectioned per 16 Kbytes block. The header is added to the head of each block. The header contains such an initial value for decoding ciphered effect. Only such contents data including music data in the ATRAC-3 data file are subject to the ciphering process, whereas the reproduction controlling file and the data of the header are not subject to the ciphering process.

FIG. 20 designates a detailed data composition of the above cited reproduction controlling file PBLIST having one duster (one block=16 Kbytes) of size. A header shown in A of FIG. 20 comprises 32 bytes. Except for the header portion shown in B of FIG. 20, those remaining portions shown in B of FIG. 20 are again recorded with those components including the following: the name NM1-S (256 bytes) provided for the whole of memory cards, the other name NM2-S (512 bytes), ciphered contents keys (CONTENTS KEY), MAC, S-YMDhms, table TRKTBL (800 bytes) for controlling order of reproduction, additive data INF-S (14720 bytes) added to the whole memory cards, and part of data contained in the header. It is so prescribed that the head portions of various kinds of individual data groups are respectively set to a predetermined position inside of the reproduction controlling file.

Referring to the reproduction controlling file, those portions ranging from the foremost to the 32-byte portion represented by means of (0x0000) and (0x0010) shown in FIG. 20A constitute the header. Such a unit sectioned per 16 bytes from the foremost unit is called a "slot". Such headers provided for the first and second slots of the reproduction controlling file are added with such data bearing specific meaning, function, and values in serial order from the foremost position as defined below. Such a data designated as "Reserved" denotes such a data not yet defined. Normally, null (0x00) is denoted, However, whatever the written contents may be, the "Reserved" data is ignored. Any change may be effected in the future version. Writing of data in this portion is inhibited. Unless being used, even such a portion written as "Option" is totally subject to such a treatment identical to the case of the above-referred "Reserved" data.

BLKID-TLO (4 bytes):
Meaning: BLOCKID FILE ID
Function: A value to identify the foremost of the reproduction controlling file
Value: Fixed value="TL=0" (for example, 0x544C2D30)

MCODE (2 bytes):
Meaning: MAKER CODE
Function: Identifies manufacturer and product model of recorded apparatus
Value:
  Upper 10 bits (manufacturer's code)
  Lower 6 bits (product model code)

REVISION (4 bytes)
Meaning: Re-written rounds of PBLIST
Function: Increments per re-writing of reproduction controlling file
Value: Begins with 0 to increment value by +1

SN1C+L (2 bytes):
Meaning: Denotes attribute of the name (1 byte) of the memory card written in the NM1-S domain
Function: Designates usable character code and language code per byte
Value: Character code distinguishes characters by means of the upper one byte as shown below
00: No character code is set: 00 is dealt merely as binary digit
01: ASCII (American Standard Code for Information Interchange)
02: ASCII+KANA 03: modified 8859-1
81: MS-JIS 82: KS C 5601-1989 83: GB (Great Britain) 2312-80
  90: S-JIS (Japanese Industrial Standards for voice)
  In conformity with the EBU Tech 3258 regulation, using the lower one byte, the language code (L) distinguishes languages.
  00: No language code is set:
  08: German 09: English 0A: Spanish
  0F: French 15: Italian 1 D: Dutch
  65: Korean 69: Japanese 75: Chinese
  If no data is present, the language code is totally reset to zero.

SN2C+L (2 bytes):
Meaning: Denotes attribute of the name (2 bytes) of the memory card written in the NM2-S domain
Function: Denotes usable character code and language code per byte
Value: Exactly identical to those which are described in relation to the above-referred SN1C+L SINFSIZE (2 bytes):
Meaning: Denotes the total size of additive data related to the whole memory cards written in the INF-S domain
Function: If there is no description of data size based on a 16 byte unit,
Value the above SINFSIZE is totally reset to zero.
Value: Size ranges from 0x0001 to 0x39C (924)

T-TRK (2 bytes):
Meaning: Total track number
Function: Designates the total number of tracks
Value: Ranges from 1 to 0x0190 (maximum 400 tracks)
If no data is present, value of the above T-TRK is totally reset to zero.

VerNo (2 bytes):
Meaning: The version number of format
Function:
  The upper bytes denote the major version number
  The lower bytes denote the minor version number
  The VerNo is also utilized as a data for designating whether a distributed data corresponds to the object of a copy-right or not, in other words, whether the distributed data requires utilization of a data distributing key based on the above-referred enabling key block (EKB) present in the above-referred hierarchical key tree stricture or not.
Value: For example, 0x0100 (Ver1.0) 0x0203 (Ver2.3)
  The following description refers to such a data (shown in B of FIG. 20) written in a domain following the above-described header.

NM1-S:
Meaning: Name of 1 byte related to the whole memory cards
Function: Whenever ending such a data related to length-variable name-data (a maximum of 256) designated by one-byte character code, the terminating code (0x00) must be written imperatively.
  Computation of size must be commenced from the terminating code. If no data is present, at least such a data ranging from the foremost (0x0020) to the null (0x00) must be recorded by a minimum of one byte.
Value: Various kinds of character codes NM2-S:
Meaning: Name of 2 bytes related to the whole memory cards
Function: Whenever ending such a data related to length-variable name data (a maximum of 512) designated by 2 byte character code, the terminating code (0x00) must be written imperatively.
  Computation of size must be commenced from the terminating code. If no data is present, at least such a data ranging from the foremost (0x0120) to the null (0x00) must be recorded by a minimum of 2 bytes.
Value: Various kinds of character codes EKB_Version (4 bytes):
Meaning: Designates generation number of contents keys provided by the enabling key block (EKB) present in the above-referred hierarchical key tree structure and/or also designates the name of the file of the enabling key block (EKB).
Function: Designates such an enabling key block (EKB) for acquiring a proper contents key to be provided by the enabling key block (EKB) present in the above-referred hierarchical key tree structure.
Value: From 0 to 0xFF E (Kstm, Kcon) (8 bytes):
Meaning: Data comprising a contents key for ciphering individual contents data, where the data is generated after ciphering the contents key by applying a storage key (Kstm) of the memory card.
Function: Usable for ciphering contents data
Value: From 0 to 0xFFFFFFFFFFFFFFFF E (KEKn, Kcon) (8 bytes):
Meaning: Data comprising a contents data for ciphering individual contents data, where the data is generated after ciphering the contents key by applying a key ciphering key (KEKn) provided by the enabling key block (EKB) present in the above-referred hierarchical key tree structure.
Function: Usable for ciphering contents data
Value: From 0 to 0xFFFFFFFFFFFFFFFF C_MAC [0] (8 bytes):
Meaning: Value for checking the tampering with copy-righted data
Function: Value for checking the act of tampering, where this value is generated based on such data stored in the above reproduction controlling file, S-YMDhms data designating the time and the date of processing contents data such as recording of final contents data, and also based on other data. If the time/date data S-YMDhms has been tampered, it is identified that the act of tampering the data has been committed at the time of checking the C_MAC [0], whereby reproduction of contents data is prevented from being executed.
Value: From 0 to 0xFFFFFFFFFFFFFFFF
MGR:
Meaning: Kinds of contents key
Function: When 0x00 is designated, two kinds of contents key are present, which include contents keys Kcon and E (KEKn, Kcon). When 0x01 is designated, a contents data E (KEK, Kcon) is solely present.
Value: From 0 to 0x01
S-YMDhms (4 bytes) (Option):
Meaning: Year, month, day, hour, minutes, and seconds, recorded by such an apparatus incorporating a reliable dock
Function: Value for discerning the final date of processing contents data such as the date and time at which the contents data are finally recorded. The value is updated when processing contents data.
Value:
  25 to 31 bits: Year 0 to 99 (1980 to 2079)
  21 to 24 bits: Month 0 to 12
  16 to 20 bits: Day 0 to 31
  11 to 15 bits: Hour 0 to 23
  05 to 10 bits: Minute 0 to 59
  00 to 04 bits: Second 0 to 29 (2 seconds per unit)
The S-YMDhms data is updated in the course of processing contents data, for example, at the time of recording contents data. Further, based on the updated data, the above-referred C_MAC [0] is also updated and then stored in memory.
TRK-nnn:
Meaning: Sequential number of ATRAC-3 data file to be reproduced
Function: Describes Fno in the TRKINF
Value: From 0 to 400 (0x190)
INF-S:
Meaning: Additive data related to the whole memory cards, where the additive data includes photographs, the words, a commentary, or the like
Function: Length variable additive data accompanying the header
A plurality of mutually different additive data may be aligned by way of providing each of the additive data with an ID code and a predetermined data size. Each of the additive data individually provided with the header consists of a minimum of 16 bits and such units that double the integer of 4 bytes. Details will be described later on.
Value: Refer to the composition of additive data
To constitute the final slot of the reproduction controlling file, BLKID-TLO, Mcode, and Revision identical to those which are stored in the header are written.
While operating such a consumer's audio component apparatus, there may be such a case in which the above-referred memory card is intentionally drawn out or power-supply source is disconnected, and thus, it is necessary to detect occurrence of such abnormal condition when restoring normal operation. As described above, it is so arranged that the above-referred "Revision" is written in the foremost position and the rearmost position of each block, and yet, the Revision is incremented by +1 whenever rewriting the value thereof. If any abnormal termination occurs in the course of processing the block, the values of the "Revision" at the foremost and rearmost positions do not coincide with each other, whereby enabling to detect abnormally ended operation. Inasmuch as two of the "Revision" codes are provided, it is possible to detect abnormally ended operation at a high probability. If abnormally ended operation has been detected, alarm is generated via display of error message for example.

Further, inasmuch as the fixed value BLKID-TLO is inserted in the foremost portion of each block (16 KB), this fixed value can be applied to rate repairing degree of FAT when being out of order. Concretely, by way of checking the fixed values at the foremost of individual blocks, it is possible to discern the kinds of files. And yet, since the fixed values are written into the header and the terminating portion of individual blocks by double, it is also possible to check the reliability of the fix value. It is also allowable to record such data identical to that of the reproduction controlling file PBLIST by double.

Compared to the track data controlling file, the ATRAC-3 data file contains a considerably greater data volume. The ATRAC-3 data file is provided with block number BLOCK SERIAL. In the ATRAC-3 data file, normally, a plurality of files are present on a memory card, and thus, unless the block number BLOCK SERIAL is added after discerning contents data by means of CONNUM0, it makes it difficult to restore files when FAT is out of order. In other words, since a single ATRAC-3 data file is composed of a plurality of BLOCKs, which may be disposed apart from each other, and thus, in order to identify the BLOCKs for constituting identical ATRAC-3 data files, CONNUM0 is utilized, and yet, lifting and lowering order inside of an identical ATRAC-3 data file is determined by the block number BLOCK SERIAL.

In the same way, in such a case in which any discrepancy is generated in the file by committing a logical error without leading to destruction of FAT, in order that the product model of an apparatus manufacturer written in the file can be specified, the manufacturer's code Mcode is recorded at the foremost and rearmost of each block.

A C of FIG. 20 designates construction of the data containing added data. Those headers shown below are written at the foremost portion of the added data. Length-variable data are written in such portions following the header potion.
INF:
Meaning: Field ID
Function: The fixed value designating the foremost portion of such data containing added data
Value: From 0 to 0xFF
SIZE:
Meaning: Magnitude of individual additive data
Function: Data size is free. However, the data size must be double the integer of 4 bytes imperatively. Data size must be a minimum of 16 bytes. If any surplus portion is generated beyond the ending point of data, the excessive portion must be filled with the null code (0x00).
Value: From 16 to 14784 (0x39C0)
MCODE:
Meaning: Manufacturer's code
Function: This code discernibly identifies name of the manufacturer and the product model of the apparatus used for recording data.
Value:
  The upper 10 bits designate manufacturer's code
  The lower 6 bits designate product model code
C+L:
Meaning: Designates attribute of characters written in such domain corresponding to the 12th byte from the foremost position of data file Function: Designates usable character codes and language codes by applying each byte
Value: Identical to the values of the above-referred SNC+L
DATA:
Meaning: Individual data containing added data
Function: Individual data are designated by way of length variable data. Foremost part of actual data always begins with the 12th byte, where the length (size) of the data must be a minimum of 4 bytes, and yet, must always be double the integer of 4 bytes. If any surplus portion is generated beyond the end portion of data, the excessive portion must be filled with the null code (0x00).
Value: Depending on the contents, the value is individually defined.

FIG. 21 exemplifies an alignment of data corresponding to the ATRAC-3 data file A3Dnnnn. FIG. 21 designates an attribute header (one block) of data file and a music data file (one block). FIG. 21 designates the foremost bytes (0x0000 to 0x7FF0) of individual slots corresponding to the above two blocks (16 byte×2=32 Kbytes). As is discretely shown in FIG. 22, the header comprises such a portion ranging from the foremost to the 32 bytes of the attribute header, in which 256 bytes constitute the music name domain NM1, whereas 512 bytes also constitute the other music name domain NM2. The heading portion of the attribute header contains description of those data shown below.

BLKID-HDO (4 bytes):
Meaning: BLOCKID FILE ID
Function: The value for identifying the foremost byte of the above ATRAC-3 data file
Value: Fixed value="HD=0" (For example, 0x48442D30)
  MCODE (2 bytes):
Meaning: Manufacturer's code
Function: This code discernibly identifies the name of manufacturer and the product model of such an apparatus used for recording data.
Value:
  The upper 10 bits designate manufacturer's code
  The lower 6 bits designate the product model code
  BLOCK SERIAL (4 bytes):
Meaning: Serial number added per track
Function: The foremost byte of an initial block begins with 0 and then the following block is incremented by +1. Even when block data are edited, values are invariable.
Value: From 0 to 0xFFFFFFFF
  N1C+L (2 bytes):
Meaning: Designates attribute of data (NM1) of tracks (music names)
Function: Character code and language code used for the data NM1 are respectively designated by one byte.
Value: Identical to the value of the preceding SN1C+L.
  N2C+L (2 bytes):
Meaning: Designates attribute of data (NM2) of track (music names).
Function: Character code and language code used for the data NM2 are respectively designated by one byte.
Value: Identical to the value of the preceding SN1C+L.
  INFSIZE (2 bytes):
Meaning: Designates the total size of all the additive data related to tracks.
Function: Describes data size based on 16 byte unit. If no data is present, data size is compulsorily reset to zero.
Value: Data size ranges from 0x0000 to 0x3C6 (966).
  T-PRT (2 bytes):
Meaning: Total number of parts
Function: Designates the number of parts for constituting track Normally, the number of parts is 1.
Value: From 1 to 0x285 (645 dec)
  T-SU (4 bytes):
Meaning: Total number of sound units SU corresponds to the minimum unit of parts, and yet, it also constitutes a minimum unit of data when compressing audio data by applying the ATRAC-3. The total number of sound units corresponds to several hundred bytes comprising audio data corresponding to 1024 samples (1024×16 bits×2 channels) generated via 44.1 KHz of sampling frequency by way of compressing audio data into approximately one tenth the original size. Each SU corresponds to approximately 23 mseconds via time-wise conversion. Normally, a single parts is composed by means of several thousands of SU. In the case in which a single duster comprises 42 units of SU, it is possible to express approximately one second off sound with a single duster. The number of parts for constituting an individual track is affected by the size of added data. Inasmuch as the number of parts is determined by the number after removing the header, music name, and the data containing additive data from a single block, such a condition totally devoid of added data corresponds to the condition enabling a maximum of parts (645 units) to be utilized.
Function: Designates the total number of US actually present in the track. This corresponds to the time for performing a music tune.
Value: From 0x01 to 0x001FFFFF
  INX (2 bytes) (Option):
Meaning: Relative location of INDEX
Function: Pointer indicating the tip of characterized portion of a music tune. Designates a position from the tip potion of a music tune by way of dividing the unit number of SU into one fourth. This position corresponds to such a duration (approximately 93 mseconds) four times the normal length of the SU.
Value: From 0 to 0xFFFF (a maximum of approximately 6084 sec.)
  XT (2 bytes) (Option):
Meaning: Time for reproducing INDEX
Function: Designates the time unit number of SU to be reproduced from the foremost code specified by INX-nnn by the number divided into one fourth. This corresponds to the time (approximately 93 mseconds) four times the normal duration of the SU.
Value:
  0x0000=Devoid of time setting effect
  From 0x01 to the end of music tune 0xFFFF (max. 6084 sec.) 0xFFFF
  Next, music name domains NM1 and NM2 are described below.
  NM1:
Meaning: Character array expressing music names
Function: Length-variable music name (maximum 256) expressed by means of one-byte character code: Whenever terminating music name data, it is essential that the terminating code (0x00) be written imperatively. Size shall be computed from the terminating code. If no data is present, it is essential that at least a minimum of one byte of code ranging from the foremost (0x0020) to the null code (0x00) be recorded.
Value: Various character codes
  NM2:
Meaning: Character array expressing music names
Function: Length-variable name data (maximum 512) designated by two-byte character codes: Whenever terminating name data, it is essential that terminating code (0x00) be written imperatively. Size shall be computed from the terminating code. If no data is present, it is essential that at least a minimum of 2 byte codes be written ranging from the foremost (0x0120) to the null code (0x00).
Value: Various Character Codes The TRKINF begins with the fixed position (0x320) of the attribute header. The TRKINF (track data domain) comprises 80 bytes of data, which mainly integrally controls data related to security and coy-controlling data. FIG. 23 designates the TRKINF portion. Those data within the TRKINF domain are described below in accordance with the order of arrangement.

EKI (1 byte):
Meaning: Ciphering contents key provided by the above-referred enabling key block (EKB) present in the above-referred hierarchical key tree structure. EKI designates whether E (KEKn, Kcon) is present or not.
Function:
  bit 7=1 designates presence of the key E
  bit 7=0 designates absence of the key E When the condition "bit 7=0" is present, EKB_version shall be entered without referring to R (KEKn, Kcon).
Value: From 0 to 0xFF EKB_version (4 bytes):
Meaning: Designates generation number of contents keys provided by the enabling key block (EKB) present in the above-referred hierarchical key tree structure and/or also designates file name of the enabling key tree structure (EKB).
Function: Designates such an enabling key block (EKB) for acquiring proper contents keys provided by the enabling key structure (EKB) present in the hierarchical key tree structure.
Value: From 0 to 0xFF E (Kstm, Kcon) (8 bytes):
Meaning: Data comprising such contents keys for ciphering each contents data, where the data is ciphered by a storage key (Kstm) of a memory card.
Function: Usable for ciphering contents data
Value: From 0 to 0xFFFFFFFFFFFFFFFF E (KEKn, Kcon) (8 bytes):
Meaning: Data comprising such contents keys for ciphering each contents data, where the data is ciphered by a key ciphering key (KEKn) provided by the enabling key block (EKB) present in the above referred hierarchical key tree structure.
Function: Usable for ciphering contents data
Value: From 0 to 0xFFFFFFFFFFFFFFFF C_MAC [n] (8 bytes):
Meaning: Value for checking the tampering with copy-righted data:
Function: A value generated from the contents of a plurality of the above-referred TRKINF data including the accumulation number of contents data and also from concealed sequence number. The term concealed sequence number corresponds to those sequence numbers recorded in a concealed domain of a memory card. Such a recorder incapable of safeguarding copy-rights are unable to read the concealed domain. On the other hand, such a recorder compatible with copy rights and such a personal computer loaded with an application program capable of reading a memory card can gain access to the concealed domain.

A (1 byte):
Meaning: Attribute of parts
Function: Designates data inside of parts such as compressed mode
Value: Referring to FIG. 24, details are described below.

A special joint mode is prescribed as "monaural" mode, in which N=0, 1 of monaural signal comprises bit 7 as binary code 1 and sub signal as 0, whereas main signal solely comprises (L+R) signal components. Such data corresponding to bit 2, 1 may be ignored by a conventional reproduction apparatus.

Bit 0 of the above attribute A constitutes ON/OFF data of emphasis, whereas bit 1 constitutes such a data to designate whether being reproduction SKIP mode or normal reproduction mode. Bit 2 constitutes data distinction, in other words, bit 2 forms such data comprising audio data or other data such as facsimile data or the like. Bit 3 is not yet defined. By way of combining bits 4, 5, and 6, as shown in FIG. 24, mode data conforming to ATRAC-3 is prescribed. More particularly, N designates such a mode value expressed by those three bits 4, 5, and 6. The mode value designates recording time (when utilizing a 64 MB memory card), data transfer rate, the number of SU per block in relation to 5 kinds of mode including monaural (N=0, 1), LP (N=2), SP (N=4), EX (N=5), and HQ (N=7). A unit of SU contains 136 bytes for monaural mode, 192 bytes for LP mode, 304 bytes for SP mode, 384 bytes for EX mode, and 512 bytes for HQ mode. Further, "dual" mode (N=0) and "joint" mode (N=1) conforming to the above-cited ATRAC-3 is designated by the bit 7.

Assume that SP mode is entered while utilizing a 64 MB memory card for example. The 64 MB memory card contains 3968 blocks. Since a unit of SU comprises 304 bytes, when the SP mode is entered, a total of 53 SU units are present per block. A unit of SU corresponds to (1024/44100) seconds. Accordingly, each block corresponds to (1024/44100)×53×(3968−16)=4863 seconds=81 minutes. On the other hand, the data transfer rate is computed as follows.

$$(44100/1024) \times 304 \times 8 = 104737 \text{ bps}$$

LT (1 byte):
Meaning: Reproduction restrictive flag (comprising bits 6 and 7) and security versions (bits 5 to 0)
Function: Designates provision of restrictive terms imposed on tracks
Value:
  Bit 7: 0=no restriction 1=restriction is present
  Bit 6: 0=within effective term 1=effective term expires
  Bit 5 to bit 0: security version=0
If security version code is not 0, reproduction is inhibited.

FNo (2 bytes):
Meaning: The initially recorded track number. This value specifies position of the value for computing MAC recorded in the concealed domain of a memory card.
Value: From 0 to 0x190 (400)

MG (D) SERIAL-nnn (16 bytes comprising upper 8 bytes and lower 8 bytes)
Meaning: Serial number of security blocks provided for a recording apparatus
Function: Totally different proper values per recording apparatus
Value: From 0 to 0xFFFFFFFFFFFFFFFFFFFFFFFFFFFFFFFF CONNUM (4 bytes):
Meaning: Contents data accumulated number
Function: A proper value accumulated per music tune. This value is controlled by the security block provided for an individual recording apparatus. A total of 4.2 billion music tunes ($2^{32}$) are prepared for identifying the recorded music tunes.
Value: From 0 to 0xFFFFFFFF YMDhms-S (4 bytes) (Option):
Meaning: Date and time of commencing reproduction of tracks which are restrictive of reproduction
Function: Date and time at which commencement of reproduction specified by EMD is approved Value: Identical to the above-referred date and time
  YMDhms-E (4 bytes) (Option):
Meaning: Date and time of terminating reproduction of tracks which are restrictive of reproduction
Function: Date and time at which approval for reproduction specified by EMD is terminated
Value: Identical to the above-referred data and time.
  XCC (1 byte):
Meaning: Expanded portion of CC (copy control) described below
Function: Control of copy
  CT (1 byte) (Option):
Meaning: Rounds of reproduction
Function: Actually reproducible rounds against the total rounds approved for implementing reproduction. The rounds are subject to decrease per reproduction.
Value: 0x00 to 0xFF When the approved reproduction rounds are not yet utilized at all, the value is null (0x00). When the bit 7 of LT indicates 1 and the CT value indicates 00, reproduction is inhibited.
  CC (1 byte):
Meaning: Copy Control
Function: Control over copying operation
Value: As shown in FIG. 25, bits 6 and 7 jointly designate a copy controlling data, bits 4 and 5 jointly designate a copy controlling data related to high-speed digital copying operation, and bits 2 and 3 jointly designate security block authentication level. Bits 0 and 1 are not yet defined.
  Copy controlling operation comprises the following: When utilizing bits 6 and 7, data code 11 approves indefinite copying operation; data code 01 inhibits copying operation; and data code 00 approves copying operation for one round. When utilizing bits 2 and 3, data code 00 enables recording from an analog input or a digital input; and data code 0 designates MG authentication level. In the case of digital recording via a CD, bits 6 and 7 correspond to the former function 00, and bits 2 and 3 corresponds to the latter 00 function.
  CN (1 byte) (Option):
Meaning: Copying approved rounds in the HSCMS (High-speed Serial Copy Management System
Function: Distinction between one-round copying and indefinite rounds copying is expanded to designate the approvable copying rounds. The approved copying rounds are solely effective for the first copying generation and subject to decrease per round of copying operation.
Value: 00=copying is inhibited. From 01 to 0xFE designates rounds of copying operation, and 0xFF designates indefinite rounds.
  In succession to the above-referred track data domain TRKINF, such a 24-byte data initiated from 0x0370 is called the parts-data domain PRTINF for controlling parts. When composing a single track with a plurality of parts, PRTINF is aligned in order of time axis. FIG. 26 designates the portion corresponding to the PTTINF. Details of data in the PRTINF domain are described below in accordance with the arranged order.
  PRTSIZE (4 bytes):
Meaning: Parts size
Function: Designate parts size including the following: duster is provided with 2 bytes (the uppermost rank); Starting SU 1 byte (an upper rank) and terminating SU is provided with 1 byte (the lowest rank).
Value:
  Cluster: From 1 to 0x1F40 (8000)
  Starting SU: From 0 to 0xA0 (160)
  Terminating SU: From 0 to 0xA0 (160)
  Note that the SU codes are counted from 0, 1, 2, . . . upwards.
  PRTKEY (8 bytes):
Meaning: Value for ciphering parts
Function: Initial value=0
  When entering an editing process, editing rule must be observed.
Value: From 0 to 0xFFFFFFFFFFFFFFFF
  CONNUM0 (4 bytes):
Meaning: An initially generated key for designating accumulated number of contents data
Function: Role of ID for characterizing contents data
Value: Identical to the value of the initial value key of the accumulated contents data number.
  Refer again to FIG. 21. As shown in FIG. 21, the attribute header of the ATRAC-3 data file contains an additive data INF. The additive data INF relates to tracks, which has a variable length and accompanies the header. Depending on cases, a plurality of mutually different additive data may be aligned. Each of the additive data is added with ID and a data size. Such an additive data including each header comprises a minimum of 16 bytes and consists of such a unit that doubles the integer of four bytes.
  Data of individual blocks of the above-referred ATRAC-3 data file follow the above-referred attribute header. As shown in FIG. 27, a header is added to each block. Data used for each block of the ATRAC-3 data file are described below.
  BLKID-A3D (4 bytes):
Meaning: Blocked File ID
Function: Value for identifying the foremost of the ATRAC-3 data
Value: Fixed value="A3D" (For example, 0x41334420)
  MCODE (2 bytes):
Meaning: Manufacturer's code
Function: A code for discernibly identifying manufacturer's name and the product model of the apparatus used for recording
Value: Upper 10 bits designates the manufacturer's code, whereas the lower 6 bits designates the product model code.
  CONNUM0 (4 bytes):
Meaning: Initially generated number for designating accumulated contents data
Function: Role of ID for characterizing contents data. Even when being edited, the value remains unaffected.
Value: Identical to the value of the initial-value key of the contents accumulated number.
  BLOCK SERIAL (4 bytes):
Meaning: Serial numbers added to individual tracks
Function: Serial number at the tip block begins with 0. Serial number for the next block is counted up by +1. Even when being edited, the value remains unaffected.
Value: From 0 to 0xFFFFFFFF
  BLOCK SEED (8 bytes):
Meaning: A key for ciphering one block
Function: The initial block enables the security block of a corresponding recording apparatus to generate ransom digits. The ensuing block is counted up by +1. If this value is lost, no sound can be generated for about one second corresponding to one block, and thus, an identical value is written to the header and the rearmost portion of the block by double. Even when being edited, the value remains unaffected.
Value: 8 byte random digits at the initial stage
  INITIALIZATION VECTOR (8 bytes):
Meaning: An initial value necessary for ciphering and deciphering the above-referred ATRAC-3 data file per block
Function: The initial block begins with 0, whereas the following block utilizes the finally ciphered 8-byte value of the last SU. In the case of ciphering or decoding data at an intermediate portion of a divided block, the last 8-byte immediately before the initial SU is utilized. Even when being edited, the value remains unaffected.

Value: From 0 to 0xFFFFFFFFFFFFFFFF

SU-nnn:

Meaning: Data of sound unit

Function: Data compressed from 1024 samples. Depending on the compression mode, the number of output bytes varies. Even when being edited, the value remains unaffected. For example, when SP mode is entered, N corresponds to 384 bytes.

Value: Value of the data of the ATRAC-3 data file

According to the structure shown in FIG. 21, inasmuch as N=384, a total of 42 SU are written in a block. A pair of foremost slots (4 bytes) of each block constitute header. Further, BLKID-A3D, Mcode, CONNUM0, and BLOCK SERIAL are written by double in the last one block (2 bytes). Accordingly, surplus domain M-byte of each block comprises 16,384−384×42−16×3=208 bytes. As mentioned earlier, an 8-byte BLOCK SEED is recorded in the surplus domain M-byte by double.

As will be described later on, data stored in a flash memory 34 is compressed in conformity with the ATRAC-3 data file format, where the compressed unit comprises a sound unit SU. Accordingly, when a reproduction apparatus 200 read data from a storage device 300, minimum readable unit corresponds to the sound unit SU. Audio data may also be compressed via CODEC format other than the above referred ATRAC-3 data file format or the like.

Block seed data is generated by way of generating random digits per block.

[Flash Memory Controlling Module 35]

The flash memory controlling module 35 controls operations for writing data into and reading data out from a flash memory 34.

Construction of a reproduction apparatus shown in FIG. 15 is described below. The reproduction apparatus shown in FIG. 15 comprises the following: a main controlling module, a communication interface device 42, a controlling module 43, an editing module 44, a compression/elongation module, a speaker unit 46, a D/A converter 47, and an A/D converter 48.

[Main Controlling Module 41]

The main controlling module 41 integrally controls processes for operating the reproduction apparatus 200.

[Controlling Module 43]

As shown in FIG. 15, the controlling module 43 comprises the following: a random digit generating unit 60, a memory unit 61, a key generating and key-arithmetic operation unit 62, a mutual authentication unit 63, a ciphering and decoding unit 64, and a controlling unit 65. Like another controlling module 33, the controlling module 43 itself consists of a single-chip multiple-layer laminated integrated circuit which is exclusively operable for ciphering processes, whose inner memory cell is sandwiched by dummy layers made from aluminum. Further, the controlling module 43 contains narrow-width operating voltage or operating frequency, and yet, it also incorporates tamper-proof capability to prevent all the data from improperly being read by external source. On receipt of an instruction to generate random digits, the random-digit generating unit 60 generates 64-bit (8 byte) random digits. The memory unit 61 stores a variety of data required for executing an authentication process.

By way of executing a variety of arithmetic operations utilizing the ISO/IEC9797 MAC arithmetic operation format for example, the key-generating and key arithmetic operation unit 62 generates a wide variety of key data. In the course of generating key data, the key generating unit 62 utilizes DES prescribed by FIPS PUB 46-2 as the "block ciphering algorithm 2."

In advance of delivering audio data input from a computer to a storage device 300, the mutual authentication unit 63 executes a mutual authentication process with the memory unit 300. Further, in advance of receiving audio data from the storage device 300, the mutual authentication unit 63 also executes a mutual authentication process with the storage device 300. Further, in the course of executing a mutual authentication process, the mutual authentication unit 63 also executes the above-referred MAC arithmetic operation. To effectuate mutual authentication, those data stored in the storage device 300 are utilized. Further, in advance of exchanging input and output of audio data with a personal computer 100 or another personal computer 100 on a network service line, the mutual authentication unit 63 also exchanges mutual authentication with the personal computer 100 or the other personal computer 100 on a network service line.

As mentioned above, by way of selectively utilizing the ECB or CBC mode prescribed by FIPS PUB 81, the ciphering/decoding unit 64 executes a ciphering process.

Of those modes prescribed by FIPS81, the ciphering/decoding unit 64 selectively decodes the ECB and CBC modes. When decoding the CBC mode, by applying a 56-bit key data "k" for example, the ciphering/decoding unit 64 decodes a ciphered letter by way of processing ciphered blocks comprising 64 bits as a dealing unit before eventually generating a plain letter.

The above-referred controlling unit 65 integrally controls functional operations executed by the random digit generating unit 60, memory unit 61, key-generating/key arithmetic operation unit 62, mutual authentication unit 63, and the ciphering/decoding unit 64.

[Editing Module 44]

As shown in FIG. 16 for example, based on an operating instruction from user, the editing module 44 edits track data files stored in the flash memory 34 of the storage device 300 whereby generating new track data files.

[Compression/Elongation Module 45]

For example, when reproducing such an audio data decoded from a ciphered condition input from the storage device 300 for example, the compression/elongation module 45 initially elongates the corresponding audio data compressed by the ATRAC-3 data file format and then delivers the elongated audio data to the D/A converter 47. Further, when storing such an audio data input from a CD, a DVD, or a personal computer into the above storage device 300, the compression/elongation module 45 compresses the corresponding audio data based on the ATRAC-3 data file format.

[D/A Converter 47]

By way of converting digital-format audio data received from the compression/elongation unit 45 into analog-format audio data, the D/A converter 47 outputs the D/A converted audio data to the speaker unit 46.

[Speaker Unit 46]

The speaker unit 46 outputs audio sound corresponding to analog audio data input from the D/A converter 47.

[A/D Converter 48]

For example, by way of converting analog-format audio data input from a CD player into digital format, the A/D converter 48 outputs the A/D converted audio data to the compression/elongation module 45.

[Memory 49]

The memory 49 itself consists of an E2PROM (i.e., a flash memory for example), which internally stores those key data including the above-referred enabling key block (EKB) or device key blocks generated via the (EKB) and device ID as a device identifying element.

[Process for Storing Contents Data in a Storage Device and Process for Reproducing the Contents Data]

Contents data are shifted between the reproduction apparatus and the storage device 300 shown in FIG. 15. Concretely, a process for reproducing contents data via the reproduction apparatus 200 and simultaneous storage of the contents data in the flash memory 34 of the storage device 300 is executed. In addition, a process for reproducing the contents data by way of transmitting the data from the flash memory 34 of the storage device 300 to the reproduction apparatus 200 is executed.

Figure 28:
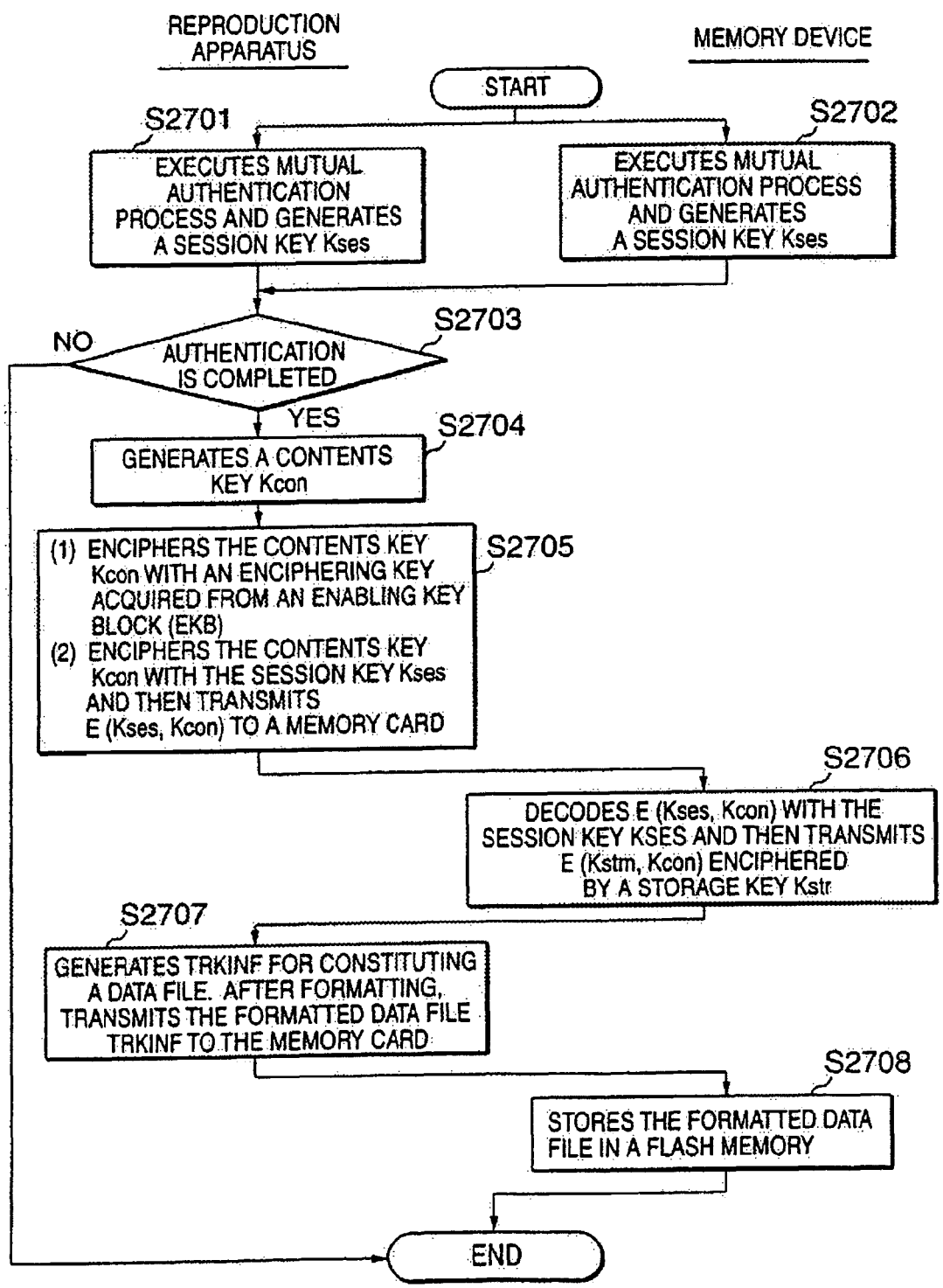
FIG. 28 presents a flowchart in the process for recording relevant data in the data processing system related to the present invention.

The process for recording and reproducing contents data is described below. First, by referring to a flowchart shown in FIG. 28, the process for recording contents data from the reproduction apparatus 200 to the flash memory 34 of the storage device 300 is described below.

Figure 29:
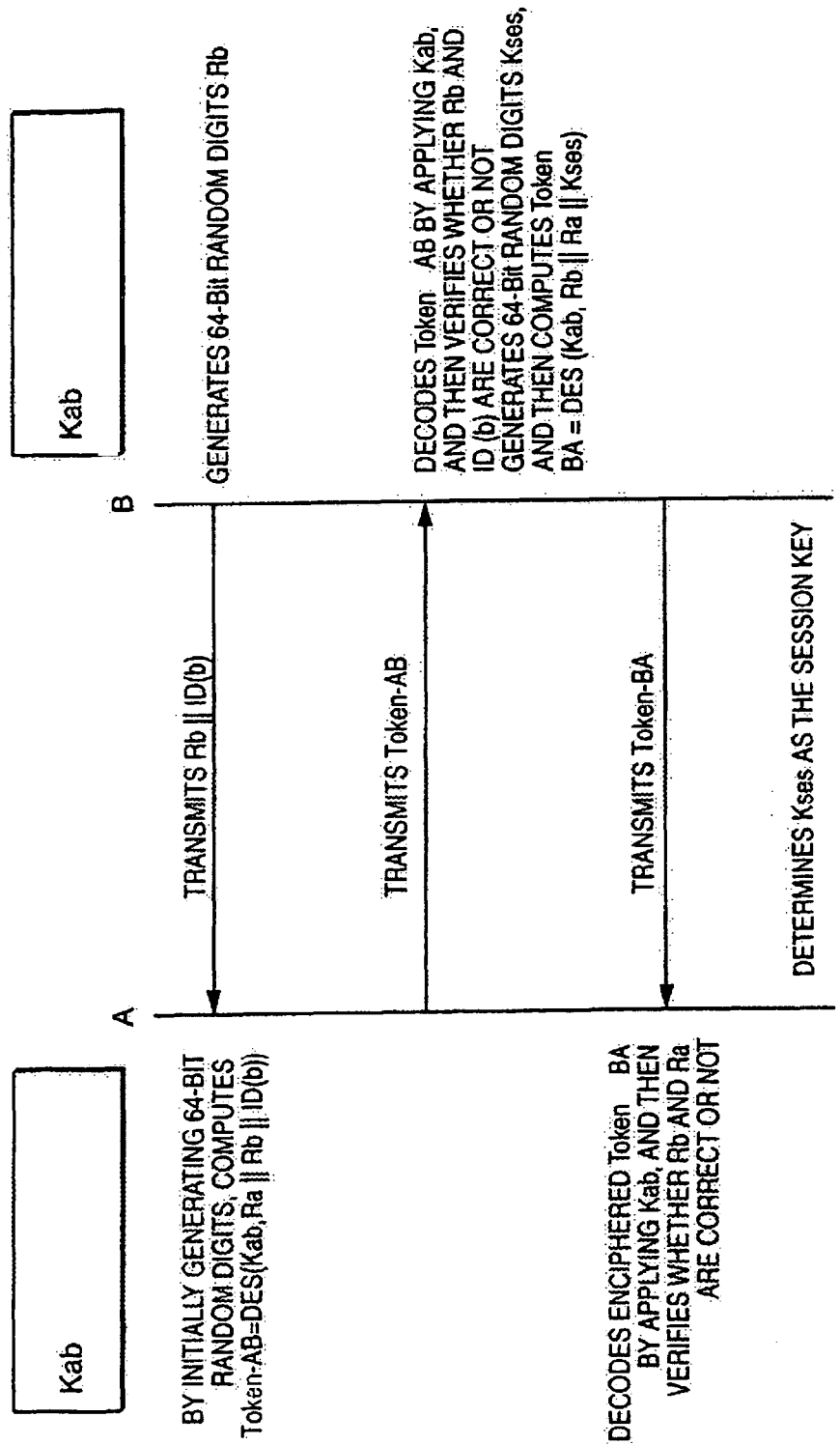
FIG. 29 presents a mutual authentication process applicable to the data processing system related to the present invention.

In advance of shifting contents data, initially, the reproduction apparatus 200 and the storage device 300 respectively execute a mutual authentication process shown in the processing step S2701 and S2702. FIG. 29 designates a mutual authentication method specified as the ISO/IEC 9798-2 by applying a common-key ciphering format. Although DES is utilized as the common-key ciphering format in FIG. 29, any format other than DES may also be utilized insofar as the common-key ciphering format is practicable. Referring to FIG. 29, initially, unit B generates 64-bit random digits Rb and then transmits the random digits Rb and a self-identifying code ID(b) to a unit A. On receipt of the transmitted codes, the unit A newly generates 64-bit random digits, and then, based on the CBC mode of the DES, the unit A serially ciphers the received data in order of Ra, Rb, and ID (b) by applying a ciphering key (Kab), and finally returns the ciphered data to the unit B. The ciphering key (Kab) is individually stored in the corresponding recording elements as the secret key in common with the units A and B. In the ciphering process with the ciphering key (Kab) utilizing the CBC mode of DES format for example, the initial value and the random digits Ra are treated with an exclusive OR process. Next, both values are ciphered via the DES ciphering unit by applying the ciphering key (Kab) whereby generates a ciphered letter E1. Next, the ciphered letter E1 and the above random digits Rb are treated with an exclusive OR process. Next, the ciphered letter E1 and the random digits Rb are ciphered by the DES ciphering unit by applying the ciphering key (Kab) to generate another ciphered letter E2.

Further, the ciphered letter E2 and ID (b) are treated with an exclusive OR process. Finally, the DES ciphering unit generates a transmissible data (Token-AB) by means of a ciphered letter E3 generated via a ciphering process using the ciphering key (Kab).

On receipt of the data, the unit B decodes the received data by applying the authenticating key (Kab) which is stored in respective recording elements as the common secret key. The received data is decoded via those serial steps described below. First, the ciphered letter E1 is decoded by applying the authenticating key (Kab) to generate random digits Ra. Next, the ciphered letter E2 is decoded by applying the authenticating key (Kab). Next, the decoded result and the ciphered letter E1 are treated with an exclusive OR process to generate random digits Rb. Finally, the ciphered letter E3 is decoded by applying the authenticating key (Kab). Next, the decoded data and the decoded letter E2 are treated with an exclusive OR process to generate ID (b). Next, of those resultant data Ra, Rb, and ID (b), a verification process is executed to check to see whether the resultant data Rb and ID (b) precisely coincide with the data transmitted from the unit B or not. Only when the coincidence between both is verified, the unit B authenticates that the unit A corresponds to the verified proper one.

Next, by applying random digits, the unit B generates a session key (Kses) usable after effecting the authentication process. Next, by applying the authentication key (Kab) via the CBC mode of the DES format, the unit serially ciphers the random digits Rb and Ra, and the session key (Kses) before returning them to the unit A.

On receipt of the above ciphered random digits and the session key, the unit B decodes the received ciphered data with the authentication key Kab based on the decoding method identical to that is applied to the decoding process executed by the unit B. Of those resultant data comprising random digits Rb, Ra, and the session key (Kses), the unit A executes a verification process to check to see whether the resultant data Rb and Ra exactly coincide with the data transmitted by the unit A or not. Only when the coincidence between them is verified, the unit A authenticates that the unit B corresponds to the verified proper one. After mutually authenticating to be the proper one, the session key (Kses) is utilized as the common key for executing confidential communication subsequent to the mutual authentication.

In the event if malfeasance or discrepancy are detected in the course of verifying the received data, it is so defined that mutual authentication has been dismissed, whereby terminating the related processes. In the process step S2703 shown in the flowchart, the above failure is designated as "No".

When the mutual authentication has been effectuated ("Yes" in the process step S2703), step S2794 is entered, in which the reproduction apparatus 200 executes a process for generating a contents key (Kcon). This process is executed by the above-referred key generating/key arithmetic operation unit 62 by applying random digits generated by the above-referred random digit generating unit 60 shown in FIG. 15.

Next, step S2705 is entered, in which those serial processes are executed. First, key data E (KEK, Kcon) is generated by way of ciphering a contents key (Kcon) by applying a ciphering key (KEK) acquired from the enabling key block (EKB). Secondly, the contents key (Kcon) is ciphered by applying the session key (Kses) generated via there-above authentication process, whereby generating a key data E (Kses, Kcon), which is then transmitted to a memory card for constituting the above storage device 300.

Next, step S2706 is entered, in which the storage device 300 acquires the contents key (Kcon) by way of decoding the above key data E (Kses, Kcon) received from the reproduction apparatus 200 by applying the session key (Kses). Next, the contents key (Kcon) is ciphered by a storage key (Kstm) previously stored in the storage device 300, whereby generating a key data E (Kstm, Kcon), which is then transmitted to the reproduction apparatus 200.

Next, step S2707 is entered, in which, using the key data E (KEK, Kcon) generated via the step S2705 and the other key data E (Kstm, Kcon) received from the storage device 300 in the preceding step S2706, the reproduction apparatus 200 generates a track data domain TRKINF for constituting the data file shown in FIG. 21. After formatting the data file, the formatted data file is transmitted to the storage device (memory card) 300.

Next, step S2708 is entered, in which the storage device (memory card) 300 stores the formatted data file received from the reproduction apparatus in its own flash memory.

By virtue of the above arrangement, as shown in FIGS. 21 and 23, it is so arranged that the above-referred track data domain TRKINF of the formatted data file stores the following: the ciphered contents key data E (KEK, Kcon) which is ciphered from the contents key (Kcon) by applying the ciphering key (KEK) acquired from the enabling key block (EKB); and the other ciphered contents key data E (Kstm, Kcon) ciphered from the contents key (Kcon) by applying the storage key (Kstm) previously stored in the storage device 300.

It is also possible to execute a process for ciphering music data and picture data by way of directly utilizing the contents key (Kcon) as the key for ciphering contents data. Further, it is also possible to initially generate those ciphering keys by classifying them into parts unit or block units based on the data related to generation of the contents keys and other keys on the individual basis to enable the key ciphering process to be executed per unit of parts and per block.

In the reproduction process utilizing the above-described data file, it is possible to acquire the contents key (Kcon) by way of selectively applying either of the ciphering key data E (KEK, Kcon) and the other ciphering key data E (Kstm, Kcon).

Figure 30:
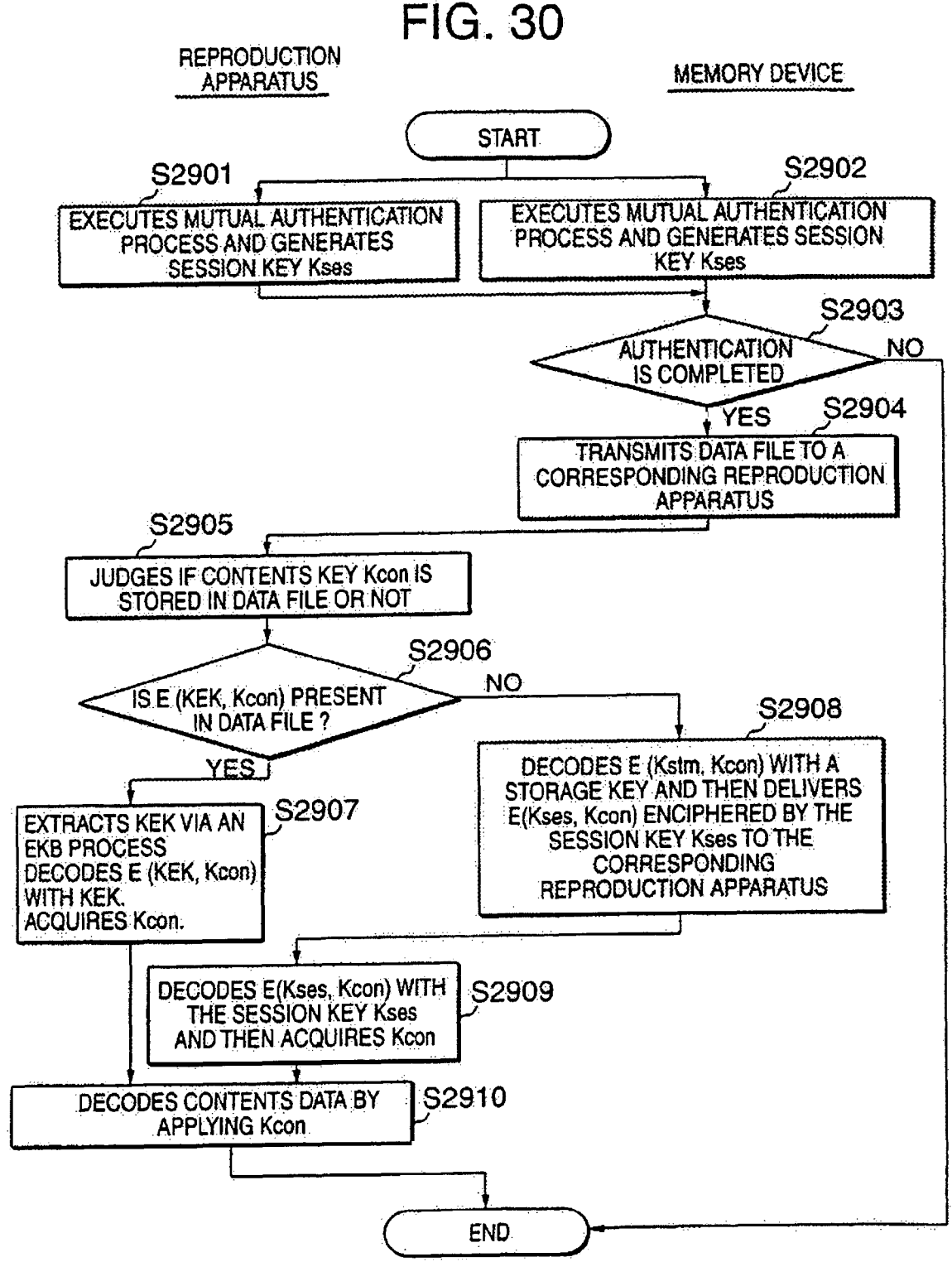
FIG. 30 presents a flowchart in the process for reproducing relevant data in the data processing system related to the present invention.

Next, referring to the flowchart shown in FIG. 30, the process for reading data stored in the flash memory 34 of the storage device 300 executed by the reproduction apparatus 200, in other words, the case of executing the reproduction process, is described below.

In advance of shifting data, initially, the reproduction apparatus 200 and the storage device 300 respectively execute the mutual authentication process corresponding to step S2901 and S2902 in the same way as was previously done via the flowchart shown in FIG. 29. When the mutual authentication has been dismissed ("No" as designated in step S2903), whole processes are terminated.

When the mutual authentication has been effectuated ("Yes" as designated in step S2903), step S2904 is entered, in which the storage device 300 transmits the specified data file to the reproduction apparatus 200. On receipt of the data file, the reproduction apparatus 200 checks the track data domain TRKINF in the data file in order to identify actual state of the contents key (Kcon) under storage. This process enables the reproduction apparatus 200 to identify whether the contents key, i.e., the ciphering key data E (KEK, Kcon), ciphered by the ciphering key (KEK) acquired by the enabling key block (EKB) is actually stored in the track data domain TRKINF or not. Presence or absence of the key data E (KEK, Kcon) can be identified by the data [EKI] present in the track data domain TRKINF in the data file described earlier in reference to FIGS. 21 and 23.

When the ciphering key data E (KEK, Kcon) is stored in the track data domain TRKINF ("Yes" as designated in step S2906), step S2907 is entered to acquire the ciphering key (KEK) via operation of the enabling key block (EKB), and then, based on the acquired ciphering key (KEK), the ciphering key data E (KEK, Kccon) is decoded, whereby acquiring a contents key (Kcon).

Conversely, when the ciphering key data E (KEK, Kcon) is not stored in the track data domain TRKINF ("No" as designated in step S2906), step S2908 is entered, in which, by applying a storage key (Kstm), the controlling module 33 of the storage device 300 decodes the ciphering key data E (Kstm, Kcon) ciphered by the storage key (Kstm) previously stored in the storage device 300. Further, the controlling module 33 generates a data E (Kses, Kcon) ciphered by means of the session key (Kses) communized by the reproduction apparatus 200 and the storage device 300 in the course of the above mutual authentication process, and then transmits the data E to the reproduction apparatus 200.

Next, step S2909 is entered, in which the reproduction apparatus 200 decodes the data (Kses, Kcon) received from the storage device 300 by applying the session key (Kses) before acquiring the contents key (Kcon).

Next, step S2910 is entered, in which the ciphered contents data is decoded by applying the contents key (Kcon) acquired via the above step S2907 or step S2909.

As mentioned above, the contents key (Kcon) is eventually acquired as a result of enabling the reproduction apparatus 200 to decode the data E (KEK, Kcon) by applying the above ciphering key (KEK) via operation of the above enabling key block (EKB) or as a result of executing a predetermined process based on the data E ciphered by the storage key (Kstm) previously stored in the storage device 300.

The process for decoding music data and picture data is executed by applying the contents key (Kcon) functioning itself as the key for decoding contents data. Alternatively, the process for decoding music data and picture data may also be executed per parts unit or per block unit by way of individually generating a decoding key per parts unit or per block unit based on the contents key and data related to generation of other keys in correspondence with parts or blocks respectively constituting contents data.

[Format of the (EKB) for Storing (KEK)]

A summarized format of the enabling key block (EKB) was previously described by referring to FIG. 6. The following description refers to such a concrete example of preserving the key ciphering key (KEK) via storage in the enabling key block (EKB).

FIG. 31 exemplifies a structure of a data file for approving distribution of key, where the data file corresponds to the (EKB) comprising data of the ciphering key (KEK) stored in the enabling key block (EKB). A relevant device (corresponding to a reproduction apparatus) extracts the key ciphering key (KEK) from the above data file as required, and then decodes ciphering key data E (KEK, Kcon) via the ciphering key (KEK), whereby acquiring the contents key (Kcon) before eventually decoding contents data. Details of applicable data are described below.

BLKID-EKB (4 bytes):
Meaning: BLOCKID FILE ID
Function: A value for identifying the foremost of the data file of key distribution:
Value: Fixed value=(EKB) (For example, 0x454B4220)
  MCODE (2 bytes):
Meaning: Manufacturer's code
Function: Identifies manufacturer's name and the product model of the apparatus used for recording data
Value: Upper 10 bits (Manufacturer's code); Lower 6 bits (Product model)
  LKF:
Meaning: Link file information
Function: Identifies a linked file comprising such as contents data to which the key ciphering key (KEK) acquired via the (EKB) is applicable.
Value: 0 to 0xFF
Bit 7:
  1=Applied to the reproduction controlling file (PBLIST)
  0=Not yet applied
bit 6:
  1=Applied to the tempering checking value (ICV)
  0=Not yet used
bit 5 to 0: Reserved
  LINK COUNT:
Meaning: Link count
Function: The number of linked file (For example, ATRAC-3 data file)
Value: 0 to 0xFFFFFFFF VERSION:
Meaning: Version
Function: Designates version of the key distribution approval data file
Value: 0 to 0xFFFFFFFF
 EA:
Meaning: Encryption Algorithm
Function: Designates algorithm for tracing the key distribution approval data file
Value:
  0 to 0xFF
  00h: 3 DES: Process via triple DES modes
  01h: DES: Process via a single DES mode
The triple DES mode process utilizes more than 2 kinds of ciphering keys, whereas the single DES mode utilizes a single ciphering key.
 KEK 1:
Meaning: Key Encrypting Key
Function: A contents key ciphering key ciphered by the root key (corresponding to the uppermost rank) among the enabling key block (EKB).
Value: 0 to 0xFFFFFFFFFFFFFFFF
 KEK 2:
Meaning: Key Encrypting Key
Function: A contents key ciphering key ciphered by the root key (corresponding to the uppermost rank) among the enabling key block (EKB).
Value: 0 to 0xFFFFFFFFFFFFFFFF
 E (VERSION):
Meaning: Encrypted Version
Function: A version number ciphered by the root key (corresponding to the uppermost rank) among the enabling key block (EKB). The lower 4 bytes during the decoding process are reserved.
Value: 0 to 0xFFFFFFFFFFFFFFFF
 SIZE OF TAG PART:
Meaning: Size of tag part
Function: Size (byte) of tag portion of data constituting the key distribution approval data file
Value: 0 to 0xFFFFFFFF
 SIZE OF KEY PART:
Meaning: Size of key part
Function: Size (byte) of key portion of data constituting the key distribution approval data file
Value: 0 to 0xFFFFFFFF
 SIZE OF SIGN PART:
Meaning: Size of sign part
Function: Size (byte) of sign portion of data constituting the key distribution approval data file
Value: 0 to 0xFFFFFFFF
 TAG PART:
Meaning: Tag part
Function: Data corresponding to tag portion of data constituting the key distribution approval data file
Value: All values
In case of less than 8 bytes, 0 is used to make it to be 8 bytes.
 KEY PART:
Meaning: key part
Function: Data corresponding to key portion of data constituting the key distribution approval data file
Value: All values
 SIGNATURE PART:
Meaning: Signature part
Function: Data corresponding to signature portion of data constituting the key distribution approval data file As shown in FIG. 31 and comprehensible from the above description, the data file containing distribution approved key data provided for the corresponding device stores the data LKF for identifying a specific link file comprising such contents data to which the key ciphering key (KEK) acquired from the above-referred data file is applicable. In addition, the above data file also stores the data Link Count designating the number of files being linked (for example, the ATRAC-3 data file). By way of referring to the above data LKF and Link Count, it is possible for the reproduction apparatus to identify whether such a data requiring application of the key ciphering key (KEK) acquired from the above key distribution approval data file is actually present or not, and yet, also possible to identify the number of this data.

[Decoding and Reproduction of Data Using Link Data]

Figure 32:
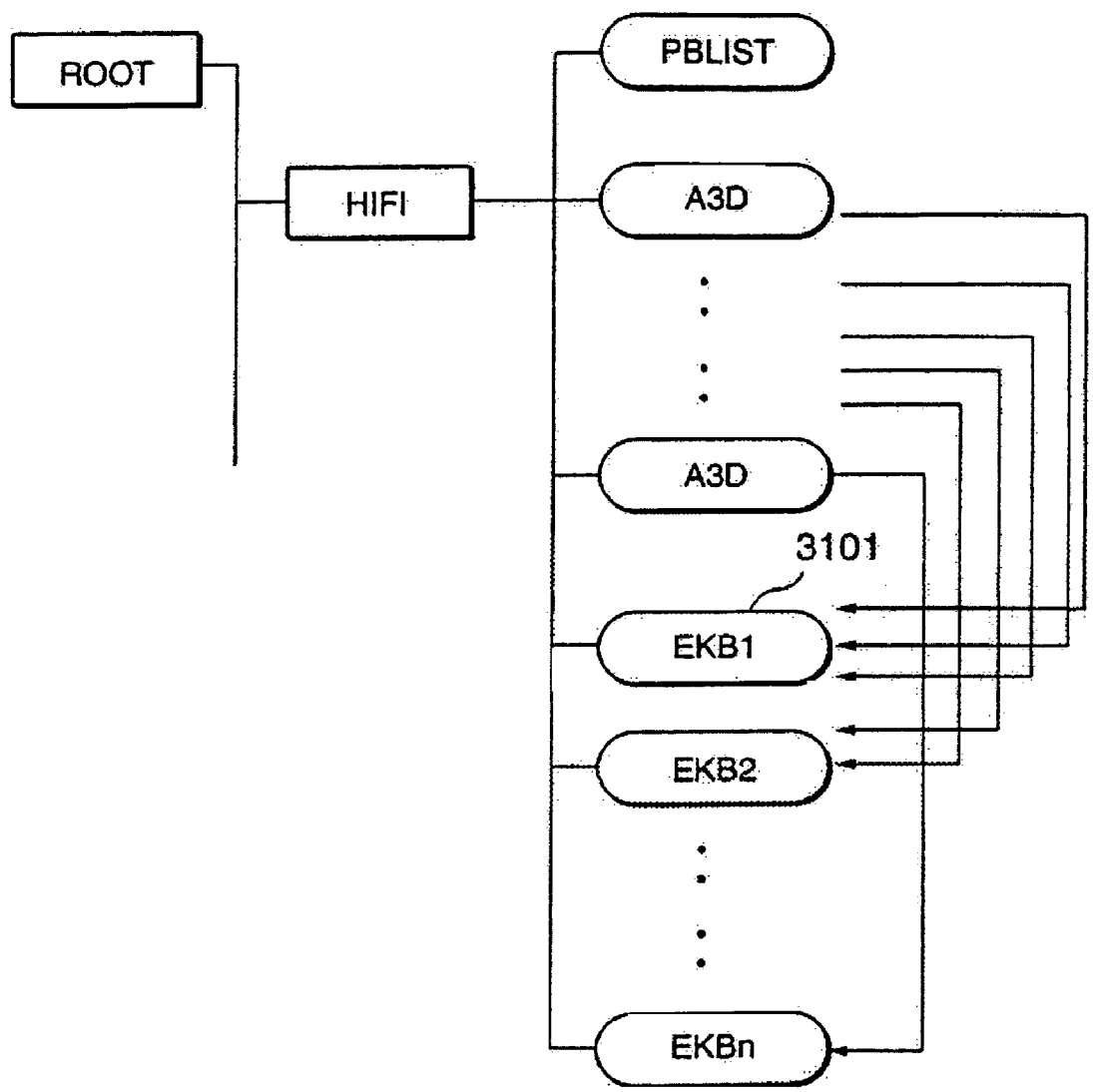
FIG. 32 designates an aspect of stored data in the data processing system related to the present invention.

FIG. 32 exemplifies a data storage domain of the storage device 300, concretely, an example of the data file stored in the flash memory 34 of the storage device 300. FIG. 32 solely exemplifies a structure of a directory of high-fidelity music data. However, it is also allowable to include such a directory comprising picture files.

The music-data directory shown in FIG. 32 incorporates a reproduction controlling file (PBLIST) and a plurality of ATRAC-3 data files (A3D). Further, the storage device 300 also stores a plurality of enabling key blocks (EKB). A pointer contained in the ATRAC-3 data file (A3D) identifies such an enabling key block (EKBn) for acquiring a specific contents key applicable to the decoding of the ATRAC-3 data file (A3D). As shown in FIG. 32, one (shown as 3101) of the enabling key blocks (EKB1) is utilized for decoding a plurality (3 units) of the ATRAC-3 data files (A3D).

In this case, such a data applicable to three contents data is stored in the Link Count data of a key distribution approval data file corresponding to the above referred enabling key block (EKB-1) 3101.

Figure 33:
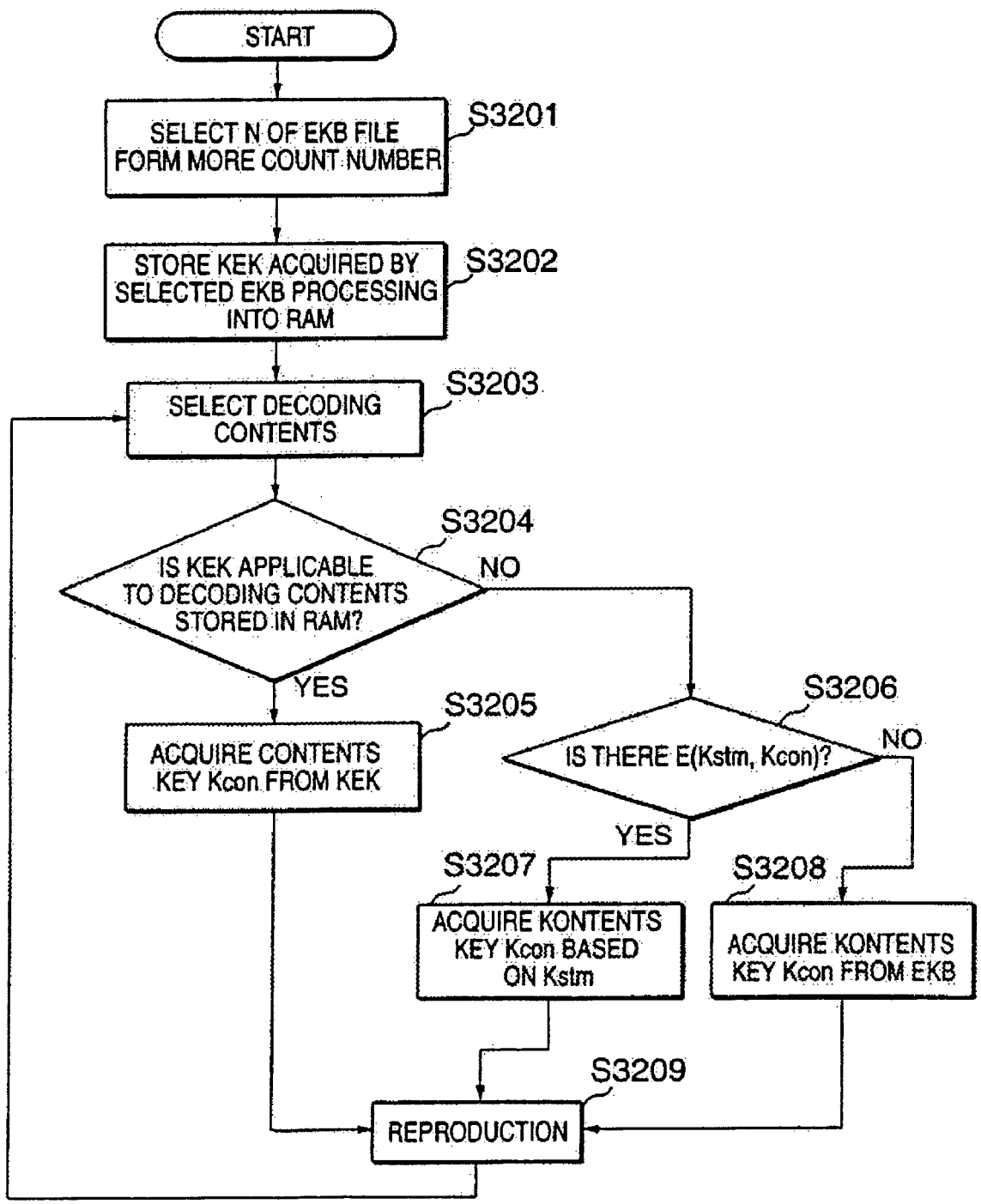
FIG. 33 presents a flowchart of the process for decoding relevant data via utilization of an enabling key block (EKB) in the data processing system related to the present invention.

FIG. 33 designates a flowchart describing serial processes for decoding and reproducing a contents data from a storage device 300 consisting of a memory card which stores a plurality of contents data files and a plurality of enabling key blocks (EKB) shown in FIG. 32.

Those serial processes are executed by a reproduction apparatus 200 when the memory card as the storage device is loaded in the reproduction apparatus 200 or when power-supply source of the reproduction apparatus 200 loaded with the memory card is turned ON.

Initially, when step S3201 is entered, the reproduction apparatus 200 reads track data of individual (EKB) files and then checks the "Link Count" data. Next, the reproduction apparatus 200 selects such (EKB) files corresponding to a predetermined number [n] in order of those (EKB) files with a greater number of the Link Count data. The unit number [n] corresponds to the unit number storable in a predetermined memory domain of the reproduction apparatus, i.e., the unit number storable in the domain which preserves the key ciphering key (KEK) in storage.

Next, step S3202 is entered, in which the selected (EKB) files are processed, and then, the reproduction apparatus 200 acquires a plurality (corresponding to [n]) of the key ciphering keys (KEK), which are then stored in a predetermined domain of a RAM installed as the key storage domain of the reproduction apparatus 200.

Next, step S3203 is entered, in which the reproduction apparatus 200 selects such a contents data that should be decoded and reproduced. When the next step S3204 is entered, the reproduction apparatus 200 identifies whether the predetermined key ciphering key (KEK) applicable to the decoding of the selected contents data is actually stored in the RAM or not. If the key ciphering key (KEK) is actually present in the RAM ("Yes"), step S3205 is entered, in which, based on the corresponding key (KEK), the reproduction apparatus 200 decodes the ciphering data E (KEK, Kcon) and then acquires a contents key. When the next step S3209 is entered, the reproduction apparatus 200 decodes and reproduces the contents data by applying the acquired content key.

While the above step S3206 is underway, in the event that the key ciphering key (KEK) applicable to the decoding of the selected contents data is not stored in the RAM, step S3206 is entered, in which the reproduction apparatus 200 identifies whether the contents key ciphered by the storage key, i.e., the ciphering data E (Kstm, Kcon) is actually present or not. If it is present, then, step S3207 is entered, in which the ciphering data E (Kstm, Kcon) is decoded to enable the reproduction apparatus 200 to acquire the contents key, whereby proceeding to step S3209, in which, the reproduction apparatus 200 decodes and reproduces contents data by applying the acquired contents key.

If it is identified that the ciphering data E (Kstm, Kcon) is absent while step S3206 is underway, the reproduction apparatus 200 acquires a proper enabling key block (EKB) to be applied to the contents data that should be decoded from the storage device 300, and then decodes the acquired enabling key block (EKB) to secure the key ciphering key (KEK). The reproduction apparatus 200 further decodes the ciphering data E (KEK, Kcon) whereby acquiring the contents key. When step S3209 is entered, the reproduction apparatus 200 decodes and reproduces the contents data by applying the acquired contents key.

As described above, the reproduction apparatus 200 initially checks the "Link Count" data of a plurality of enabling key blocks (EKB) previously stored in the storage device 300, and then executes decoding of such enabling key blocks containing a greater number of the "Link Count" data, whereby storing the key-ciphering key (KEK) in the reproduction apparatus itself. Accordingly, whenever reproducing contents data, the reproduction apparatus is enabled to utilize the key ciphering key (KEK) stored in its own RAM at a high probability, thus making it possible to effectively reproduce contents data.

[Distribution of Authenticating Keys Utilizing (EKB)]

In the case of distributing ciphering keys via utilization of the above-referred enabling key blocks (EKB), it is so arranged that such an authenticating key lkn usable for the authentication process is distributed to all the concerned. The system for executing an authentication process conforming to the common key format via delivery of an authenticating key to be held in common with relevant devices as a safe secret key is described below.

The method of executing a mutual authentication process via utilization of the common-key-applied ciphering format in accordance with the ISO/IEC 9798-2 standard was described earlier by referring to FIG. 29. Prior to execution of data transmission and reception, in order to confirm and verify the rightness of the corresponding devices and parties, such mutual authentication processes are executed. In the actual authentication process, data is transmitted and received between the corresponding devices. For example, the reproduction apparatus and the storage device communize an authenticating key (Kab). The common key (Kab) is distributed to the corresponding reproduction apparatus by way of utilizing the above-referred enabling key blocks (EKB).

Figure 34:
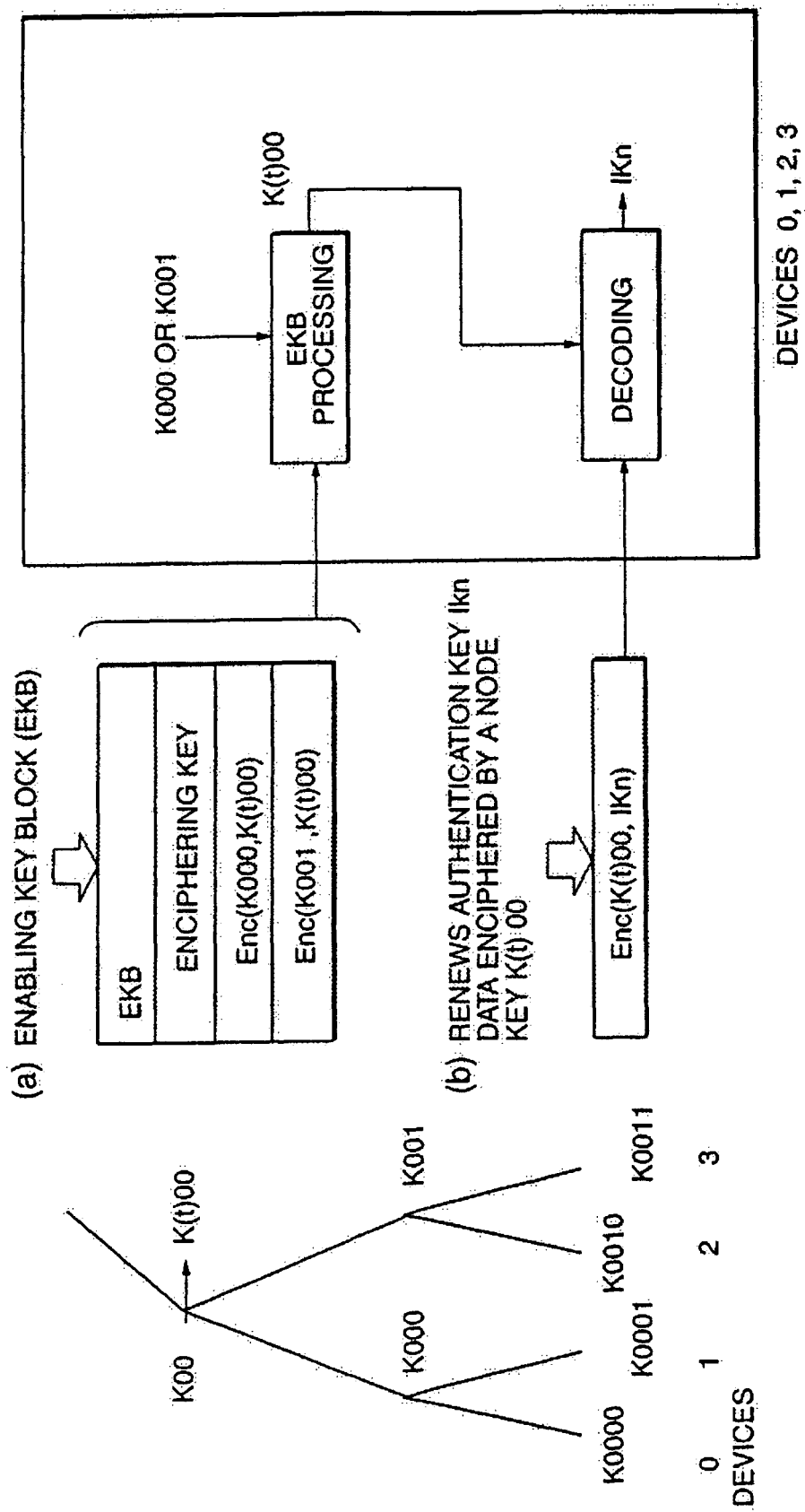
FIG. 34 presents structure of data for jointly distributing an enabling key block (EKB) and an authentication key and an example of processing the data via a relevant device in the data processing system related to the present invention.
Figure 35:
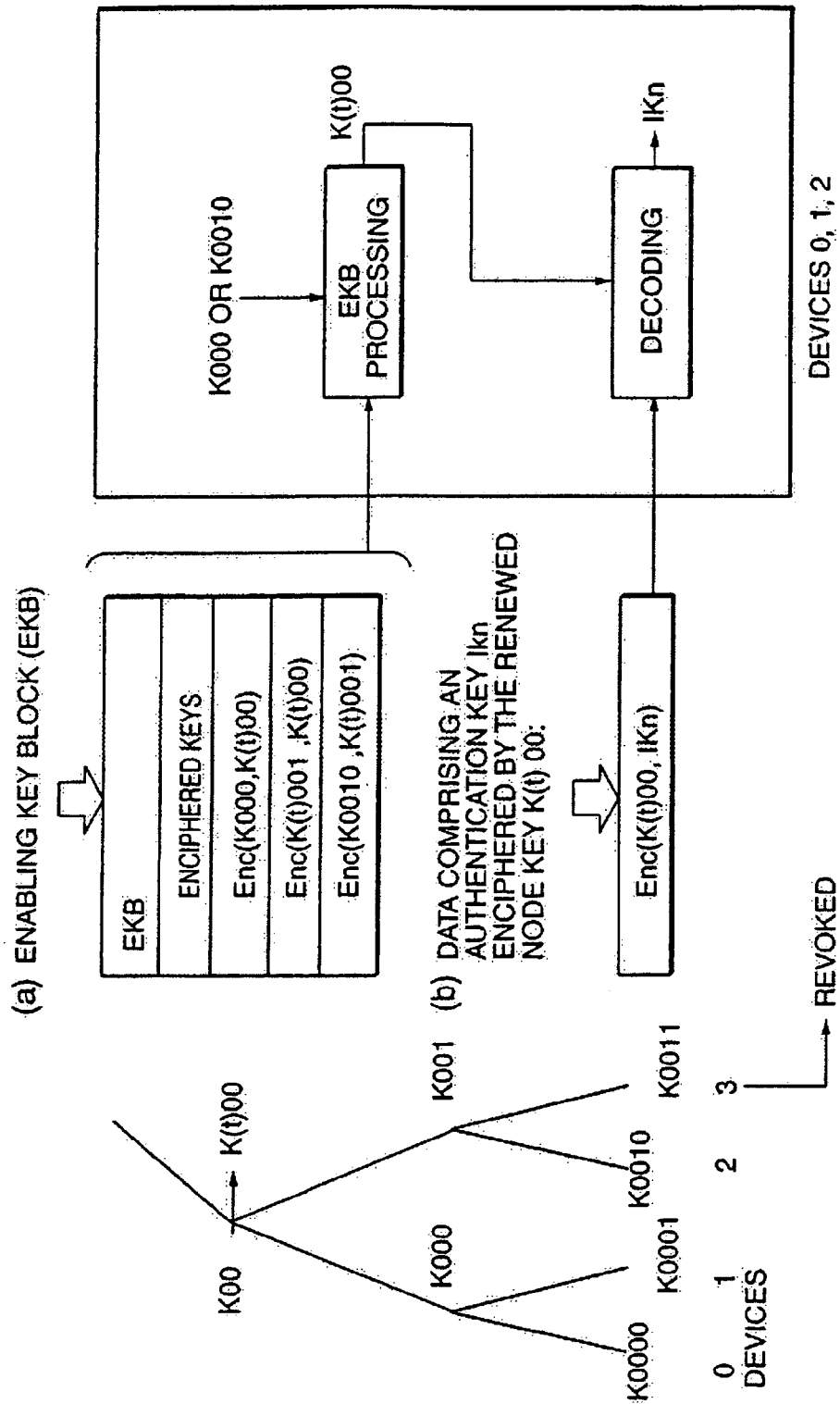
FIG. 35 presents another structure of data for jointly distributing an enabling key block (EKB) and an authentication key and an example of processing the data via a relevant device in the data processing system related to the present invention.

FIGS. 34 and 35 respectively exemplify a system for distributing a common authenticating key lkn to a plurality of devices via the enabling key blocks (EKB). FIG. 34 exemplifies such a case in which a decodable authenticating key lkn is distributed to devices 0, 1, 2, and 3. FIG. 35 exemplifies such a case in which a decodable authenticating key lkn is distributed to devices 0, 1, and 2 by solely revoking device 3 among devices 0, 1, 2, and 3.

In the system shown in FIG. 34, by way of utilizing those node keys and leaf-keys owned by devices 0, 1, 2, and 3 in conjunction with a data (b) comprising an authenticating key lkn ciphered by a updated node key k (t) 00, such enabling key blocks (EKB) capable of decoding the updated node key k (t) 00 is generated, and then the generated enabling key blocks (EKB) are respectively distributed to the devices 0, 1, 2, and 3. By initially decoding the received enabling key blocks (EKB), these devices respectively acquire the updated node key k (t) 00, and then, decode the authenticating key Enc (k (t) 00, lkn) ciphered by the acquired node key k (t) 00, whereby making it possible to eventually acquire the authenticating key lkn.

Even when receiving an identical enabling key block (EKB), other devices 4, 5, 6, 7, . . . are respectively unable to acquire such a node key k (t) 00 updated via the (EKB) insofar as utilizing their own node keys and leaf-keys. Because of this, it is possible to safely transmit the authenticating key exclusively to the verified proper devices.

On the other hand, FIG. 35 exemplifies such a case in which, based on a judgment for defining that the device 3 is revoked as a result of the key-leakage for example, such an enabling key block (EKB) solely decodable by the remaining devices 0, 1, and 2 is generated and then distributed to each of these devices 0, 1, and 2. In this case, such an enabling key block (EKB) (a) and such a data comprising an authenticating key lkn (b) ciphered with the node key (k (t) 00) shown in FIG. 35 are respectively distributed to those devices 0, 1, and 2.

Decoding sequence is shown to the right of FIG. 35. Initially, using leaf-keys or node keys drawn out of the received enabling key blocks (EKB), the devices 0, 1, and 2 respectively acquire a updated node key (k (t) 00) by way of decoding their own leaf-keys or node keys. Next, by way of decoding the updated node key (k (t) 00), these devices 0, 1, and 2, respectively acquire an authenticating key lkn.

Even when receiving an identical (EKB) data, other devices 4, 5, 6, . . . for example are respectively unable to acquire the updated node key (k (t) 00) by applying their own leaf-keys or node keys. Likewise, the revoked device 3 is not able to acquire the updated node key (k (t) 00) by applying its own leaf-key or node key. Accordingly, only those device entitled with the verified proper rights are able to decode the authenticating key lkn for individual use.

As described above, by way of distributing the authenticating key via utilization of the enabling key block (EKB), it is possible to reduce the volume of data and safely distribute the authenticating key that can solely be decoded by those which (who) are entitled with verified proper right. Further, such an authenticating key via distribution of the (EKB) data delivered after being ciphered by the enabling key block (EKB) data is subject to control of version, whereby making it possible to execute renewal processes per version, and yet, it is also possible to revoke any device based on optional timing.

Because of the above process for delivering the authenticating key via the (EKB) applied processes, any of the revoked devices such as reproduction apparatuses can not effectuate mutual authentication with the corresponding storage device, whereby making it practically impossible to commit improper decoding of data.

Further, by way of utilizing transmission of the authenticating key via the (EKB) applied processes, it is also possible to properly control storage and reproduction of data against any recording medium other than the memory card such as a hard disc loaded in the reproduction apparatus for example.

As described earlier by referring to FIGS. 28 to 30, in order to execute the processes for recording and reproducing contents data by applying a storage device, mutual authentication processes are duly executed. As a result, on condition that the mutual authentication has duly been effectuated, recording and reproduction of relevant data are properly executed. The mutual authentication processes are effectively implemented between those storage devices such as memory cards compatible with the mutual authentication process. On the other hand, in the course of storing and recording data into and from such memory means devoid of ciphering function such as a hard disc or a CD-R (Compact Disc Recordable) loaded in a reproduction apparatus respectively being incompatible with the mutual authentication process, it does not make sense to execute the mutual authentication process. Nevertheless, the inventive system enables the authentication program to be executed even in the case of storing or reproducing data by applying such reproduction apparatuses incompatible with the mutual authentication process. Inasmuch as the hard disc and CD-R are respectively incompatible with the mutual authentication process, it is so arranged that a virtual memory card (the "Memory Stick", a product and a registered trade name of Sony Corporation) is loaded in each reproduction apparatus to enable the mutual authentication process to be executed between the "Memory Stick" and the reproduction apparatus to establish the condition compatible with the mutual authentication, whereby enabling storage of data into such a storage device devoid of authenticating function or reproduction of data from this storage device.

Figure 36:
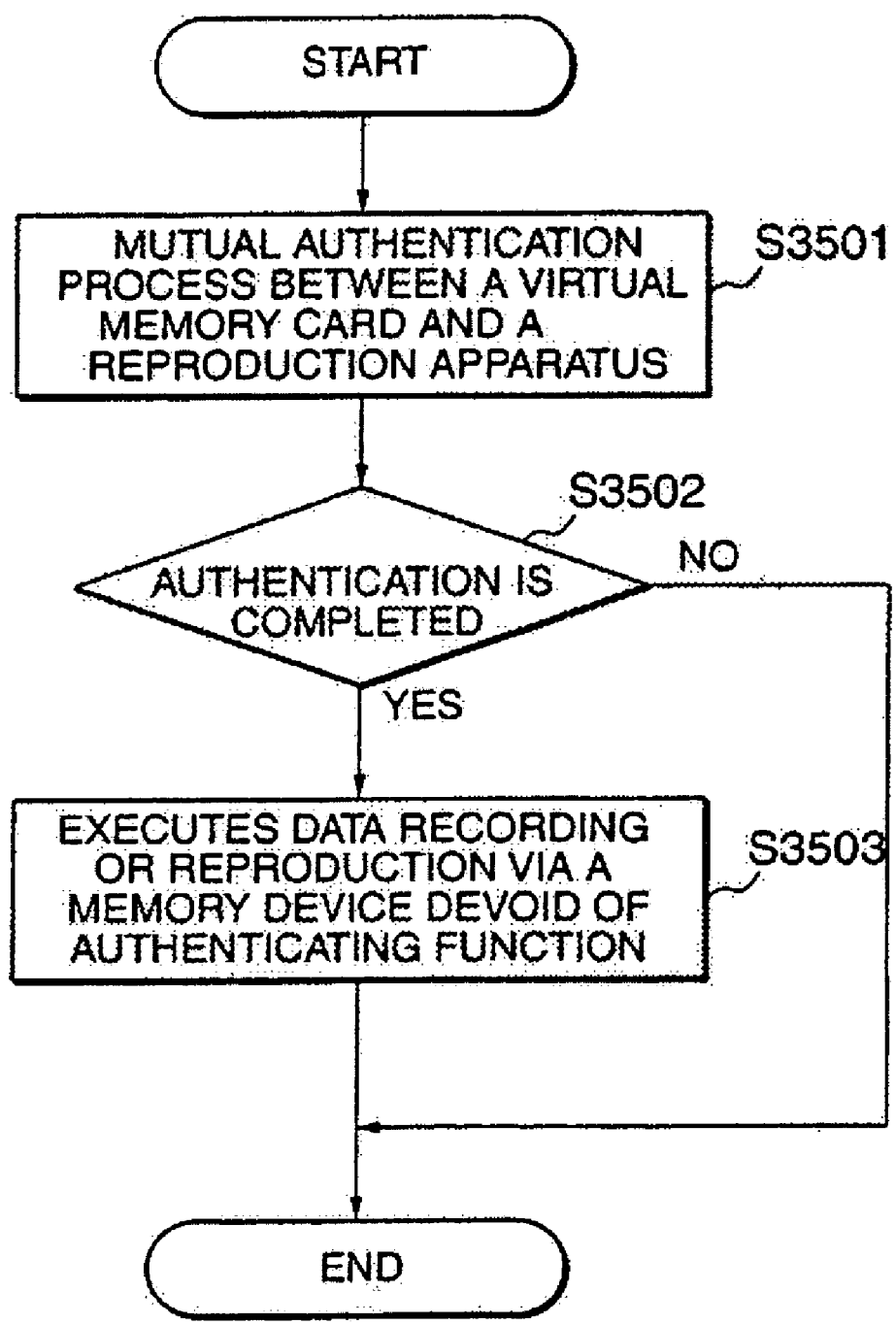
FIG. 36 designates sequence of an authentication process by way of applying a virtual memory card in the data processing system related to the present invention.

FIG. 36 designates a flowchart describing serial processes for recording and reproducing data by applying a virtual memory card. Initially, the corresponding reproduction apparatus executes a mutual authentication process between a virtual memory card loaded therein. When step S3502 is entered, the reproduction apparatus identifies whether the mutual authentication has been effectuated or not. Next, on condition that the mutual authentication has been implemented, step S3503 is entered, in which recording and reproduction of data are executed by applying such a hard disc, a CD-R, or a DVD devoid of the authenticating function.

While step S3502 is underway, if it is identified that the mutual authentication has resulted in failure, neither recording nor reproduction of data utilizing a hard disc, or a CD-R, or a DVD devoid of authenticating function corresponding to step S3503 is executed.

The above-referred virtual memory card is previously loaded with an authentication key described earlier by referring to FIG. 16. Further, it is so arranged that the authentication key usable by the reproduction apparatus is provided via the above-referred enabling key block (EKB).

As described above, by causing the enabling key block (EKB) to deliver the authentication key usable by the reproduction apparatus, it is possible to solely provide such a properly licensed reproduction apparatus with an authentication key capable of exchanging mutual authentication with the corresponding virtual memory card. As a result, an enabling authentication key is not delivered to any of improper apparatuses such as a revoked reproduction apparatus for example. Such a reproduction devoid of an enabling authentication key fails to implement mutual authentication, in consequence, such a revoked reproduction apparatus fails to properly record and reproduce data via utilization of such a memory card incorporating authenticating function as well as such a hard disc, a CD-R, or a DVD devoid of the above authenticating function, whereby making it possible to prevent any of the improper apparatuses from illegally recording or reproducing data.

Concretely, of those data processing apparatuses individually constituting leaves of the hierarchical key tree structure, such an enabling key block (EKB) for providing an authenticating key is solely decodable by such a properly licensed data processing apparatus, whereas the enabling key block (EKB) is not decodable by such an improper data processing apparatus devoid of a proper license. This arrangement prevents such an improper data processing apparatus from exchanging authentication with a virtual memory card loaded in the improper data processing apparatus, thus realizing such a license system capable of preventing such an improper data processing apparatus from illegally utilizing contents data.

[Construction of Integrity Checking Value (ICV)]

Next, such a system for identifying the state of actually occurred tampering with the contents data or absence of this condition is described below. This process is effected to prevent the contents data from illegally being tampered therewith via computation of integrity checking value (ICV) in correspondence with the contents data.

For example, the integrity checking value for checking the act of tampering with the contents data is computed by applying Hash function to the contents data based on an equation ICV=Hash (Kicv, C1, C2, . . . ). The Kicv designates a key for generating the integrity checking value. C1, C2 individually designate data of contents. To implement the above equation, message authentication code MAC is utilized in order to authenticate important data of the contents. As mentioned earlier, the message authentication code MAC is also included in the ATRAC-3 data file described in reference to FIG. 21. By way of utilizing the above data and MAC, computation of the integrity checking value is executed.

Figure 37:
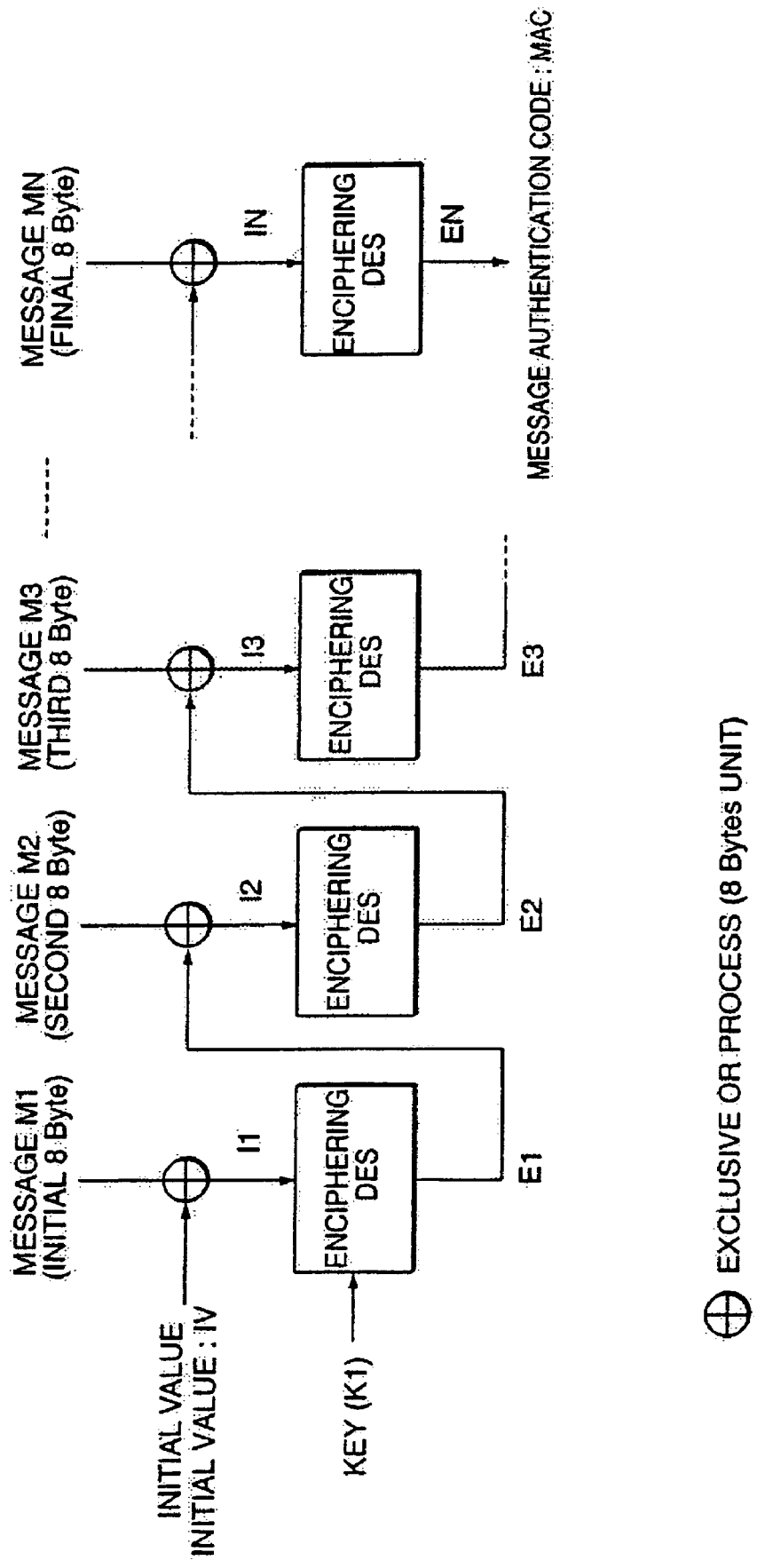
FIG. 37 designates an example of a message authentication code (MAC) used for generating integrity checking value (ICV) usable for the data processing system related to the present invention.

FIG. 37 designates an example of the generation of the above referred MAC Value via utilization of the DES ciphering process. As shown in FIG. 37, the objective message is split into 8 byte units comprising M1, M2, . . . MN. First, the initial value IV and the split message M1 are jointly treated with an exclusive OR process whereby generating a resultant value I1. Next, the resultant value I1 is added to the DES ciphering unit, which is then ciphered by applying a key K1 before generating an output value E1. Next, the output value E1 and the split message M2 are jointly treated with an exclusive OR process to generate an output value I2. Then, the output value I2 is added to the DES ciphering unit, which is then ciphered by applying the ciphering key K1 before generating an output value E2. These serial processes are then repeated until all the split messages are ciphered. The finally output value EN constitutes the "message authentication code" MAC. To constitute the above messages, it is allowable to utilize such partial data for constituting contents-related data such as contents data and header data as the object of the above authentication process.

By way of applying Hash function to the above-referred MAC value for authenticating the message contents and also to the above referred key (Kicv) for generating the integrity checking value ICV, the ICV value is generated in order to check integrity of contents data. After comparison between such an ICV value generated simultaneous with generation of contents data verified free of the tampered act and another ICV value newly generated based on the contents data, if an exactly identical ICV value is generated, it verifies that there is no act of tampering with the contents data. Conversely, if the resultant ICV values differ from each other, it is identified that the contents data are actually tampered with.

By way of applying a plurality of the message authentication codes MAC generated in correspondence with individual contents data, it is possible to generate a single integrity checking value ICV. For example, an integrity checking value ICV is computed by applying a plurality of the MAC values in accordance with an equation shown below.

$$ICV=MAC(Kicv, C\_MAC[0] \| C\_MAC[1] \| C\_MAC[2] \| \ldots)$$

Initially, such an integrity checking value ICV generated simultaneous with generation of contents data is stored. This ICV value is compared to another ICV value generated at the time of checking integrity of contents data. If both values coincide with each other, it is identified that there is no act of tampering with the contents data. Conversely, if both values differ from each other, it is identified that there is an actual act of tampering with the contents data, thus necessitating such a means for restricting reproduction of the contents data.

Not only music data, but a storage device such as a memory card also stores a variety of data including picture data, game program data, or the like under a variety of categories. In order to prevent these contents data from illegally being tampered with, it is effective to individually generate the above-referred integrity checking values ICV per category for storage.

Nevertheless, relative to the increased number of the contents data stored in memory, it also involves such a difficulty to generate checking values required for authentication based on proper contents data and also store and control the checking values. In particular, in the case of updated recording media with a greater storage capacity including such a memory card incorporating flash memory, those contents data including music data, picture data, program data, or the like under a variety of categories are jointly stored in memory. Under such an environmental condition, it is difficult to properly control processes for generating and storing the ICV values, and identifying the act of tampering with contents data. When generating such values for checking the whole data in storage, it necessitates execution of such a process for generating checking values against the whole data to be checked. For example, when computing the integrity checking value ICV by applying the message authentication code MAC generated via the DES-CBC mode for example, it is necessary to execute such processes to treat the whole data with the DES-CBC mode. The computable volume increases relative to elongation of the data length to result in the generation of a problem in terms of processing efficiency.

Each memory card functioning as a storage device stores a wide variety of contents data under a variety of categories. By way of executing the process for checking the act of tampering with the contents data under a variety of categories via generation of such integrity checking values ICV independent from each other per category, it is possible to newly generate such integrity checking values ICV at the time of checking the ICV value or at the time of changing the ICV value and data by way of targeting a specific data within a category without adversely affecting other categories. Such a system for storing a plurality of integrity checking values ICV per category is described below.

Figure 38:
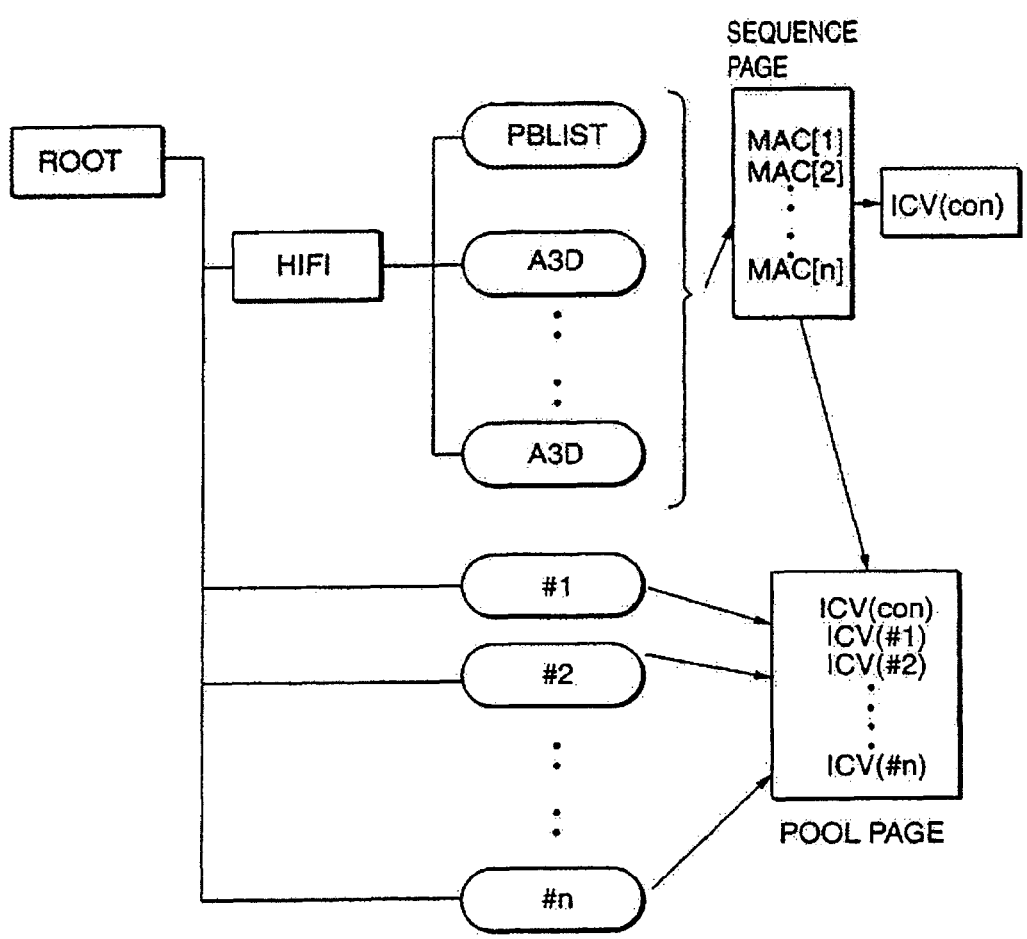
FIG. 38 is explanatory of an aspect of the storage of integrity checking value (ICV) in the data processing system related to the present invention.

FIG. 38 designates structure of data stored in a storage device and an example of the state of storing integrity checking values ICV corresponding to those data. As shown here, directory of music data stored in a flash memory of a memory card includes a plurality of the ATRAC-3 data files (A3D) each comprising ciphered contents data. In addition, a variety of contents data (#1 to #n) belonging to a plurality of categories are also stored in the flash memory. A plurality of categories include music data, picture data, game programs, or the like for example. It is also possible to control such similar picture data as an independent category as another directory in correspondence with individual data providers.

It is also possible to establish a controlling unit (entity) of the above-referred enabling key block (EKB) as a single category. In other words, it is allowable to provide an assemblage of contents data as a single category to which a contents key (Kcon) decoded by a key ciphering key (KEK) acquired via a certain enabling key block (EKB) is applicable.

Each of a plurality of reproduction controlling files (PBLIST) and ATRAC-3 data files (A3D) contains message authentication codes (MAC) for checking the act of tampering with contents data. Based on the MAC codes, integrity checking values (ICV) are generated. A plurality of the MAC values corresponding to contents data are stored in sequence pages of a flash memory, and yet, the integrity checking values (ICV (con)) acquired by applying the ICV generating key based on the MAC list are also stored in the reproduction controlling files (PBLIST) and the ATRAC-3 data files (A3D).

Figure 39:
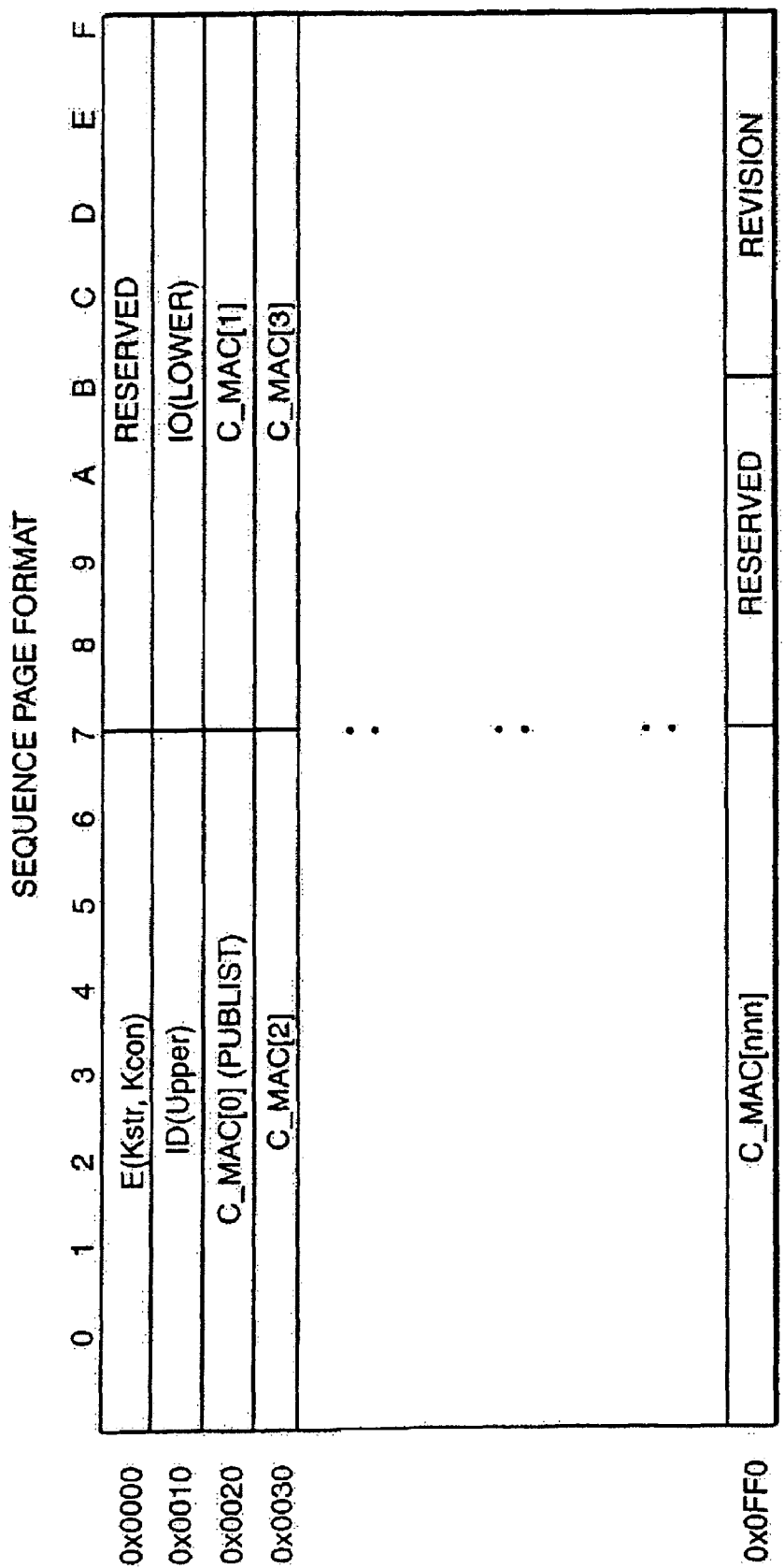
FIG. 39 designates a format of sequence page for storing the MAC value in the data processing system related to the present invention.

FIG. 39 designates a sequence page format for storing the message authentication codes MAC for checking the contents data. The sequence page domain is provided for inhibiting writing of such conventional contents data therein. Composition of the sequence page shown in FIG. 39 is described below.

Contents key E (Kstr, Kcon) is ciphered by a storage key of a memory card. The upper and lower Ids respectively store identifying elements (ID) of the memory card. Code C_MAC [0] corresponds to the MAC value generated based on component data of the above reproduction controlling files (PBLIST). Based on the MAC values generated based on the data of the above ATRAC-3 data file #1 for example, individual MAC values per contents data are stored in the C_MAC [1] value. Based on these MAC values, the integrity checking value (ICV (con)) are generated, which are then written into memory via serial protocol. In order to deal with mutually different key systems, it is preferred that individual ICV values generated from individual key systems shall be stored in specific areas different from each other.

The integrity checking values ICV generated per category for checking the act of tampering with contents data per category are recorded in pool pages of a flash memory of the memory card. The pool pages comprise such domains inhibiting the writing of those conventional data.

FIG. 40 designates such a pool page format for storing the integrity checking values ICV per category. Code #0_revision is provided with a renewal data of category #. Whenever the renewal data is updated, an incremental process is executed. Code #0_version corresponds to a version of category #0. Code #0_E (KEK, Kicv) corresponds to the ICV generating key (Kicv) ciphered by a key ciphering key (KEK) corresponding to category #0. Code ICV0 designates the integrity checking value (ICV) corresponding to the category #. It is so arranged that similar data can be stored in the pool page up to (EKB) #15 per category.

Figure 41:
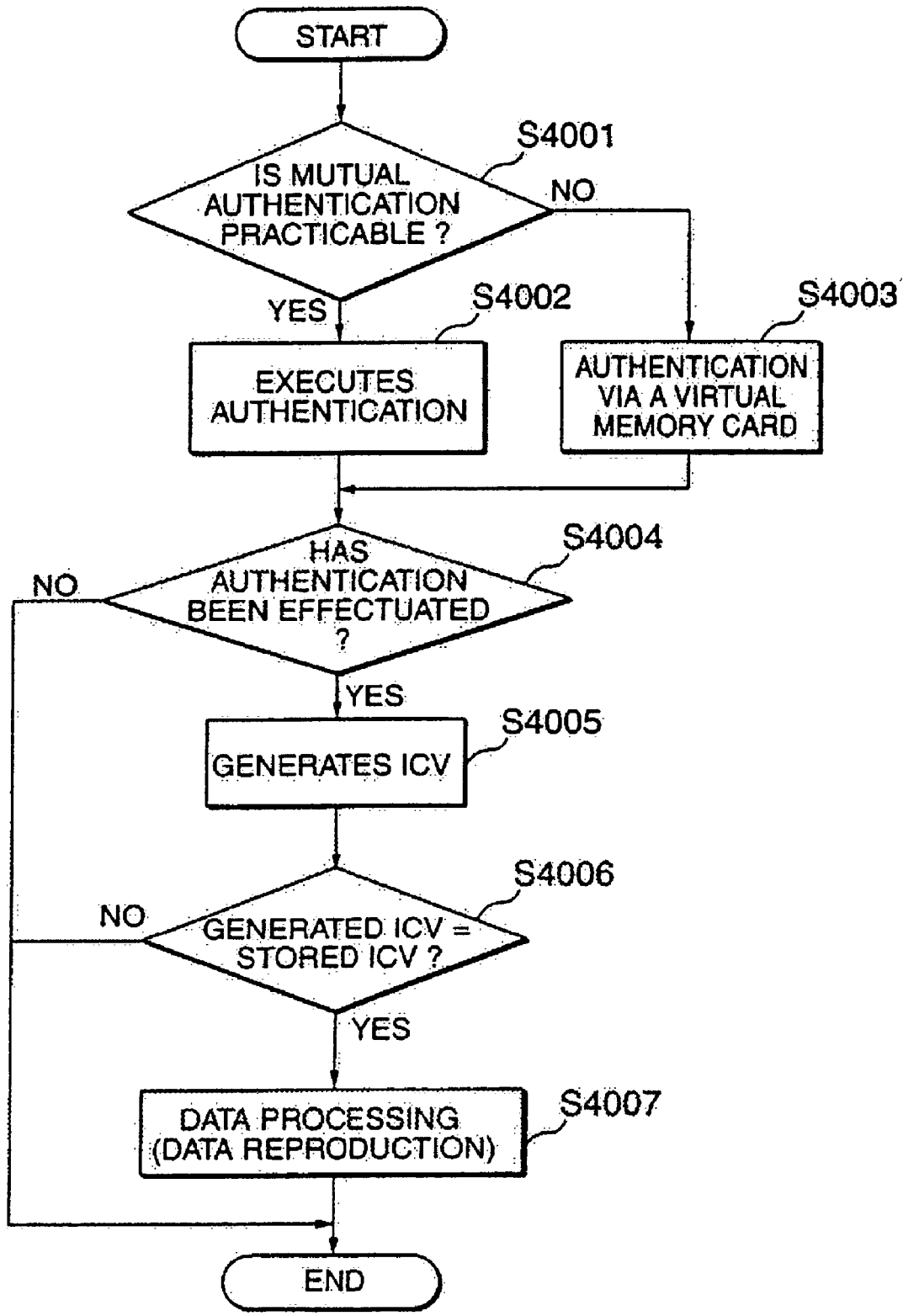
FIG. 41 presents a flowchart for checking the ICV value in the data processing system related to the present invention.

Process for checking actual condition of contents data via the integrity checking value is initiated when power supply source is turned ON or when a storage device such as a memory card is loaded in the corresponding reproduction apparatus. FIG. 41 designates a flowchart of the checking process using the ICV value.

Initially, when the reproduction apparatus detects that power supply source has turned ON or a new memory card has been loaded therein, step S4001 is entered, in which it is identified that whether mutual authentication is practicable between the reproduction apparatuses and the loaded memory card or not. If it is identified to be practicable, step S4002 is entered, in which a process for mutually authenticating the reproduction apparatus and the memory card is executed (refer to FIG. 29). On the other hand, while step S4001 is underway, if it is identified that mutual authentication between the reproduction apparatus and the loaded memory card is impracticable, then, step S4003 is entered, in which mutual authentication between the above-referred virtual memory card and the reproduction apparatus is executed.

While the next step S4004 is underway, it is identified whether the mutual authentication between the reproduction apparatus and the corresponding memory card has been effectuated or not. If the mutual authentication between them has resulted in the failure, all the processes thenceforth are terminated without execution. When the mutual authentication between them has been effectuated, the next step S4005 is entered, in which computation of the integrity checking value ICV is executed. As described earlier, the ICV value is computed based on the message authentication code MAC for checking integrity of contents data.

When the next step S4006 is entered, the ICV value generated via computation is compared to another ICV value previously being stored. When both of them coincide with each other, it is identified that there is no act of tampering with contents data, whereby operating mode proceeds to step S4007, in which a variety of processes including reproduction of contents data are executed. On the other hand, if the above ICV values differ from each other, then, it is identified that there is an evident act of tampering with the contents data, whereby terminating all the processes thenceforth without execution of data reproduction. By way of serially executing the above processes, contents data can be prevented from illegally being tampered with, and yet, it is possible to revoke such contents data illegally being tampered with.

As described above, by way of controllably generating a plurality of integrity checking values ICV being independent per category, when checking individual ICV values or changing individual ICV values or generating new ICV values relative to the change of contents data, it is possible to check these ICV values solely against such a contents data within a single category without adversely affecting those data within other categories.

[Structure of Expanded MAC Codes]

As a varied example of the processes for generating the message authentication codes MAC for checking integrity of contents data described earlier by referring to the above-described reproduction controlling file and the contents of data stored in the ATRAC-3 data files, and also as a varied example of the processes for storing the above data in corresponding data files, the process for generating and storing an expanded version of the MAC codes are described below.

Figure 42:
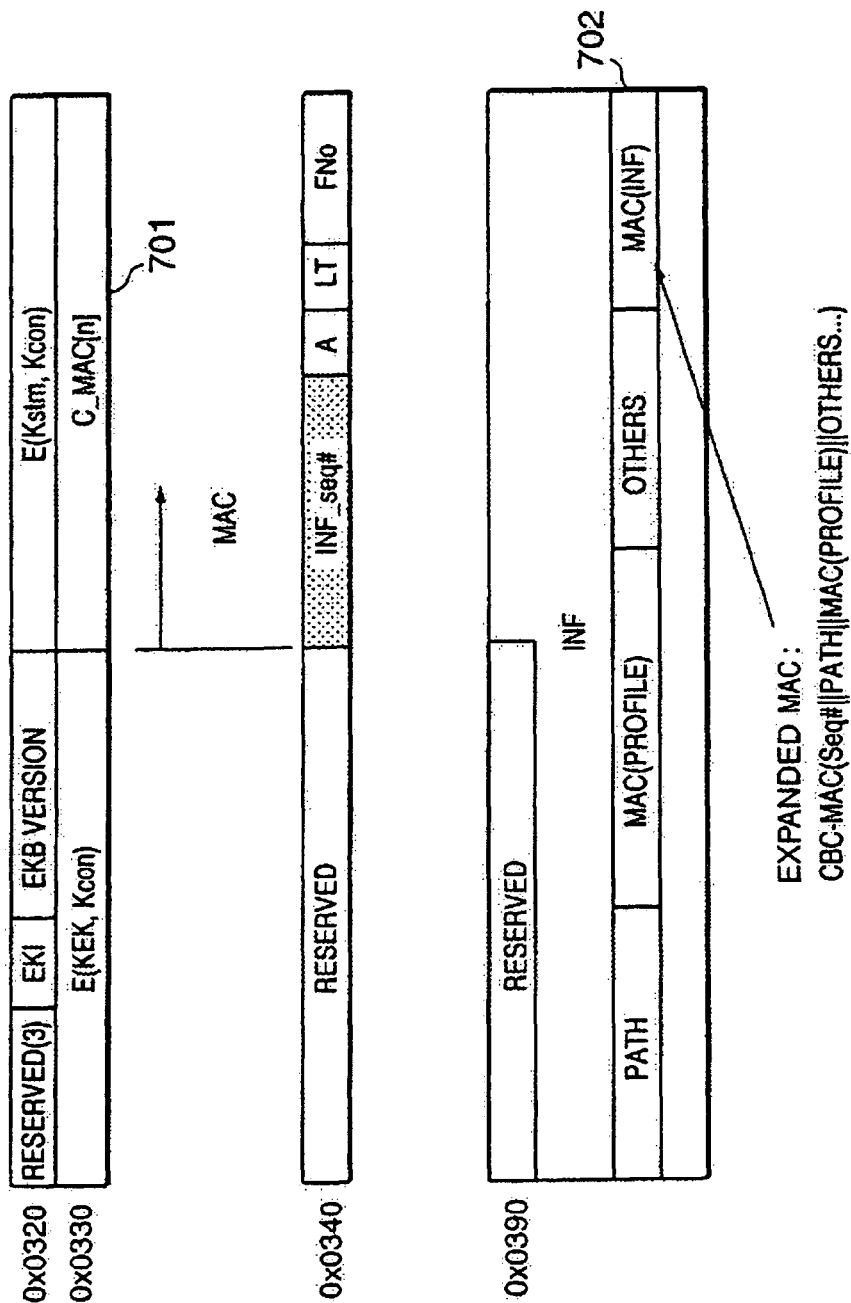
FIG. 42 is explanatory of the process for generating expandable MAC values and a process for storing the expandable MAC values in the data processing system related to the present invention.

FIG. 42 exemplifies the process for generating and storing the expanded MAC codes. FIG. 42 designates part of the ATRAC-3 data files shown in FIGS. 21 to 23. The message authentication codes MAC correspond to such values generated via the processes shown in FIG. 37 based on some data corresponding to plural data categories among a variety of the ATRAC-3 data files for example. By way of comparing such MAC values previously stored in data files to the other MAC values generated during the checking process, it is identified whether there is actually such an evident act of tampering with contents data or not.

For example, those message authenticating codes MAC stored in the ATRAC-3 data files shown in FIG. 42 deal with those contents data to be subject to checking of integrity via the MAC codes, where these contents data are classified into a plurality of data categories in a range from "INF-seq#". Those MAC codes previously generated based on those data categories to be dealt with by the corresponding MAC codes are stored in the corresponding data files. Concretely, this condition is expressed as MAC (INF-seq#||A||LT|| . . . ). The contents data within parenthesis are subject to the checking process via the MAC codes, in other words, these contents data are subject to checking to determine whether actually being tampered with or not.

Nevertheless, there is such a case in which a wide variety of contents data are stored in each of the ATRAC-3 data files, and yet the contents data subject to the integrity checking may further increase. To cope with this problem, it is so arranged that a greater number of MAC codes are newly generated in conjunction with the increased data to be subject to checking, thus forming the expanded version of MAC codes. The expanded MAC codes are stored in each data file. Those original MAC codes generated solely for dealing with such conventional contents data subject to the checking of integrity basically deal with invariable objective domain for the checking of integrity of the corresponding contents data. This arrangement is described below.

As shown in FIG. 42, such an original MAC code 701 for checking integrity of those data below the above-referred data category "INF-seq#" are generated. The original MAC code 701 is stored in the ATRAC-3 data file.

Further, in the case in which such a contents data subject to the checking of integrity is present in a plurality of data recorded in the INF space of the ATRAC-3 data file, based on all the data subject to the checking of integrity within the INF space including the above referred data category "INF-seq#" corresponding to such a data being the object of the generation of the MAC code of the original MAC 701, such MAC codes are newly generated in correspondence with them. Those newly generated MAC code are stored in the corresponding data files as the expanded version of MAC codes.

An expanded MAC code [MAC (INF)] 702 shown in FIG. 42 is generated by a formula shown below:

$$MAC(\text{INF-seq}\#\|\text{path}\|MAC(\text{profile})\|\text{others}\dots)$$

As is apparent from the above formula, the expanded version of the MAC codes comprise part of the data as the object of the generation of the original MAC codes, and yet, the expanded version of the MAC codes are generated based on such data combined with other data to be subject to the checking of the integrity.

Further, in the course of rewriting the expanded MAC codes, in other words, as a result of the rewriting of those data below "path" in the INF domain corresponding to expandable MAC data, based on the rewritten data, newly expandable MAC codes are again generated and stored. Those data below "path" are also included in the expanded MAC codes. Further, "INF-seq#" data being the objective target of the original MAC code is also rewritten, whereby enabling a newly expanded MAC code to be generated and stored.

In this case, inasmuch as the data "INF-seq#" as the objective target of the original MAC code has already been rewritten, the original MAC code is newly computed. In other words, whenever renewing the expanded MAC codes, re-generation and re-storage of the original MAC code are jointly executed.

It is possible to rewrite the above INF-seq#" data by way of generating new random digits or via incremental processing thereof.

The above arrangement enables presence of the MAC target data in common with those MAC codes including part of the MAC target data of the original MAC in such MAC target data of the expanded MAC codes generated in correspondence with the increased data for checking the integrity of contents data. It is also so arranged that regeneration of the original MAC codes is jointly executed while renewing the expanded MAC codes. As a result, it is possible to always reflect the process of rewriting data in the INF functioning as the data for newly checking integrity of contents data upon the original MAC code without causing the MAC target data domain of the original MAC codes to be expanded.

[Application of the (EKB) to the Decoding Process Between a Storage Device and a Reproduction Apparatus]

Next, a concrete process for acquiring a contents key usable for the decoding of ciphered contents data via utilization of the above referred enabling key block (EKB) applying the above referred hierarchical key tree structural key distribution system is described below.

Figure 43:
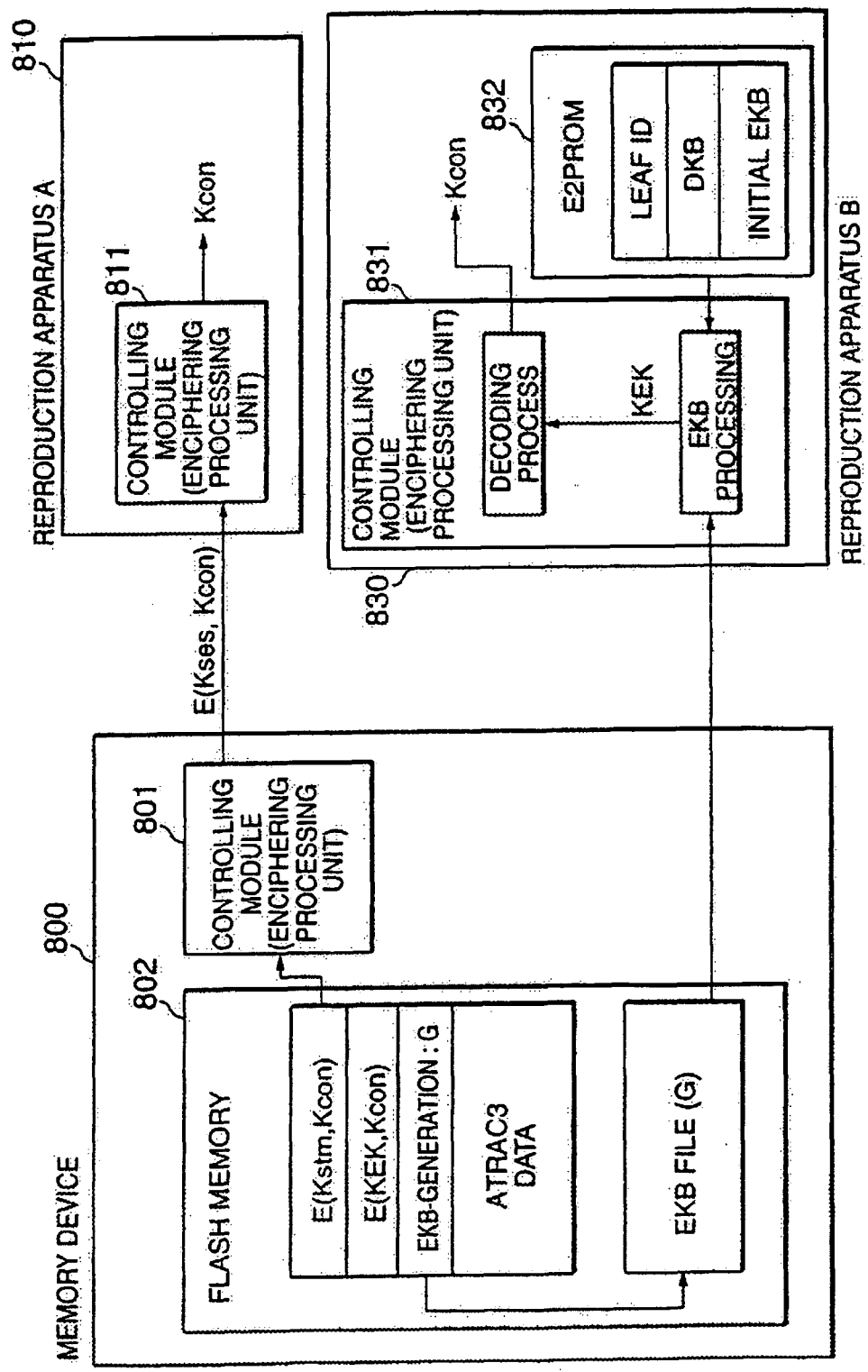
FIG. 43 is explanatory of an aspect of the process for acquiring a contents key by way of utilizing an enabling key block (EKB) in the data processing system related to the present invention.

FIG. 43 designates a storage device 800 such as the "Memory Stick" internally storing ciphered contents data as the ATRAC-3 data and a pair of reproduction apparatuses 810 and 830 for executing reproduction of the contents data.

The storage device 800 stores the ATRAC-3 data files comprising ciphered contents data as described earlier by referring to FIG. 21. In order to enable the reproduction apparatuses 810 and 830 to respectively reproduce the contents data, it is imperatively required to acquire a contents key (Kcon) necessary for decoding the ciphered contents data.

First, by referring to a storage device 800 and a reproduction apparatus A 810 shown in FIG. 43, a process for enabling the reproduction apparatus A 810 to directly acquire a contents key from the storage device 800 is described below. Initially, the storage device 800 and the reproduction apparatus A 810 mutually execute an authentication process between mutual controlling modules 801 and 811 which mutually execute an authentication process. The mutual authentication process is executed based on the common key applied ciphering format or the open-key applied ciphering format described earlier by referring to FIG. 8. In this case, it is essential that the controlling modules 801 and 811 for controlling the storage device 800 and the reproduction apparatus A 810 shall individually contain such an algorithm for execution of the authentication process and store a key required for the authentication process.

After effectuating the mutual authentication with the above reproduction apparatus A 810, the storage device 800 extracts either of the contents key E (Kstm, Kcon) ciphered by a storage key (Kstm) and the other contents key E (KEK, Kcon) ciphered by a key ciphering key (KEK) acquirable via a process utilizing the above-referred enabling key block (EKB) out from the ATRAC-3 data files stored in a flash memory 802 of the storage device 800, and then, decodes the extracted contents key before eventually acquiring a contents key (Kcon).

Next, using a session key (Kses) generated in the course of the mutual authentication process executed between the reproduction apparatus A 810, the storage device 800 again ciphers the contents key (Kcon), and then transmits the generated ciphering data E (Kses, Kcon) to the reproduction apparatus A 810. The controlling module 811 on the part of the reproduction apparatus A 810 decodes the received ciphered contents key E (Kses, Kcon) before eventually acquiring a contents key (Kcon).

Based on the above serial processes, the storage device 800 initially decodes and extracts the contents key (Kcon), and then, after again ciphering the contents key (Kcon) with a session key (Kses), the storage device 800 delivers the ciphered contents key (Kcon) to the reproduction apparatus A 810.

No decoding process is executed on the part of the storage device 800. Only the reproduction apparatus A 810 acquires the contents key (Kcon). A practical form for executing these processes is described below.

Referring to FIG. 43, those processes executed between the storage device 800 and the reproduction apparatus B 830 are described below. Initially, the storage device 800 specifies such an enabling key block (EKB) required for acquiring a contents key (Kcon) out from version (or generation) of the enabling key blocks (EKB) stored in the ATRAC-3 data files, and then delivers the specified enabling key block (EKB) to the reproduction apparatus B 830.

On receipt of the specified enabling key block (EKB) from the storage device 800, the reproduction apparatus B 830 processes the received (EKB) by applying a device key block (DKB) previously stored in a flash memory E2PROM of the reproduction apparatus B 830 before eventually acquiring a key ciphering key (KEK).

Figure 44:
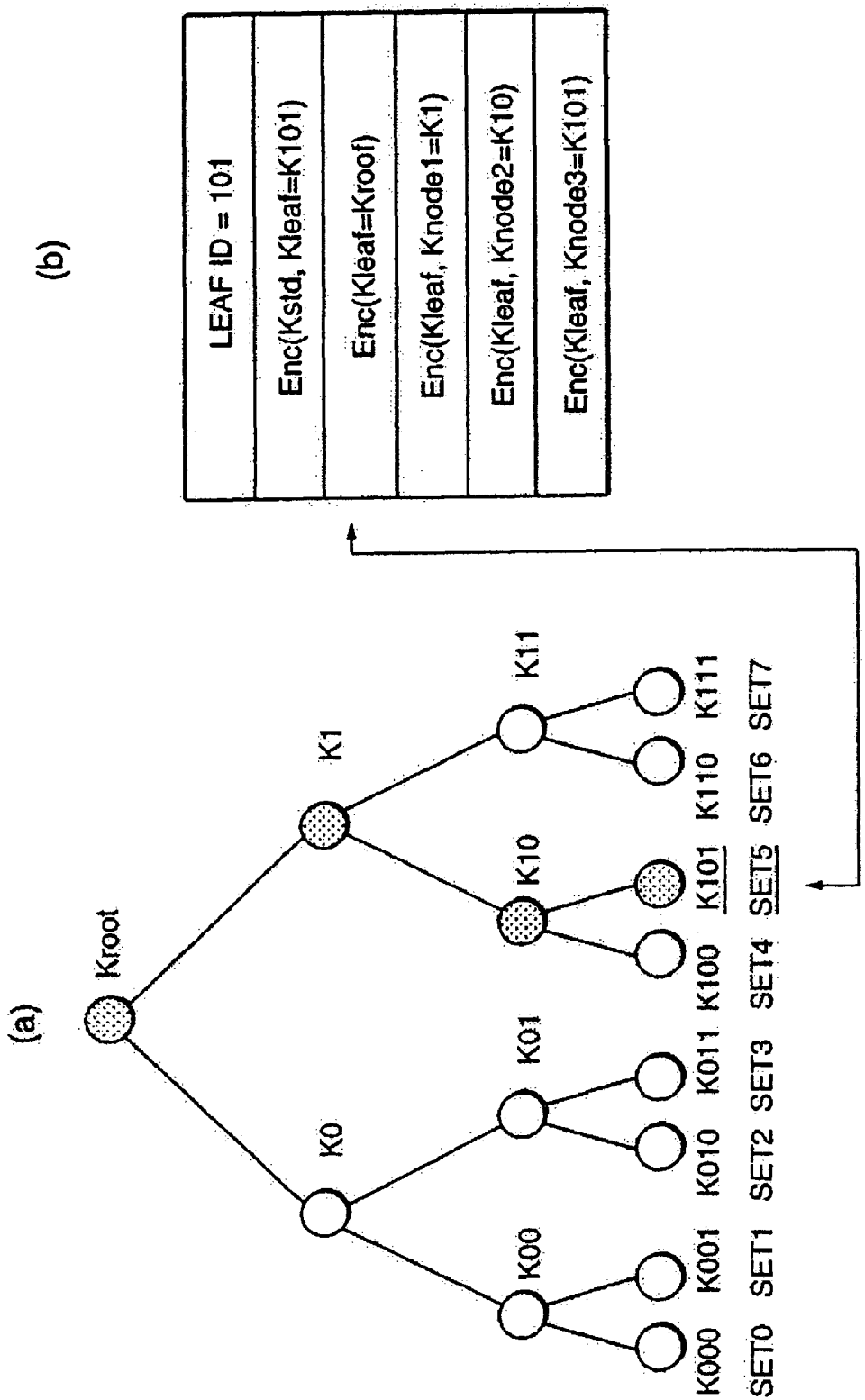
FIG. 44 is explanatory of the structure of a device key block (DKB) used for the data processing system related to the present invention.

Referring to FIG. 44, construction of the device key block (DKB) is described below. As described earlier, those devices provided for the contents data reproduction apparatus B 830 individually contain such a terminal element of the key distribution system based on a hierarchical key tree structure shown in (a) of FIG. 44, in other words, each of the devices of the contents data reproduction apparatus contains keys corresponding to individual nodes linked from leaves to the upper ran routes. For example, such a device corresponding to SET 5 of a terminal node shown in (a) of FIG. 44 contains such a key set ranging from a leaf-key K101, node keys K10 and K1 up to a root key (Kroot), or such a key set ranging up to a sub-category node key, or such a key set ranging up to category nodes.

The above-referred keys are individually ciphered by the corresponding devices and stored in a flash memory E2PROM for example. The above-referred device key block (DKB) comprises those ciphered key sets individually corresponding to such plural keys ranging from leaves stored in each device up to such a specified node consisting of a sub-category node for example or such keys up to the routes.

FIG. 44 exemplifies structure of those data stored in the device key block (DKB) in (b). As shown here, the device key block (DKB) corresponds to such a ciphered key block comprising such data consisting of node keys and root keys respectively ciphered by a leaf key and such data consisting of leaf-keys ciphered by a storage key (Kstd) of a device (the reproduction apparatus for example). Using the storage key (Kstd), the reproduction apparatus decodes Enc (Kstd, leaf) stored in the device key block (DKB), and then acquires a leaf key (Kleaf, and yet, it is also possible for the reproduction apparatus to directly decode upper-rank ciphered node keys and ciphered root keys by applying the acquired leaf key (Kleaf), whereby making it possible to acquire upper-rank keys by way of serially decoding those lower rank keys held in the enabling key block (EKB). The device key block (DKB) also contains a leaf-identifying element "leaf ID".

Those storage keys proper to individual devices differ from each other per device. These storage keys may also previously be stored in a security memory shown as SAM for example or they may also be arranged to be acquirable based on the leaf ID. In other words, the storage keys may be generated by individual controlling modules (corresponding to ciphering units) based on the leaf ID. Concretely, it is also allowable to construct such a form expressed in terms of Kstd=Hash (Kmas, leaf ID) by applying Hash function to the leaf ID based on a master key (Kmas) stored in common with predetermined set units.

Referring again to FIG. 43, the process for acquiring contents data is further described below. After receiving an enabling key block (EKB) from the storage device 800, the reproduction apparatus B 830 acquires a key ciphering key (KEK) ciphered by the enabling key block (EKB) by applying node keys and root keys generated via the decoding of the device key block (DKB) stored in memory 832 of the controlling module 831. Method of processing the enabling key block (EKB) corresponds to the method described earlier by referring to FIG. 5 or 9.

By way of utilizing the above-referred key ciphering key (KEK) generated by the processing of the enabling key block (EKB) and executing the process for decoding the ciphered contents key E (KEK, Kcon) received from the storage device 800, the reproduction apparatus B 830 eventually acquires a contents key.

The initial (EKB) stored in memory 832 (E2PROM) of the reproduction apparatus B 830 shown in FIG. 43 corresponds to such a simplified (EKB) file originally stored in the reproduction apparatus B 830. Actually, the initial (EKB) constitutes such a ciphered key block commonly stored in those devices corresponding to leaves linked with lower-rank nodes of a single category node (comprising a "Memory Stick" for example) in terms of the category node described earlier by referring to FIG. 11.

If such a key owned by a category node corresponds to K01 for example, it is so arranged that a root key Enc (K01, Kroot) ciphered by K01 is stored as the initial (EKB). As a result of the processing of the initial (EKB), it is possible for the reproduction apparatus B 830 to gain a root key. For example, in such a case in which the reproduction apparatus B 830 receives such an (EKB) storing a key ciphering key (KEK) ciphered by a root key, it is possible for the reproduction apparatus B 830 to acquire the key ciphering key (KEK) by applying a root key generated via the initial (EKB).

Not only such a system for delivering the initial (EKB) to those devices (reproduction apparatuses) belonging to a single category node in common with each other, but it is also allowable to provide the initial (EKB) in common with a plurality of category nodes. For example, assuming that node key of category node of the "Memory Stick" is defined as K01, node key of category node of a personal computer incorporating such a function to reproduce contents data is defined as K10, and node key of category node of a reproduction apparatus compatible with a network service line is defined as K11, by way of previously installing the initial (EKB) storing three kinds of ciphered root keys including Enc (K01, Kroot), Enc (K10, Kroot), and Enc (K11, Kroot) to individual devices prior to delivery to the market, it is possible to distribute such ciphered contents data that can commonly be utilized by those devices mutually differing from each other.

Figure 45:
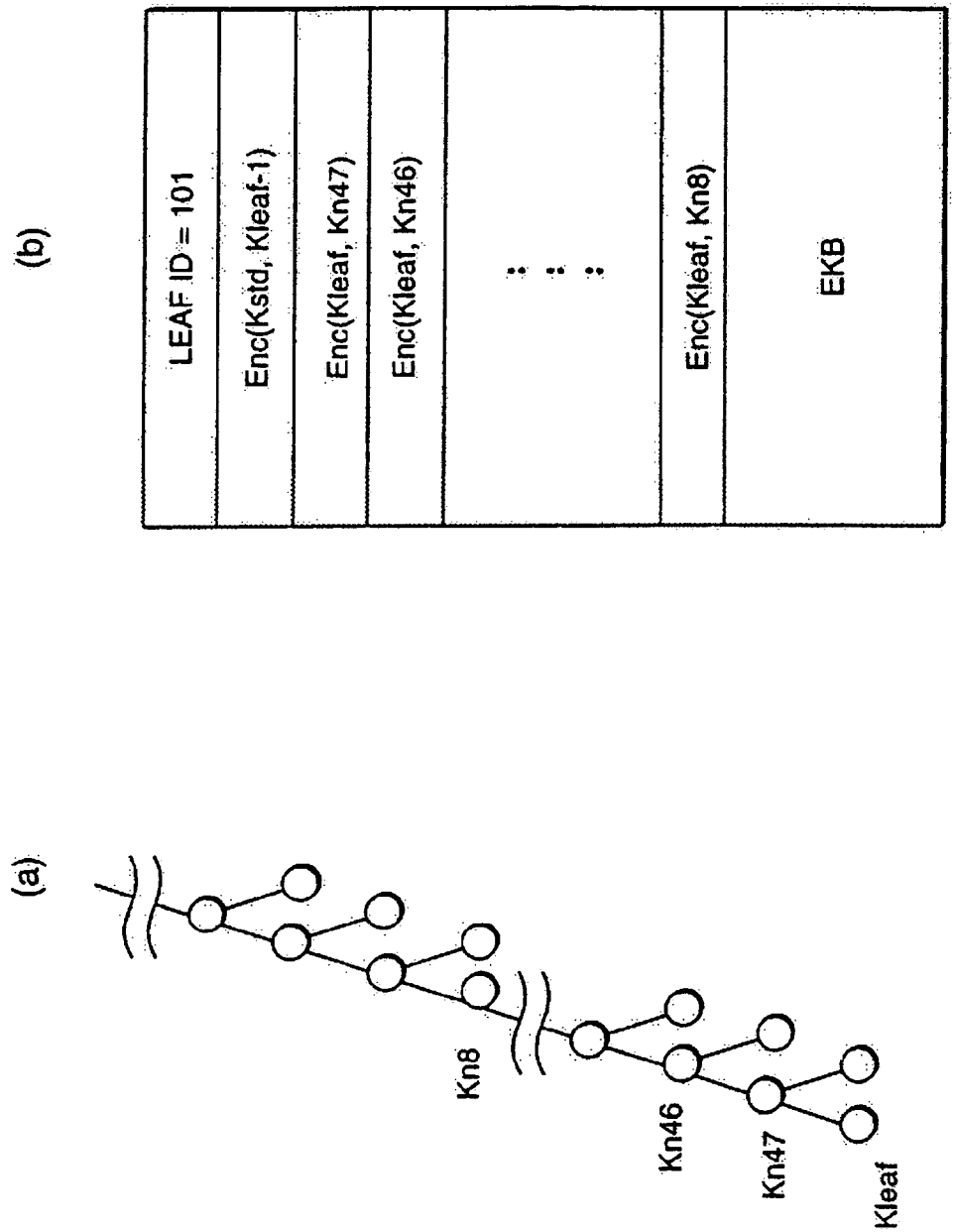
FIG. 45 exemplifies a structural arrangement for storing the device key block (DKB) and the enabling key block (EKB) in the data processing system related to the present invention.
Figure 46:
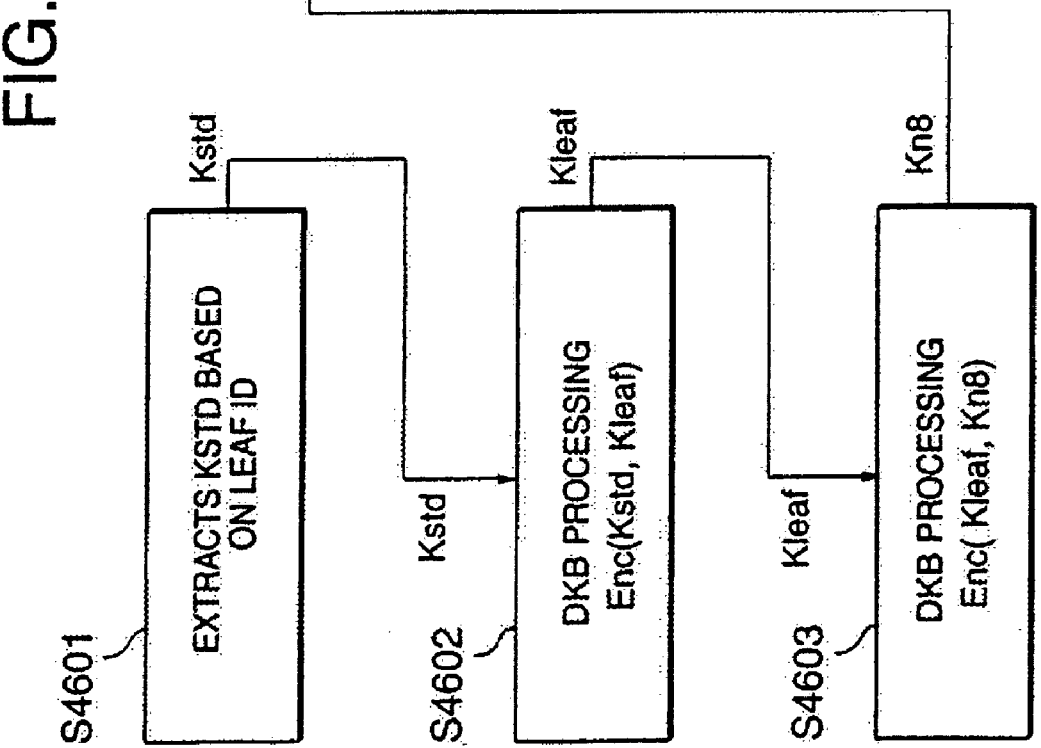
FIG. 46 is explanatory of an aspect of the process for acquiring a contents key by way of utilizing the device key block (DKB) and the enabling key block (EKB) in the data processing system related to the present invention.

FIG. 45 exemplifies such a reproduction apparatus incorporating a flash memory E2PROM for example integrally storing a device key block (DKB) and an initial enabling key block (EKB) which effects self recording and self reproduction of contents data. FIG. 46 exemplifies a process for acquiring contents key by utilizing the above-referred key blocks.

The construction shown in FIG. 45 is described below. The device (comprising a recording/reproducing apparatus for example) shown in FIG. 45 is compatible with the leaves shown in (a) of FIG. 45. This device belongs to the category of the eighth category node Kn8 in the hierarchical key tree structure. This device stores a plurality of device key blocks (DKB) comprising Enc (Kstd, Kleaf) to Enc (Kleaf, Kn8) shown in (b) of FIG. 45. This construction is identical to the (DKB) described earlier. Those data stored in this device after directly being ciphered by a leaf key individually constitute those keys ranging from the node key Kn47 to the category node key Kn8 right above the leaf key.

This device further incorporates an enabling key block (EKB) available for self recording and self reproduction. In the course of recording and reproducing contents data, by way of processing the enabling key block (EKB) and the device key block (DKB) applicable to the self recording and self reproduction processes, the device acquires the contents key (Kcon), whereby executing decoding and ciphering of contents data.

FIG. 46 designates a flowchart describing serial steps to be executed by a device incorporating the (EKB) and (DKB) components shown in (b) of FIG. 45 in the course of acquiring contents data. When the initial step S4601 is entered, based on the leaf ID data, the device extracts a storage key (Kstd). The device extracts the storage key (Kstd) from a security memory incorporated therein based on the leaf-ID data, or the device computes the storage key (Kstd) based on the master key (Kmas) and the leaf ID data as described earlier.

Next, step S4602 is entered, in which, based on the storage key (Kstd), the device processes the device key block (DKB), in other words, decodes Enc (Kstd, leaf) whereby acquiring a leaf-key. Next, step S4603 is entered, in which, based on the leaf key (Kleaf), the device further processes the device key block (DKB), in other words, decodes Enc (Kleaf, Kn8) whereby acquiring a category node key. Inasmuch as the device key block (DKB) stores such node keys directly being ciphered by the leaf key, it is possible to acquire upper-rank node keys directly from the decoding process executed by the leaf key.

Next, step S4604 is entered, in which, based on the node key Kn8, the device processes the enabling key block (EKB) to serially gain upper-rank node keys and then computes the root key corresponding to the uppermost rank. Next, step S4605 is entered, in which, by applying the root key (Kroot) acquired via the processing of the enabling key block (EKB), the device decodes Enc (Kroot, KEK) to acquire the key-ciphering key (KEK). Finally, step S4606 is entered, in which, using the acquired key-ciphering key (KEK), the device decodes Enc (KEK, Kcon) stored in such a data attached to the contents data before eventually acquiring the contents key (Kcon).

The enabling key block (EKB) shown in (b) of FIG. 45 is solely used for executing a self-recording process. However, in the case of down loading a variety of contents data to corresponding devices, it is also practicable to jointly download a specific enabling key block (EKB) corresponding to a predetermined contents data, and then, store the (EKB) in correspondence with the contents data. Further, it is also possible to execute the process shown in FIG. 46 against the enabling key block (EKB) corresponding to such a contents data down-loaded at the time of reproducing the contents data. The device key block (DKB) shown in (b) of FIG. 45 comprises such key data comprising those node keys ranging from upper rank to the eighth node Kn8 which are directly ciphered by the leaf key. It is also allowable to store such node keys disposed at a still upper rank or a lower rank as well.

The present invention has thus been described in detail by way of referring to specific practical forms for implementing the essentials of the present invention. However, it should be understood that the present invention may be practiced furthermore by those skilled in the art by way of modification or substitution of the embodiments within such a scope without deviating from the essential of the present invention. In other words, the present invention has been disclosed in the style of exemplification, and thus, the scope of the present invention shall not be construed restrictively. In order to precisely judge the essential points of the present invention, full text of the claims set forth in the rearward of this specification shall be referred to.

As described above, according to the system and method for processing various data proposed by the present invention, a plurality of operating keys individually ciphered by a plurality of enabling key blocks (EKB) are provided, where each enabling key block (EKB) comprises a variety of data for ciphering updating keys on the path for forming a hierarchical key tree structure comprising such keys provided in correspondence with roots, nodes, and leaves on the path ranging from the rot to leaves of the key tree comprising a plurality of devices as the leaves, and yet, the above-referred ciphering data also comprises data for ciphering upper-rank keys via ciphering of lower rank keys. Those ciphered keys solely enable those selected proper devices to decode the ciphered effect, whereby realizing such ciphering keys or such a system for properly distributing contents data capable of preserving higher effect of security.

Further, according to the present invention, a plurality of contents keys used for decoding ciphered contents data are stored in the header data of the contents data. One of the contents keys is processed into such a data ciphered by a ciphering key provided by the enabling key block (KEB) and the other one is processed into such a data ciphered by such a key proper to a storage device. Because of this arrangement, whenever operating such a device for reproducing a contents data, the contents data can be reproduced by way of properly selecting the contents key.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus, comprising:
means for storing a plurality of enabling key blocks that include respective encrypted key sets formed by encrypting an upper-level node key in a selected path in a key tree structure by a lower-level node key in the selected path in the key tree structure, the key tree structure including leaves, a root, and nodes existing in paths from each of the leaves to the root, each of the leaves being assigned to the information processing apparatus;
means for checking a link count for each of the plurality of enabling key blocks;
means for retrieving a predetermined number n of the enabling key blocks having the n highest link counts; and
means for processing the retrieved enabling key blocks to obtain key encryption keys associated with respective ones of the retrieved enabling key blocks and for storing the key encryption keys in the storing means, each key encryption key corresponding to at least one of the root and the nodes.

2. The information processing apparatus of claim 1, wherein the link count for each respective one of the plurality of enabling key blocks is stored in a data file corresponding to the respective enabling key block.

3. The information processing apparatus of claim 1, wherein the link count designates a number of files of a particular file type being linked.

4. An information processing method, comprising:
storing, in a storage device, a plurality of enabling key blocks that include respective encrypted key sets formed by encrypting an upper-level node key in a selected path in a key tree structure by a lower-level node key in the selected path in the key tree structure, the key tree structure including leaves, a root, and nodes existing in paths from each of the leaves to the root, each of the leaves being assigned to the information processing apparatus;
checking a link count for each of the plurality of enabling key blocks;
retrieving a predetermined number n of the enabling key blocks having the n highest link counts;
processing the retrieved enabling key blocks to obtain respective key encryption keys corresponding to at least one of the root and the nodes; and
storing the key encryption keys in the storage device.

5. The method of claim 4, wherein the link count for each respective one of the plurality of enabling key blocks is stored in a data file corresponding to the respective enabling key block.

6. The method of claim 4, wherein the link count designates a number of files of a particular file type being linked.

7. An information processing apparatus, comprising:
a storage device operable to store a plurality of enabling key blocks that include respective encrypted key sets formed by encrypting an upper-level node key in a selected path in a key tree structure by a lower-level node key in the selected path in the key tree structure, the key tree structure including leaves, a root, and nodes existing in paths from each of the leaves to the root, each of the leaves being assigned to the information processing apparatus;
a controller operable to check a link count for each of the plurality of enabling key blocks and to retrieve a predetermined number n of the enabling key blocks having the n highest link counts; and
a decryption device operable to perform a decryption process on the retrieved enabling key blocks and obtain respective key encryption keys therefrom, the key encryption keys corresponding to at least one of the root and the nodes.

8. The information processing apparatus of claim 7, wherein the link count for each respective one of the plurality of enabling key blocks is stored in a data file corresponding to the respective enabling key block.

9. The information processing apparatus of claim 7, wherein the link count designates a number of files of a particular file type being linked.

10. A memory device receivable in an information processing apparatus, the memory device comprising:
means for receiving from the information processing apparatus a plurality of enabling key blocks and a predetermined number n of key encryption keys to be decrypted from the plurality of enabling key blocks, the enabling key blocks each including an encrypted key set formed by encrypting an upper-level node key in a selected path in a key tree structure by a lower-level node key in the selected path in the key tree structure, the key tree structure including leaves, a root, and nodes existing in paths from each of the leaves to the root, each of the leaves being assigned to the information processing apparatus, the key encryption keys being associated with respective ones of the received plurality of enabling key blocks having the n highest link counts, and the key encryption keys each corresponding to at least one of the root and the nodes;

means for storing the received plurality of enabling key blocks and the key encryption keys; and means for sending the plurality of stored enabling key blocks to the information processing apparatus.

11. The memory device of claim 10, wherein the link count for each respective one of the enabling key blocks having the n highest link counts is stored in a data file corresponding to the respective enabling key block.

12. The memory device of claim 10, wherein the n highest link counts each designate a number of files of a particular file type being linked.

* * * * *